(12) United States Patent
McAlister

(10) Patent No.: US 9,200,561 B2
(45) Date of Patent: Dec. 1, 2015

(54) CHEMICAL FUEL CONDITIONING AND ACTIVATION

(71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 159 days.

(21) Appl. No.: 13/843,976

(22) Filed: Mar. 15, 2013

(65) Prior Publication Data

US 2014/0130756 A1    May 15, 2014

Related U.S. Application Data

(60) Provisional application No. 61/725,456, filed on Nov. 12, 2012.

(51) Int. Cl.
*F02M 51/06* (2006.01)
*F02B 43/00* (2006.01)
(Continued)

(52) U.S. Cl.
CPC ............. *F02B 43/00* (2013.01); *F02M 57/005* (2013.01); *F02M 57/06* (2013.01); *F02P 9/007* (2013.01); *F02P 13/00* (2013.01); *F02P 23/045* (2013.01); *H01T 13/50* (2013.01); *Y02T 10/32* (2013.01)

(58) Field of Classification Search
CPC ............. F02P 15/00; F02P 3/01; F02P 19/02; F02M 51/06; F02M 27/04; F02M 53/02; F02M 2700/4321; F02M 21/02; F02C 7/22; F02C 3/30; G01L 23/22

USPC .......................... 123/1 A, 297, 298, 304, 305
See application file for complete search history.

(56) References Cited

U.S. PATENT DOCUMENTS 1,307,088 A    6/1919    Drummond
1,451,384 A    4/1923    Whyte
(Continued)

FOREIGN PATENT DOCUMENTS

CN    1411535 A    4/2003
DE    3443022 A1    5/1986
(Continued)

OTHER PUBLICATIONS

U.S. Appl. No. 13/797,351, McAlister.
(Continued)

*Primary Examiner* — Stephen K Cronin
*Assistant Examiner* — Grant Moubry
(74) *Attorney, Agent, or Firm* — Perkins Coie LLP

(57) ABSTRACT

Methods, systems, and devices are disclosed for chemically activating a fuel for injection and ignition in a combustion engine. In one aspect, a method to initiate combustion includes transforming an interim fuel substance into constituents including radicals, the interim fuel substance formed by a chemical conversion using a fuel, in which the interim fuel substance has a lower ignition energy than that of the fuel, injecting the constituents into a combustion chamber of an engine, and providing a gaseous fluid including oxidants in the combustion chamber to react with the constituents in a combustion reaction, in which the combustion reaction of the constituents occurs at a reduced energy than that of a combustion reaction of the fuel substance.

31 Claims, 18 Drawing Sheets

(51) Int. Cl.
F02M 57/00 (2006.01)
F02M 57/06 (2006.01)
F02P 9/00 (2006.01)
F02P 13/00 (2006.01)
F02P 23/04 (2006.01)
H01T 13/50 (2006.01)

(56) References Cited

U.S. PATENT DOCUMENTS

| | | |
|---|---|---|
| 1,765,237 A | 6/1930 | King |
| 2,255,203 A | 9/1941 | Wiegand |
| 2,681,212 A | 6/1954 | Thomas |
| 2,744,507 A | 5/1956 | Huber |
| 2,864,974 A | 12/1958 | Beye |
| 3,058,453 A | 10/1962 | May |
| 3,060,912 A | 10/1962 | May |
| 3,081,758 A | 3/1963 | May |
| 3,149,620 A | 9/1964 | Cataldo |
| 3,243,335 A | 3/1966 | Faile |
| 3,286,164 A | 11/1966 | De Huff |
| 3,361,161 A | 1/1968 | Schwartz |
| 3,373,724 A | 3/1968 | Papst |
| 3,520,961 A | 7/1970 | Suda et al. |
| 3,551,738 A | 12/1970 | Young |
| 3,594,877 A | 7/1971 | Suda et al. |
| 3,608,050 A | 9/1971 | Carman et al. |
| 3,689,293 A | 9/1972 | Beall |
| 3,762,170 A | 10/1973 | Fitzhugh |
| 3,802,194 A | 4/1974 | Tanasawa et al. |
| 3,866,074 A | 2/1975 | Smith |
| 3,926,169 A | 12/1975 | Leshner et al. |
| 3,931,438 A | 1/1976 | Beall et al. |
| 3,960,995 A | 6/1976 | Kourkene |
| 3,976,039 A | 8/1976 | Henault |
| 3,997,352 A | 12/1976 | Beall |
| 4,004,554 A * | 1/1977 | Kosaka et al. ............... 123/3 |
| 4,066,046 A | 1/1978 | McAlister |
| 4,087,719 A | 5/1978 | Pratt, Jr. |
| 4,095,580 A | 6/1978 | Murray et al. |
| 4,099,494 A | 7/1978 | Goloff et al. |
| 4,105,004 A | 8/1978 | Asai et al. |
| 4,122,816 A | 10/1978 | Fitzgerald et al. |
| 4,135,481 A | 1/1979 | Resler, Jr. |
| RE29,978 E | 5/1979 | Leshner et al. |
| 4,183,467 A | 1/1980 | Sheraton et al. |
| 4,203,393 A | 5/1980 | Giardini |
| 4,313,412 A | 2/1982 | Hosaka et al. |
| 4,330,732 A | 5/1982 | Lowther |
| 4,332,223 A | 6/1982 | Dalton |
| 4,364,342 A | 12/1982 | Asik |
| 4,364,363 A | 12/1982 | Miyagi et al. |
| 4,368,707 A | 1/1983 | Leshner et al. |
| 4,377,455 A | 3/1983 | Kadija et al. |
| 4,381,740 A | 5/1983 | Crocker |
| 4,382,189 A | 5/1983 | Wilson |
| 4,402,036 A | 8/1983 | Hensley et al. |
| 4,448,160 A | 5/1984 | Vosper |
| 4,469,160 A | 9/1984 | Giamei |
| 4,483,485 A | 11/1984 | Kamiya et al. |
| 4,511,612 A | 4/1985 | Huther et al. |
| 4,514,712 A | 4/1985 | McDougal |
| 4,528,270 A | 7/1985 | Matsunaga |
| 4,531,679 A | 7/1985 | Pagdin |
| 4,536,452 A | 8/1985 | Stempin et al. |
| 4,567,857 A | 2/1986 | Houseman et al. |
| 4,574,037 A | 3/1986 | Samejima et al. |
| 4,677,960 A | 7/1987 | Ward |
| 4,688,538 A | 8/1987 | Ward et al. |
| 4,716,874 A | 1/1988 | Hilliard et al. |
| 4,733,646 A | 3/1988 | Iwasaki |
| 4,736,718 A | 4/1988 | Linder |
| 4,742,265 A | 5/1988 | Giachino et al. |
| 4,760,818 A | 8/1988 | Brooks et al. |
| 4,760,820 A | 8/1988 | Tozzi |
| 4,774,914 A | 10/1988 | Ward |
| 4,774,919 A | 10/1988 | Matsuo et al. |
| 4,830,286 A | 5/1989 | Asslaender et al. |
| 4,834,033 A | 5/1989 | Larsen |
| 4,841,925 A | 6/1989 | Ward |
| 4,922,883 A | 5/1990 | Iwasaki |
| 4,932,263 A | 6/1990 | Wlodarczyk |
| 4,967,708 A | 11/1990 | Linder et al. |
| 4,977,873 A | 12/1990 | Cherry et al. |
| 4,982,708 A | 1/1991 | Stutzenberger |
| 5,034,852 A | 7/1991 | Rosenberg |
| 5,035,360 A | 7/1991 | Green et al. |
| 5,036,669 A | 8/1991 | Earleson et al. |
| 5,055,435 A | 10/1991 | Hamanaka et al. |
| 5,056,496 A | 10/1991 | Morino et al. |
| 5,072,617 A | 12/1991 | Weiss |
| 5,076,223 A | 12/1991 | Harden et al. |
| 5,095,742 A | 3/1992 | James et al. |
| 5,109,817 A | 5/1992 | Cherry |
| 5,131,376 A | 7/1992 | Ward et al. |
| 5,134,982 A | 8/1992 | Hosoi |
| 5,150,682 A | 9/1992 | Magnet |
| 5,193,515 A | 3/1993 | Oota et al. |
| 5,207,208 A | 5/1993 | Ward |
| 5,211,142 A | 5/1993 | Matthews et al. |
| 5,220,901 A | 6/1993 | Morita et al. |
| 5,222,481 A | 6/1993 | Morikawa |
| 5,267,601 A | 12/1993 | Dwivedi |
| 5,297,518 A | 3/1994 | Cherry |
| 5,305,360 A | 4/1994 | Remark et al. |
| 5,328,094 A | 7/1994 | Goetzke et al. |
| 5,343,699 A | 9/1994 | McAlister |
| 5,361,737 A | 11/1994 | Smith et al. |
| 5,377,633 A | 1/1995 | Wakeman |
| 5,390,546 A | 2/1995 | Wlodarczyk |
| 5,392,745 A | 2/1995 | Beck |
| 5,394,838 A | 3/1995 | Chandler |
| 5,394,852 A | 3/1995 | McAlister |
| 5,421,195 A | 6/1995 | Wlodarczyk |
| 5,421,299 A | 6/1995 | Cherry |
| 5,435,286 A | 7/1995 | Carroll, III et al. |
| 5,439,532 A | 8/1995 | Fraas |
| 5,456,241 A | 10/1995 | Ward |
| 5,473,502 A | 12/1995 | Bonavia et al. |
| 5,475,772 A | 12/1995 | Hung et al. |
| 5,497,744 A | 3/1996 | Nagaosa et al. |
| 5,517,961 A | 5/1996 | Ward |
| 5,531,199 A | 7/1996 | Bryant et al. |
| 5,534,781 A | 7/1996 | Lee et al. |
| 5,549,746 A | 8/1996 | Scott et al. |
| 5,568,801 A | 10/1996 | Paterson et al. |
| 5,584,490 A | 12/1996 | Inoue et al. |
| 5,588,299 A | 12/1996 | DeFreitas |
| 5,598,699 A | 2/1997 | Few et al. |
| 5,605,125 A | 2/1997 | Yaoita |
| 5,607,106 A | 3/1997 | Bentz et al. |
| 5,649,507 A | 7/1997 | Gregoire et al. |
| 5,662,389 A | 9/1997 | Truglio et al. |
| 5,676,026 A | 10/1997 | Tsuboi et al. |
| 5,694,761 A | 12/1997 | Griffin, Jr. |
| 5,699,253 A | 12/1997 | Puskorius et al. |
| 5,702,761 A | 12/1997 | DiChiara, Jr. et al. |
| 5,704,321 A | 1/1998 | Suckewer et al. |
| 5,714,680 A | 2/1998 | Taylor et al. |
| 5,715,788 A | 2/1998 | Tarr et al. |
| 5,738,818 A | 4/1998 | Atmur et al. |
| 5,745,615 A | 4/1998 | Atkins et al. |
| 5,746,171 A | 5/1998 | Yaoita |
| 5,767,026 A | 6/1998 | Kondoh et al. |
| 5,769,049 A | 6/1998 | Nytomt et al. |
| 5,797,427 A | 8/1998 | Buescher |
| 5,806,581 A | 9/1998 | Haasch et al. |
| 5,832,906 A | 11/1998 | Douville et al. |
| 5,853,175 A | 12/1998 | Udagawa |
| 5,863,326 A | 1/1999 | Nause et al. |
| 5,876,659 A | 3/1999 | Yasutomi et al. |
| 5,896,842 A | 4/1999 | Abusamra |
| 5,915,272 A | 6/1999 | Foley et al. |
| 5,930,420 A | 7/1999 | Atkins et al. |

(56) References Cited

U.S. PATENT DOCUMENTS

| | | | |
|---|---|---|---|
| 5,941,207 A | 8/1999 | Anderson et al. | |
| 5,975,032 A | 11/1999 | Iwata | |
| 5,975,433 A | 11/1999 | Hasegawa et al. | |
| 5,983,855 A | 11/1999 | Benedikt et al. | |
| 6,015,065 A | 1/2000 | McAlister | |
| 6,017,390 A | 1/2000 | Charych et al. | |
| 6,026,568 A | 2/2000 | Atmur et al. | |
| 6,029,627 A * | 2/2000 | VanDyne | 123/435 |
| 6,029,640 A | 2/2000 | Bengtsson et al. | |
| 6,062,498 A | 5/2000 | Klopfer | |
| 6,065,692 A | 5/2000 | Brinn, Jr. | |
| 6,081,183 A | 6/2000 | Mading et al. | |
| 6,085,990 A | 7/2000 | Augustin | |
| 6,092,501 A | 7/2000 | Matayoshi et al. | |
| 6,092,507 A | 7/2000 | Bauer et al. | |
| 6,093,338 A | 7/2000 | Tani et al. | |
| 6,102,303 A | 8/2000 | Bright et al. | |
| 6,131,607 A | 10/2000 | Cooke | |
| 6,138,639 A | 10/2000 | Hiraya et al. | |
| 6,173,913 B1 | 1/2001 | Shafer et al. | |
| 6,185,355 B1 | 2/2001 | Hung | |
| 6,186,419 B1 | 2/2001 | Kampmann et al. | |
| 6,189,522 B1 | 2/2001 | Moriya | |
| 6,253,728 B1 | 7/2001 | Matayoshi et al. | |
| 6,267,307 B1 | 7/2001 | Pontoppidan | |
| 6,281,976 B1 | 8/2001 | Taylor et al. | |
| 6,335,065 B1 | 1/2002 | Steinlage et al. | |
| 6,338,445 B1 | 1/2002 | Lambert et al. | |
| 6,340,015 B1 | 1/2002 | Benedikt et al. | |
| 6,360,721 B1 | 3/2002 | Schuricht et al. | |
| 6,360,730 B1 | 3/2002 | Koethe | |
| 6,378,485 B2 | 4/2002 | Elliott | |
| 6,386,178 B1 | 5/2002 | Rauch | |
| 6,443,373 B1 | 9/2002 | Portugues | |
| 6,446,597 B1 * | 9/2002 | McAlister | 123/297 |
| 6,453,660 B1 | 9/2002 | Johnson et al. | |
| 6,455,173 B1 | 9/2002 | Marijnissen et al. | |
| 6,478,007 B2 | 11/2002 | Miyashita et al. | |
| 6,483,311 B1 | 11/2002 | Ketterer et al. | |
| 6,485,852 B1 * | 11/2002 | Miller et al. | 429/423 |
| 6,490,391 B1 | 12/2002 | Zhao et al. | |
| 6,501,875 B2 | 12/2002 | Zhao et al. | |
| 6,503,584 B1 | 1/2003 | McAlister | |
| 6,506,336 B1 | 1/2003 | Beall et al. | |
| 6,516,114 B2 | 2/2003 | Zhao et al. | |
| 6,517,011 B1 | 2/2003 | Ayanji et al. | |
| 6,532,315 B1 | 3/2003 | Hung et al. | |
| 6,536,405 B1 | 3/2003 | Rieger et al. | |
| 6,542,663 B1 | 4/2003 | Zhao et al. | |
| 6,543,700 B2 | 4/2003 | Jameson et al. | |
| 6,549,713 B1 | 4/2003 | Pi et al. | |
| 6,556,746 B1 | 4/2003 | Zhao et al. | |
| 6,567,599 B2 | 5/2003 | Hung | |
| 6,568,362 B2 | 5/2003 | Whealton et al. | |
| 6,571,035 B1 | 5/2003 | Pi et al. | |
| 6,578,775 B2 | 6/2003 | Hokao | |
| 6,583,901 B1 | 6/2003 | Hung | |
| 6,584,244 B2 | 6/2003 | Hung | |
| 6,587,239 B1 | 7/2003 | Hung | |
| 6,599,028 B1 | 7/2003 | Shu et al. | |
| 6,615,899 B1 | 9/2003 | Woodward et al. | |
| 6,626,164 B2 | 9/2003 | Hitomi et al. | |
| 6,647,948 B2 | 11/2003 | Kyuuma et al. | |
| 6,663,027 B2 | 12/2003 | Jameson et al. | |
| 6,668,630 B1 | 12/2003 | Kuglin et al. | |
| 6,672,277 B2 | 1/2004 | Yasuoka et al. | |
| 6,687,597 B2 | 2/2004 | Sulatisky et al. | |
| 6,700,306 B2 | 3/2004 | Nakamura et al. | |
| 6,705,274 B2 | 3/2004 | Kubo | |
| 6,712,035 B2 | 3/2004 | Gottemoller et al. | |
| 6,722,340 B1 | 4/2004 | Sukegawa et al. | |
| 6,725,826 B2 | 4/2004 | Esteghlal | |
| 6,745,744 B2 | 6/2004 | Suckewer et al. | |
| 6,748,918 B2 | 6/2004 | Rieger et al. | |
| 6,749,043 B2 | 6/2004 | Brown et al. | |
| 6,756,140 B1 | 6/2004 | McAlister | |
| 6,763,811 B1 | 7/2004 | Tamol, Sr. | |
| 6,772,965 B2 | 8/2004 | Yildirim et al. | |
| 6,776,352 B2 | 8/2004 | Jameson | |
| 6,776,358 B2 | 8/2004 | Arimoto | |
| 6,786,200 B2 | 9/2004 | Viele et al. | |
| 6,796,516 B2 | 9/2004 | Maier et al. | |
| 6,832,472 B2 | 12/2004 | Huang et al. | |
| 6,832,588 B2 | 12/2004 | Herden et al. | |
| 6,841,309 B1 | 1/2005 | Alpay et al. | |
| 6,845,608 B2 | 1/2005 | Klenk et al. | |
| 6,845,920 B2 | 1/2005 | Sato et al. | |
| 6,850,069 B2 | 2/2005 | McQueeney et al. | |
| 6,851,413 B1 | 2/2005 | Tamol, Sr. | |
| 6,854,438 B2 | 2/2005 | Hilger et al. | |
| 6,871,630 B2 | 3/2005 | Herden et al. | |
| 6,881,386 B2 | 4/2005 | Rabinovich et al. | |
| 6,883,490 B2 | 4/2005 | Jayne | |
| 6,883,507 B2 | 4/2005 | Freen | |
| 6,899,076 B2 | 5/2005 | Funaki et al. | |
| 6,904,893 B2 | 6/2005 | Hotta et al. | |
| 6,912,998 B1 | 7/2005 | Rauznitz et al. | |
| 6,925,983 B2 | 8/2005 | Herden et al. | |
| 6,940,213 B1 | 9/2005 | Heinz et al. | |
| 6,954,074 B2 | 10/2005 | Zhu et al. | |
| 6,959,693 B2 | 11/2005 | Oda | |
| 6,976,683 B2 | 12/2005 | Eckert et al. | |
| 6,978,767 B2 | 12/2005 | Bonutti | |
| 6,984,305 B2 | 1/2006 | McAlister | |
| 6,993,960 B2 | 2/2006 | Benson | |
| 6,994,073 B2 * | 2/2006 | Tozzi et al. | 123/298 |
| 7,007,658 B1 | 3/2006 | Cherry et al. | |
| 7,013,863 B2 | 3/2006 | Shiraishi et al. | |
| 7,025,358 B2 | 4/2006 | Ueta et al. | |
| 7,032,845 B2 | 4/2006 | Dantes et al. | |
| 7,070,126 B2 | 7/2006 | Shinogle | |
| 7,073,480 B2 | 7/2006 | Shiraishi et al. | |
| 7,086,376 B2 | 8/2006 | McKay | |
| 7,104,246 B1 | 9/2006 | Gagliano et al. | |
| 7,104,250 B1 | 9/2006 | Yi et al. | |
| 7,121,253 B2 | 10/2006 | Shiraishi et al. | |
| 7,124,964 B2 | 10/2006 | Bui | |
| 7,131,426 B2 | 11/2006 | Ichinose et al. | |
| 7,137,382 B2 | 11/2006 | Zhu et al. | |
| 7,138,046 B2 | 11/2006 | Roychowdhury | |
| 7,140,347 B2 | 11/2006 | Suzuki et al. | |
| 7,198,208 B2 | 4/2007 | Dye et al. | |
| 7,204,133 B2 | 4/2007 | Benson et al. | |
| 7,249,578 B2 | 7/2007 | Fricke et al. | |
| 7,255,290 B2 | 8/2007 | Bright et al. | |
| 7,272,487 B2 | 9/2007 | Christen et al. | |
| 7,275,374 B2 | 10/2007 | Stewart et al. | |
| 7,278,392 B2 | 10/2007 | Zillmer et al. | |
| 7,278,396 B2 | 10/2007 | Leone et al. | |
| 7,284,543 B2 | 10/2007 | Kato et al. | |
| 7,287,492 B2 | 10/2007 | Leone et al. | |
| 7,293,552 B2 | 11/2007 | Leone et al. | |
| 7,302,792 B2 | 12/2007 | Land, III et al. | |
| 7,302,933 B2 | 12/2007 | Kerns | |
| 7,308,889 B2 | 12/2007 | Post et al. | |
| 7,309,029 B2 | 12/2007 | Boecking | |
| 7,340,118 B2 | 3/2008 | Wlodarczyk et al. | |
| 7,357,101 B2 | 4/2008 | Boyarski | |
| 7,367,319 B2 | 5/2008 | Kuo et al. | |
| 7,386,982 B2 | 6/2008 | Runkle et al. | |
| 7,395,146 B2 | 7/2008 | Ueda et al. | |
| 7,404,395 B2 | 7/2008 | Yoshimoto | |
| 7,406,947 B2 | 8/2008 | Lewis et al. | |
| 7,409,929 B2 | 8/2008 | Miyahara et al. | |
| 7,412,966 B2 | 8/2008 | Lewis et al. | |
| 7,418,940 B1 | 9/2008 | Yi et al. | |
| 7,449,034 B2 | 11/2008 | Mikkelsen et al. | |
| 7,481,043 B2 | 1/2009 | Hirata et al. | |
| 7,484,369 B2 | 2/2009 | Myhre | |
| 7,513,222 B2 | 4/2009 | Orlosky | |
| 7,554,250 B2 | 6/2009 | Kadotani et al. | |
| 7,625,531 B1 | 12/2009 | Coates et al. | |
| 7,626,315 B2 | 12/2009 | Nagase | |
| 7,627,416 B2 | 12/2009 | Batenburg et al. | |

(56) References Cited

U.S. PATENT DOCUMENTS

| | | | |
|---|---|---|---|
| 7,628,137 B1 | 12/2009 | McAlister | |
| 7,628,145 B2 | 12/2009 | Ishibashi et al. | |
| 7,650,873 B2 | 1/2010 | Hofbauer et al. | |
| 7,690,352 B2 | 4/2010 | Zhu et al. | |
| 7,703,435 B2 | 4/2010 | Surnilla et al. | |
| 7,703,775 B2 | 4/2010 | Matsushita et al. | |
| 7,707,832 B2 | 5/2010 | Commaret et al. | |
| 7,714,483 B2 | 5/2010 | Hess et al. | |
| 7,721,697 B2 | 5/2010 | Smith et al. | |
| 7,728,489 B2 | 6/2010 | Heinz et al. | |
| 7,775,188 B2 | 8/2010 | Ehrlich | |
| 7,849,833 B2 | 12/2010 | Toyoda | |
| 7,861,696 B2 * | 1/2011 | Lund | 123/525 |
| 7,900,850 B2 | 3/2011 | Zengerle et al. | |
| 7,918,212 B2 | 4/2011 | Verdejo et al. | |
| 8,069,836 B2 | 12/2011 | Ehresman | |
| 8,091,536 B2 | 1/2012 | Munshi et al. | |
| 8,104,444 B2 | 1/2012 | Schultz | |
| 8,132,560 B2 | 3/2012 | Ulrey et al. | |
| 8,147,599 B2 | 4/2012 | Mcalister | |
| 8,192,852 B2 | 6/2012 | Mcalister | |
| 8,240,293 B2 | 8/2012 | Ikeda | |
| 8,267,063 B2 | 9/2012 | McAlister | |
| 8,312,759 B2 | 11/2012 | Mcalister | |
| 8,318,131 B2 | 11/2012 | McAlister | |
| 8,322,325 B2 | 12/2012 | Rogak et al. | |
| 8,371,273 B2 | 2/2013 | Ulrey et al. | |
| 8,414,288 B2 * | 4/2013 | Tzriker | 431/2 |
| 8,416,552 B2 | 4/2013 | Gefter et al. | |
| 8,441,361 B2 | 5/2013 | Mcalister | |
| 8,469,009 B2 | 6/2013 | Munshi et al. | |
| 8,511,259 B2 | 8/2013 | Ambrosini et al. | |
| 8,538,663 B2 | 9/2013 | Jung et al. | |
| 8,561,598 B2 * | 10/2013 | McAlister | 123/541 |
| 8,578,902 B2 | 11/2013 | Permuy et al. | |
| 8,601,819 B2 | 12/2013 | Hammer et al. | |
| 8,747,496 B2 * | 6/2014 | Neels et al. | 48/61 |
| 8,950,182 B2 * | 2/2015 | Roth | 60/605.2 |
| 2002/0017573 A1 | 2/2002 | Sturman | |
| 2002/0070287 A1 | 6/2002 | Jameson et al. | |
| 2002/0084793 A1 | 7/2002 | Hung et al. | |
| 2002/0131171 A1 | 9/2002 | Hung | |
| 2002/0131666 A1 | 9/2002 | Hung et al. | |
| 2002/0131673 A1 | 9/2002 | Hung | |
| 2002/0131674 A1 | 9/2002 | Hung | |
| 2002/0131706 A1 | 9/2002 | Hung | |
| 2002/0131756 A1 | 9/2002 | Hung | |
| 2002/0141692 A1 | 10/2002 | Hung | |
| 2002/0150375 A1 | 10/2002 | Hung et al. | |
| 2002/0151113 A1 | 10/2002 | Hung et al. | |
| 2003/0012985 A1 | 1/2003 | McAlister | |
| 2003/0221949 A1 | 12/2003 | Rabinovich et al. | |
| 2004/0008989 A1 | 1/2004 | Hung | |
| 2004/0084017 A1 | 5/2004 | Viele et al. | |
| 2004/0084026 A1 | 5/2004 | Zhu et al. | |
| 2004/0187847 A1 | 9/2004 | Viele et al. | |
| 2005/0126537 A1 | 6/2005 | Daniels et al. | |
| 2005/0255011 A1 | 11/2005 | Greathouse et al. | |
| 2005/0257776 A1 | 11/2005 | Bonutti | |
| 2006/0005738 A1 | 1/2006 | Kumar | |
| 2006/0005739 A1 | 1/2006 | Kumar | |
| 2006/0016916 A1 | 1/2006 | Petrone et al. | |
| 2006/0037563 A1 | 2/2006 | Raab et al. | |
| 2006/0169244 A1 | 8/2006 | Allen | |
| 2007/0186903 A1 | 8/2007 | Zhu et al. | |
| 2007/0189114 A1 | 8/2007 | Reiner et al. | |
| 2008/0017170 A1 | 1/2008 | Moroi et al. | |
| 2009/0093951 A1 | 4/2009 | McKay et al. | |
| 2009/0101114 A1 | 4/2009 | Czekala et al. | |
| 2010/0077986 A1 | 4/2010 | Chen | |
| 2011/0126548 A1 | 6/2011 | Hammer et al. | |
| 2011/0226988 A1 | 9/2011 | McAlister | |
| 2012/0112620 A1 | 5/2012 | Lykowski et al. | |
| 2012/0180743 A1 | 7/2012 | Burrows et al. | |
| 2012/0199088 A1 | 8/2012 | Burrows et al. | |
| 2012/0210968 A1 | 8/2012 | Burrows et al. | |
| 2013/0149621 A1 | 6/2013 | Mcalister | |

FOREIGN PATENT DOCUMENTS

| | | |
|---|---|---|
| DE | 19731329 C1 | 6/1998 |
| DE | 10356133 A1 | 7/2005 |
| DE | 102006021192 A1 | 11/2007 |
| EP | 392594 A2 | 10/1990 |
| EP | 671555 A1 | 9/1995 |
| GB | 1038490 A | 8/1966 |
| JP | 61-023862 A | 2/1986 |
| JP | 02-259268 A | 10/1990 |
| JP | 08-049623 A | 2/1996 |
| JP | 2004-324613 A | 11/2004 |
| JP | 2009-287549 A | 12/2009 |

OTHER PUBLICATIONS

U.S. Appl. No. 13/844,240, McAlister.

U.S. Appl. No. 13/844,488, McAlister.

International Search Report and Written Opinion for Application No. PCT/US2010/002076; Applicant: McAlister Technologies, LLC.; Date of Mailing: Apr. 29, 2011 (8 pages).

International Search Report and Written Opinion for Application No. PCT/US2010/059147; Applicant: McAlister Technologies, LLC.; Date of Mailing: Aug. 31, 2011, 11 pages.

"Ford DIS/EDIS "Waste Spark" Ignition System." Accessed: Jul. 15, 2010. Printed: Jun. 8, 2011. <http://rockledge.home.comcastnet/~rockledge/RangerPictureGallery/DIS_EDIS.htm>. pp. 1-6.

"P dV's Custom Data Acquisition Systems Capabilities." PdV Consulting. Accessed: Jun. 28, 2010. Printed: May 16, 2011. <http://www.pdvconsult.com/capabilities%20-%20daqsys.html>. pp. 1-10.

"Piston motion equations." Wikipedia, the Free Encyclopedia. Published: Jul. 4, 2010. Accessed: Aug. 7, 2010. Printed: Aug. 7, 2010. <http://en.wikipedia.org/wiki/Dopant>. pp. 1-9.

"Piston Velocity and Acceleration." EPI, Inc. Accessed: Jun. 28, 2010. Printed: May 16, 2011. <http://www.epi-eng.com/piston_engine_technology/piston_velocity_and_acceleration.htm>. pp. 1-3.

"SmartPlugs—Aviation." SmartPlugs.com. Published: Sep. 2000. Accessed: May 31, 2011. <http://www.smartplugs.com/news/aeronews0900.htm>. pp. 1-3.

Birchenough, Arthur G. "A Sustained-arc Ignition System for Internal Combustion Engines." Nasa Technical Memorandum (NASA TM-73833). Lewis Research Center. Nov. 1977. pp. 1-15.

Doggett, William. "Measuring Internal Combustion Engine In-Cylinder Pressure with LabVIEW." National Instruments. Accessed: Jun. 28, 2010. Printed: May 16, 2011. <http://sine.ni.com/cs/app/doc/p/id/cs-217>. pp. 1-2.

Erjavec, Jack. "Automotive Technology: a Systems Approach, vol. 2." Thomson Delmar Learning. Clifton Park, NY. 2005. p. 845.

Hollembeak, Barry. "Automotive Fuels & Emissions." Thomson Delmar Learning. Clifton Park, NY. 2005. p. 298.

InfraTec GmbH. "Evaluation Kit for FPI Detectors | Datasheet—Detector Accessory." 2009. pp. 1-2.

Lewis Research Center. "Fabry-Perot Fiber-Optic Temperature Sensor." NASA Tech Briefs. Published: Jan. 1, 2009. Accessed: May 16, 2011. <http://www.techbriefs.com/content/view/2114/32/>.

Riza et al. "All-Silicon Carbide Hybrid Wireless-Wired Optics Temperature Sensor Network Basic Design Engineering for Power Plant Gas Turbines." International Journal of Optomechatronics, vol. 4, Issue 1. Jan 2010. pp. 1-9.

Riza et al. "Hybrid Wireless-Wired Optical Sensor for Extreme Temperature Measurement in Next Generation Energy Efficient Gas Turbines." Journal of Engineering for Gas Turbines and Power, vol. 132, Issue 5. May 2010. pp. 051601-1-51601-11.

Britt, Robert Roy. "Powerful Solar Storm Could Shut Down U.S. For Months—Science News | Science & Technology | Technology News—FOXNews.com." FoxNews.com, Published: Jan. 2009. Accessed: May 17, 2011. <http://www.foxnews.com/story/0,2933,478024,00.html>. pp. 1-2.

(56) References Cited

OTHER PUBLICATIONS

Brooks, Michael. "Space Storm Alert: 90 Seconds from Catastrophe." NewScientist. Mar. 23, 2009. pp. 1-7.

Hodgin, Rick. "NASA Studies Solar Flare Dangers to Earth-based Technology." TG Daily. Published: Jan. 6, 2009. Accessed: May 17, 2011. <http://www.tgdaily.com/trendwatch/40830-nasa-studies-solar-flare-dangers-to-earth-based-technology>. pp. 1-2.

Pall Corporation, Pall Industrial Hydraulics. Increase Power Output and Reduce Fugitive Emissions by Upgrading Hydrogen Seal Oil System Filtration. 2000. pp. 1-4.

Salib et al. "Role of Parallel Reformable Bonds in the Self-Healing of Cross-Linked Nanogel Particles." Langmuir, vol. 27, Issue 7. 2011. pp. 3991-4003.

International Search Report and Written Opinion for Application No. PCT/US2009/067044; Applicant: McAlister Technologies, LLC.; Date of Mailing: Apr. 14, 2010 (11 pages).

International Search Report and Written Opinion for Application No. PCT/US2010/002080; Applicant: McAlister Technologies, LLC.; Date of Mailing: Jul. 7, 2011 (8 pages).

International Search Report and Written Opinion for Application No. PCT/US2010/054364; Applicant: McAlister Technologies, LLC.; Date of Mailing: Aug. 22, 2011, 8 pages.

Supplementary European Search Report for Application No. EP 10846264.9; Applicant McAlister Technologies, LLC.; Date of Mailin Oct. 2, 2013, 5 pages.

International Search Report and Written Opinion for Application No. PCT/US2011/024778 Applicant: McAlister Technologies, LLC.; Date of Mailing: Sep. 27, 2011 (10 pages).

International Search Report and Written Opinion for Application No. PCT/US2013/069761; Applicant McAlister Technologies, LLC; Date of Mailing: Feb. 24, 2014, 10 pages.

* cited by examiner

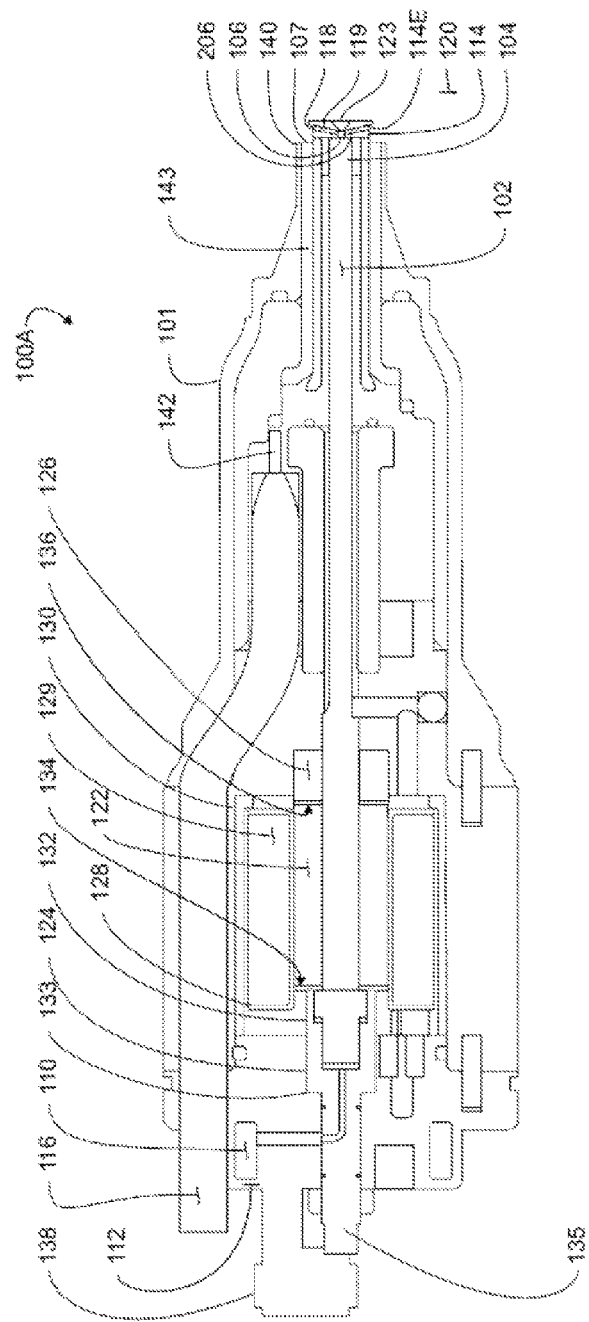

CHEMICAL FUEL CONDITIONING AND ACTIVATION

CROSS-REFERENCE TO RELATED APPLICATION(S)

This patent document claims the priority of U.S. provisional application No. 61/725,456 entitled "PLASMA POWER INJECTOR APPARATUS, METHOD OF MANUFACTURE AND OPERATION" filed on Nov. 12, 2012, the entire disclosure of the application 61/725,456 is incorporated herein by reference for all purposes.

TECHNICAL FIELD

This patent document relates to fuel injection technologies.

BACKGROUND

Fuel injection systems are typically used to inject a fuel spray into an inlet manifold or a combustion chamber of an engine. Fuel injection systems have become the primary fuel delivery system used in automotive engines, having almost completely replaced carburetors since the late 1980s. Fuel injectors used in these fuel injection systems are generally capable of two basic functions. First, they deliver a metered amount of fuel for each inlet stroke of the engine so that a suitable air-fuel ratio can be maintained for the fuel combustion. Second they disperse the fuel to improve the efficiency of the combustion process. Conventional fuel injection systems are typically connected to a pressurized fuel supply, and the fuel can be metered into the combustion chamber by varying the time for which the injectors are open. The fuel can also be dispersed into the combustion chamber by forcing the fuel through a small orifice in the injectors.

For example, diesel fuel is a petrochemical derived from crude oil. It is used to power a wide variety of vehicles and operations. Compared to gasoline, diesel fuel has a higher energy density (e.g., 1 gallon of diesel fuel contains $\sim 155 \times 10^6$ J, while 1 gallon of gasoline contains $\sim 132 \times 10^6$ J). For example, most diesel engines are capable of considerably higher fuel efficiency as a result of operation direct-injection of fuel to produce stratified charge combustion into unthrottled air that has been sufficiently compression heated to provide ignition of diesel fuel droplets, as compared to gasoline engines, which are operated with throttled air and homogeneous charge combustion to accommodate such spark plug ignition related limitations. However, while diesel fuel emits less carbon monoxide than gasoline, it emits for nitrogen based emissions and small particulates that can produce global warming, smog and acid rain along with serious health problems such as emphysema, cancer and cardiovascular diseases.

SUMMARY

Techniques, systems, and devices are described for chemically activating a fuel for injection and ignition in a combustion engine.

In one aspect, a method to initiate combustion includes transforming an interim fuel substance into constituents including at least one of ions or radicals, the interim fuel substance formed by a chemical conversion using a fuel, in which the interim fuel substance has a lower ignition energy than that of the fuel, injecting the constituents into a combustion chamber of an engine, and providing a gaseous fluid including oxidants in the combustion chamber to react with the constituents in a combustion reaction, in which the combustion reaction of the constituents occurs at a reduced energy than that of a combustion reaction of the fuel substance.

In another aspect, a method for using an interim fuel substance to initiate a combustion process includes forming chemically active agents from an interim fuel substance, injecting the chemically active agents into a combustion chamber, the chemically active agents capable of combustion with oxidants at lower fuel-to-air ratios than that of a conventional fuel, and providing a gaseous fluid including the oxidants in the combustion chamber, the oxidants to react with the chemically active agents in a combustion process.

In another aspect, a method to remove chemical deposits includes forming chemically active agents from an interim fuel substance, and accelerating the chemically active agents through a chamber, the chemically active agents capable of reacting with chemical deposits formed on surfaces within the chamber, in which the accelerating the chemically active agents removes at least some of the chemical deposits from the surfaces. In some implementations of the method, for example, the chemical deposits can be formed on the surfaces from combustion processes. In some examples, the chemically active agents can be formed from the interim fuel substances by one or more of changing the pressure within the chamber, introducing heat within the chamber, and/or generating an electric field between electrodes in the chamber to produce an ion current. For example, a Lorentz force can be produced, using the exemplary electrodes, to accelerate the chemically active agents through the chamber, e.g., at a particular distance and velocity. In other examples, the chemically active agents can be accelerated through the chamber by creating a choke flow compression in the chamber. For example, the method can be implemented to remove the chemical deposits in a combustion chamber. Also for example, the method can be implemented to remove the chemical deposits in a flow chamber of a fuel injector interfaced, e.g., which can be interfaced with the combustion chamber, thereby removing the deposits ('cleaning') both chambers.

In another aspect, a system for using a chemical intermediary agent in an engine includes a fuel container to contain a fuel, a respeciation unit fluidically coupled to the fuel container to receive the fuel, the respeciation unit including a reactor vessel to chemically convert the fuel into an interim fuel substance, the interim fuel substance having a lower ignition energy than that of the fuel, and a fuel injection and ignition unit fluidically coupled to the respeciation unit and interfaced at a port of a combustion chamber of an engine, the fuel injection and ignition unit to activate the interim fuel substance into chemically active agents including at least one of ions or radicals, and to inject the chemically active agents into the combustion chamber to initiate combustion, in which the combustion is initiated at a reduced energy than that of a combustion reaction of the fuel.

The subject matter described in this patent document can be implemented in specific ways that provide one or more of the following features. For example, the disclosed technology includes exemplary integrated fuel injection and ignition systems and devices to rapidly deliver and ignite fuel to produce equal or greater energy delivery within an oxidant insulated zone of a combustion chamber. An exemplary integrated fuel injection and ignition system can be operated to increase the penetration (reach much greater distances) of the plasma into a combustion chamber, e.g., in comparison to a spark plug, for many types of plasmas, as well as increase the velocity at which the fuel enters the chamber, e.g., in comparison to a choke flow injector. The exemplary integrated fuel injection and ignition system can be operated to produce a pattern production of a stratified heat release from these exemplary injection and ignition operations.

In some implementations, the integrated fuel injection and ignition systems and devices can include a composite fuel flow valve that is reinforced by selected materials that provide greater strength and resistance to thermal degradation and/or by optical fibers and additional reinforcement fibers. In some implementations, the integrated fuel injection and ignition systems and devices can provide different arrangements of fuel entry angles that compliment or counteract oxidant motion for each fuel burst vector into the combustion chamber, which can adaptively change as a function of adaptive adjustments of the fuel pressure and/or armature stroke changes and/or ion-thrusting. In some implementations, the integrated fuel injection and ignition systems and devices can include a permanent magnet in a bobbin carrier to accelerate the burst cycle and/or to increase armature actuation force. In some implementations, the integrated fuel injection and ignition systems and devices can include a selectively decelerating armature to reduce fatigue stress of the valve assembly, decrease noise, eliminate valve bouncing, and gain smoother fuel accelerations. For example, the disclosed technology allows for accommodation of practical tolerance build up in the exemplary systems and devices including allowance for the various rates of thermal expansion of the assembled components to extend the range of operating temperatures for accommodating cryogenic fuels to hot thermochemical regeneration (TCR) products. In some implementations, the integrated fuel injection and ignition systems and devices can measure and monitor fluid flow, electrode conditions, and combustion chamber events and processes, e.g., from which data and information can be communicated to a controller or processing unit for adaptive timing of fuel injection, ignition, and combustion processes. In some implementations, the integrated fuel injection and ignition systems and devices can produce ignition ions of oxides on both sides of high surface to volume vectors of ionized fuel particles for combustion acceleration. In some implementations, the design of the valve head geometry of the exemplary integrated fuel injection and ignition systems and devices can provide optimized fuel burst characteristics for a range of fuel characteristics, combustion chamber details, and piston speed range of the engine. In some implementations, the integrated fuel injection and ignition systems and devices can provide strain relief through additional strengthening filaments and other high strength fibers, e.g., which may also be used for communication purposes. In some implementations, the integrated fuel injection and ignition systems and devices can provide plasma that include ions produced from the combustion chamber oxidant and thrust into the combustion chamber by thermal expansion or Lorentz acceleration. For example, rotation of plasma provided by magnets which, in conjunction with fuel pressure adjustments, can enable control features such as fuel ion projection patterns. In some implementations, the integrated fuel injection and ignition systems and devices can implement operation of a cleaning cycle during intake, compression, and/or exhaust cycle events. In some implementations, the integrated fuel injection and ignition systems and devices can adaptively adjust the stroke of the fuel control valve and/or the armature to adjust for interchangeable utilization of multiple fuels including unrefined fuels with widely varying properties. In some implementations, the integrated fuel injection and ignition systems and devices can utilize an exemplary lock feature with the valve actuator thruster to adjust the stroke of the injection control valve to control fuel penetration, pattern, air utilization, and combustion characteristics. In some implementations, the integrated fuel injection and ignition systems and devices can provide "air utilization" as rapid and complete oxidation of fuel along with insulation of combustion heat release and expansion to do work in conjunction with expansion of combustion products.

For example, the disclosed technology includes a system for storing, respeciating, and/or converting a fuel into a chemical plasma generation agent. In some implementations, the system can provide for thermochemical regeneration with production of chemical plasma combustants. In some implementations, the system can provide ignition and combustion characterization from one or more chemical plasma generation agents, e.g., including sequentially initiated plasma generators. In some implementations, the system can reduce back pressure in an exhaust system in connection with the system by adaptively operating an expander-compressor that can be driven by expansion of exhaust gases and/or a motor. In some implementations, the system can adaptively change the ignition and/or combustion characteristics of a fuel through the injection of chemical plasma generators, e.g., including, but not limited to, diethyl ether or dimethyl ether, diazene, acetaldehyde, or cyclohexane. For example, one or more chemical plasma generators can be mechanically metered or valved and injected adaptively. In some implementations, the system can combine fuel injection and plasma ignition for plasma or auto-ignition of ether or similar substances to enable selected ignition stimulants or combustion modifiers. In some implementations, the disclosed technology combines the chemical plasma generation system with fuel burst vectors for optimization of oxidant utilization as an insulator and fuel oxidizer. For example, the system can be implemented to combine chemical plasma generation agents with hydrogen or various hydrogen donors such as diazene ($N_2H_4$), ammonia ($NH_3$), or urea ($CO(NH_2)_2$) to enable reduced amounts of such agents to provide greater benefits, e.g., including more rapid completion of all stages of fuel combustion. For example, the system can be implemented to combine chemical plasma generation agents with hydrogen to improve fuel efficiency by greater utilization of chemical fuel potential energy that is gained by thermochemical regeneration. For example, the system can be implemented to combine electrical plasma production, ignition and combustion process acceleration along with the chemical plasma generation agents and hydrogen to improve fuel efficiency by greater utilization of pressure and/or chemical fuel potential energy that is gained by thermochemical regeneration. For example, the system can be implemented to combine one or more chemical plasma generation agents and hydrogen from any source, which may be introduced to combustion chamber by any suitable method including homogeneous charge, stratified charge, and Lorentz accelerated charge.

For example, the chemical plasma generation system and the integrated fuel injection and ignition systems and devices can be implemented to enable adaptive proportioning of electrical and/or chemical plasma combustion processes to reduce the amount work for denser fuel storage and/or electrical energy expended, reduce fuel injection pressure and work required for pressurization of fuel, use less auto-ignition stimulant, increase the number of acceptable fuel types, provide a new cycle of engine operation, benefit by using low grade heat, and have a more rapid start up, greater system readiness, dispatchability, and fail-safe benefits. In some implementations, the chemical plasma generation system and the integrated fuel injection and ignition systems and devices can reversibly change the charge of oxidant ions that are produced and provided for the combustion process compared to fuel ions that are subsequently projected into such oxidant ions.

The disclosed technology can include processes for projecting oxidant and/or fuel ions further into the combustion chamber before combustion processes are completed, e.g., including purposes such as optimizing air utilization efficiency, torque production for particular fuel characteristics, and/or to reduce the rate of heat transfer to components of the combustion chamber near the fuel injector. For example, fuel particle ions of any charge polarity may be injected into non-ionized oxidant within the combustion chamber. For example, oxidant particle ions of a given charge polarity are injected followed by injection of fuel particles of the same charge polarity to produce a combustion pattern and completion of combustion deeper within the combustion chamber. For example, oxidant particle ions of a given charge polarity are injected followed by injection of non-ionized fuel particles to produce a combustion pattern and completion of combustion deeper within the combustion chamber. For example, oxidant particle ions of a given charge polarity are injected followed by injection of fuel particles of the opposite charge polarity to accelerate early production of a combustion pattern and completion of combustion within the combustion chamber.

In some implementations, the integrated fuel injection and ignition systems and devices can optimize the driver disk with respect to factors, e.g., such as fuel pressure, combustion chamber geometry, fuel penetration and combustion pattern, and oxidant utilization efficiency for maximizing the magnetic force and producing the kinetic energy desired for rapid opening of the valve. For example, the valve operator driver disk then becomes a kinetic energy production, storage, and application device for opening the valve along with the magnetic flux path for various additional purposes, including opening the valve, generation of ignition energy, and/or closure of the valve in response to magnetic force from annular permanent or electromagnet. In some implementations, the integrated fuel injection and ignition systems and devices can use flyback energy discharged by the inductor winding to optimize the timing of closure force application and thus quickly develop current in the electro-magnet to produce magnetic force to attract and rapidly close the disk. In some implementations, the integrated fuel injection and ignition systems and devices can use high voltage applied as direct current, pulsed current, or alternating current at high frequencies to create successive Lorentz acceleration of ion or plasmas that are launched into the combustion chamber by one or more electrode sets. In some implementations, the integrated fuel injection and ignition systems and devices can use multiple windings to form multiple bobbin assemblies for shorter heat transfer distances, improved heat removal capabilities, to create attractive force to accelerate armature. For example, the coils can be used to create Lorentz plasma acceleration and ignition events using flyback energy and/or progressive voltage increases.

For example, for the chemical plasma generation fuel agents, the colder particles may be injected through a central nozzle and the hotter particles may thus be injected through one or more surrounding or coaxial nozzles. This can provide swirl energy and optimize engine operations. For example, the disclosed technology can enable optimum air utilization to rapidly initiate and accelerate complete oxidation of fuel along with insulation of the heat released by combustion, and expansion of such insulating air to increase work production in conjunction with the expansion of combustion products. Thus the embodiments disclosed enable the ability to combine: (a) fuel pressure assisted opening of fuel control valve, (b) combustion pressure assisted closing of fuel control valve, (c) pulsed Lorentz force acceleration of ion currents—to produce one or multiple bursts of oxidant and/or fuel ions, (d) combination of multiple fuel control valve openings near top dead center (TDC) and/or during power stroke along with multiple Lorentz bursts to subdivide and accelerate each valve burst, (e) Lorentz acceleration of oxidant and/or fuel ion currents to produce particle burst projections that enter combustion chamber at speeds exceeding speed of sound (e.g., exceeding choked flow Mach 1 limit). For example, the disclosed technology can be implemented to achieve greater work production per combustion energy unit by adaptive pressure and injection timing administration of selected chemical plasma production agents that generate combustion chamber pressure at crank shaft angles that optimize torque delivery throughout the torque-piston speed operational modes ranging from start-up, torque and/or speed recovery, to full power. For example, the disclosed technology can be implemented to achieve greater work production per combustion energy unit of chemical plasma generation agents produced from thermochemically regenerated constituents by adaptive pressure and injection timing administration of selected chemical plasma generation agents that generate combustion chamber pressure at crank shaft angles that optimize torque delivery throughout the torque-piston speed operational modes ranging from start-up to full power.

BRIEF DESCRIPTION OF THE DRAWINGS

FIG. 1A shows a schematic of an exemplary integrated fuel injection and ignition system.

FIG. 1C shows an additional view of the face of an exemplary electrode of the exemplary integrated fuel injection and ignition system.

Like reference symbols and designations in the various drawings indicate like elements.

DETAILED DESCRIPTION

Figure 1B:
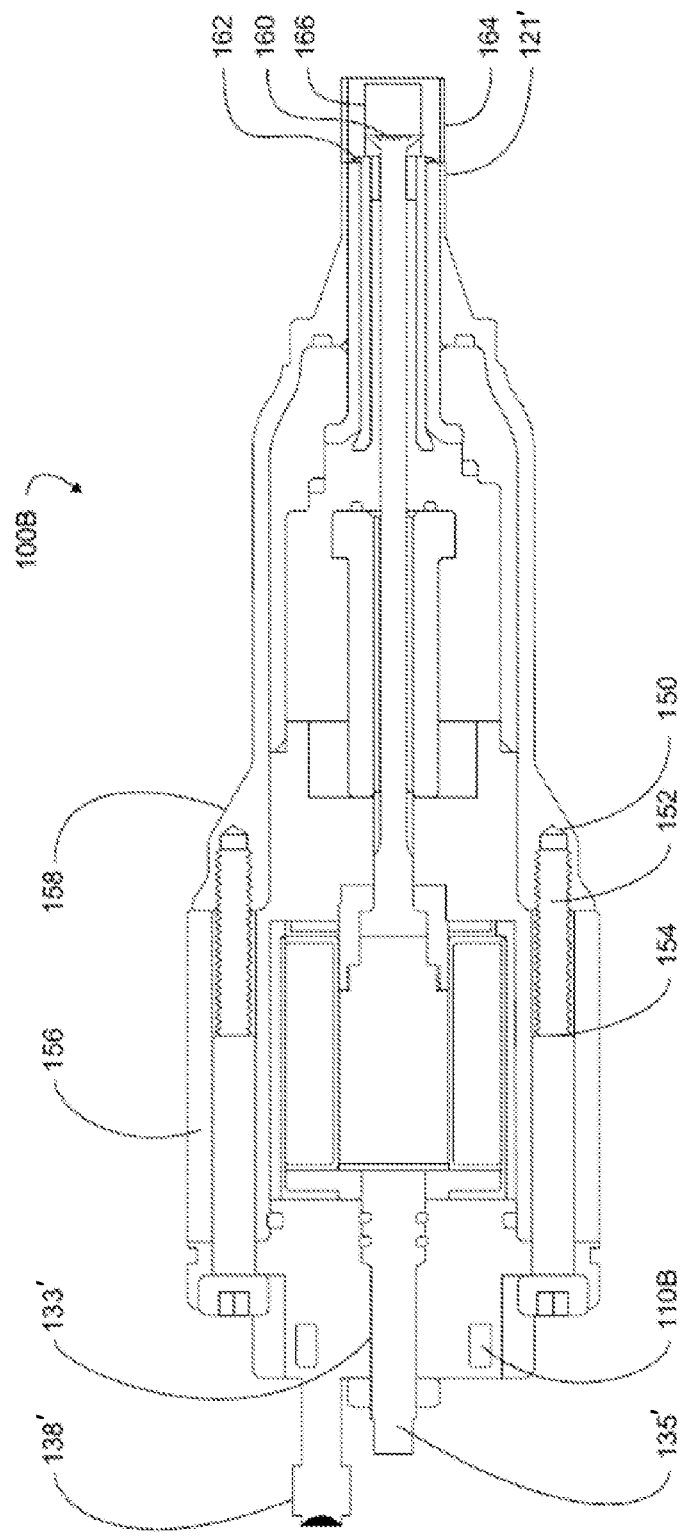
FIG. 1B shows a partial longitudinal section of another embodiment of the integrated fuel injection and ignition system.

Chemical intermediary agents are compounds or mixtures that can produce plasma and stimulate combustion upon interaction with compressed oxidants (e.g., such as oxygen or air) more rapidly and without the delay or objectionable results, e.g., such as formation of particulate emissions that can be typical to diesel fuel injection systems and devices. In some examples, the chemical intermediary agents can be utilized as chemical plasma generation agents that are produced by chemically activating a fuel, in which the chemical plasma generation agents are more easily ionized in fuel injection and ignition systems.

For example, for compression ignition in diesel fuel injection, liquid fuel must be highly pressurized and sheared through very small orifices to produce high velocity droplets of diesel fuel that must first penetrate sufficiently into compression heated air to evaporate and then penetrate further into compression heated air to crack and initiate combustion. Unfortunately, such combustion fails to prevent formation of carbon-rich particulates and oxides of nitrogen to various extents. As described herein, the disclosed technology can overcome many disadvantages in current combustion processes, e.g., including the loss of power resulting from backwork required for pressurization of diesel fuel to high pressures, e.g., such as 20,000 to 30,000 PSI, can eliminate injector damage due to water and/or particulates in the fuel supply, and can enable heat rejected by an engine or fuel cell to be utilized to produce the described chemical plasma generation agents to further improve engine efficiency and reduce or eliminate carbon-rich particulates and oxides of nitrogen along with other objectionable emissions.

Efforts to combine fuel injection and spark ignition purposes into a single device or system have encountered difficulties including ignition problems such as insufficient fuel flow capacity to enable utilization of desirable fuels such as hydrogen, methane, natural gas, producer gas and various other mixtures with hydrogen. For example, such system limitations or failures include utilization of needle valves for intermittent metering of fuel, which can severely restrict or prohibit utilization of many desirable fuel selections, ignition systems, operating pressures, and applications of thermochemically regenerated fuel species. In some examples, if there is a spark ignition glitch or failure, even extremely attractive fuels such as renewable hydrogen, methane, and fuel alcohols or low cost natural gas fail to ignite in high and low compression engines. Depending upon the frequency of such spark ignition glitches or failures, this causes air pollution, poor fuel economy, loss of torque, hesitation, engine deposits, oil contamination, and vibration along with accelerated engine wear and degradation.

The disclosed technology described herein can provide assured ignition, multiple types and many permutations of projected plasma combustion, accelerated processes and faster completion of combustion, less heating of combustion chamber surfaces, greater expansive work per BTU, and more thermochemical regeneration (TCR) energy production to produce more torque, more power, greater fuel economy (i.e., more miles/gasoline gallon equivalent (GGE)) with less expensive fuels (e.g., NG-GDE=⅓ Diesel fuel cost) and greatly reduced or eliminated pollutants, along with higher air-utilization efficiency in operational modes ranging from idle to full power.

Techniques, systems, and devices are described for chemically activating a fuel for injection and ignition in a combustion engine.

In one aspect, the disclosed technology includes exemplary integrated fuel injection and ignition systems and devices to rapidly deliver and ignite fuel to produce equal or greater energy delivery within an oxidant insulated zone of a combustion chamber. An exemplary integrated fuel injection and ignition system can be operated to increase the penetration (reach much greater distances) of the plasma into a combustion chamber, e.g., in comparison to a spark plug, for many types of plasmas, as well as increase the velocity at which the fuel enters the chamber, e.g., in comparison to limitations of a choke flow injector. The exemplary integrated fuel injection and ignition system can be operated to produce a pattern production of a stratified heat release from these exemplary injection and ignition operations.

FIG. 1A shows a schematic of an integrated fuel injection and ignition system 100A that can be implemented for the ionization of intermittently admitted fuel and/or oxidant to greatly accelerate the beginning of combustion and the ensuing oxidation processes, which can provide more rapid completion of combustion within the combustion chamber of a heat engine. For example, the integrated fuel injection and ignition system 100A is structured to include a small spark gap to facilitate initiation of a current, after which the current is thrust off of that site and goes to a larger gap with a much lower electrical impedance. The substantially low electrical impedance can be harnessed by an applied lower voltage to build a high current and total energy delivery to the combustion chamber as ions (e.g., based on the populations of the ions generated). The velocity of the ions is controlled to provide the optimal air utilization, as well as one or more adaptively controlled patterns to provide the optimal air utilization.

The disclosed system 100A can be operated to control the velocity of fuel ions entering the combustion chamber. For example, the system 100A can provide control of parameters that participate in the control of the velocity of the fuel entering the combustion chamber, e.g., such parameters including the control of the pressure drop on the valving of the fuel, and particularly the Lorentz current and field strength. For example, the higher the Lorentz current, the higher the field strength, and the greater the velocity and acceleration, e.g., affecting the profile on the travel of how much terminal velocity can be produced.

In some implementations, the integrated fuel injection and ignition system 100A includes an interchangeable tip (not shown in the schematic of FIG. 1A), which can allow for ease in integration and/or mounting the assembly 100A with a wide variety of combustion engines and enable rapid replacement of a wide variety of conventional fuel injectors, e.g., utilized in direct injection two- or four-stroke diesel engines. For example, this allows conversion of engines that now require diesel fuel to operation on much less expensive and environmentally beneficial fuel selections, e.g., such as hydrogen, methane, fuel alcohols, natural gas, ethane, propane, and producer gas. Such conversion can be performed in about the same time as an engine tune-up. For example, after conversion to operation with the fuel injection and plasma ignition system 100A, fuel selections ranging from very low energy density landfill gas to relatively high energy density crop and animal lipids can be implemented by the system 100A. The exemplary system 100A can utilize such widely varying fuel selections (e.g., some of which provide more than 3,000 times greater energy density than others) to rapidly deliver and ignite the fuel to produce equal or greater energy delivery within an oxidant insulated zone of a combustion chamber.

The integrated fuel injection and ignition system 100A includes a body casing 101 to provide support and structure for at least some components of the assembly 100A. In the exemplary embodiment shown in FIG. 1A, the system 100A includes an electromagnetic fuel control valve operator comprising armature 122 and solenoid winding and bobbin assembly 128. In other implementations, various fuel control valve operators can be utilized, e.g., including, but not limited to pneumatic, hydraulic, magnetostrictive, and piezoelectric fuel control valve operators. Fuel flow is controlled by a composite poppet valve assembly 102 that includes a valve head 104 (e.g., with a poppet face) configured of a suitable material, e.g., such as a stainless steel or super alloy, various reinforcement particles, fibers, and filaments, selected matrix materials such as polyetheretherketone (PEEK), polyamide-imide (Torlon polymer), or thermosetting materials, which may be further composited with material selections that provide greater strength and resistance to thermal degradation where needed, along with optical fibers and additional reinforcement fibers in locations such as fiber bundles 206, 214, and 220, as shown and described in greater detail later in FIGS. 2A, 2B, 2C, and 2D, which comprise a composite valve system like that of the composite valve assembly 102. The composite valve assembly 102 seals the face of poppet head 104 against a valve seat 114 of the assembly 100A that provides a large orifice 106 and connecting passageways 119 through the valve seat 114 to provide a desirable fuel injection pattern by fluid flow through ports 118 into a combustion chamber 120 of an engine. The passageways 119 for connecting ports 118 may be provided at the same or in various different arrangements of entry angles that compliment or counteract oxidant motion for each fuel burst vector into the combustion chamber 120. The composite valve assembly 102 can further serve as a low friction axially reciprocating component to provide the desired frequency of fuel flow bursts through the valve seat 114 and also serve as the axial bearing for supporting the reciprocating motion of the armature 122.

The armature 122 is normally closed by fuel pressure and/or a suitable compression spring, e.g., such as a conical spiral wire form, a spring disk, or an elastomer 124 and/or by attraction to a permanent magnet 126 in a bobbin carrier 130, as shown. Such closure of the armature 122 by the permanent magnet 126 provides infinite fatigue life and overcomes spring resonance problems. The permanent magnet 126 also establishes the poles of the soft magnet armature 122 to accelerate the response and increase the armature force exerted upon actuation by the electromagnetic solenoid winding 128.

Upon actuation of the electromagnetic fuel control valve operator by establishment of current through the magnet wire winding of bobbin assembly 128, the armature 122 is accelerated away from the closed position and is guided along the bearing surface of the composite valve assembly 102 until the armature 122 impacts a lift, e.g., such as band 132, to cause the composite valve assembly 102 to suddenly open and travel axially to open the poppet valve head 104 away from the valve seat 114.

For example, although the armature 122 can serve effectively as a single or multiple stroke or high-frequency slide hammer, in some embodiments it is decelerated at the end of each reciprocating motion by springs, e.g., such as elastomeric compression springs 134 and 136 located in the armature 122 or at the faces adjacent to the armature 122 to reduce the inertia and consequent impact of the valve head 104 against the valve seat 114. Through this exemplary deceleration in relatively small axial travel motion of such compression springs (e.g., such as the exemplary elastomeric compression springs 134 and 136), the composite valve assembly 102 can be guided to close against the valve seat 114 with much less inertia. This greatly reduces the high frequency fatigue stress of the composite valve assembly 102 and the valve seat 114 to provide for an extremely long functional life of the mating assembly. For example, collateral benefits include much quieter operation, elimination of valve bouncing, and smoother fuel accelerations.

In some embodiments, the assembly 100A can utilize the minimal allowed motion of the armature 122 before exerting force on the valve feature (band) 132 as may be needed to accommodate practical tolerance build up in the assembly, e.g., including allowance for the various rates of thermal expansion of the assembled components. In other embodiments, the assembly 100A can provide such accommodations along with a suitable free travel of the armature 122 before exerting force on the valve feature (band) 132 to enable faster cyclic operation and/or utilization of much greater fuel pressures along with greater variations in fuel properties.

Figure 2A:
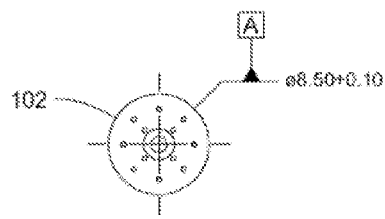
FIGS. 2A and 2B show additional views of selected components of the exemplary integrated fuel injection and ignition system.
Figure 2C:
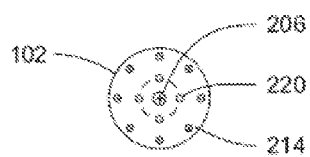
FIG. 2C shows a selected sectional view of an exemplary valve assembly including fiber bundles.
Figure 2B:
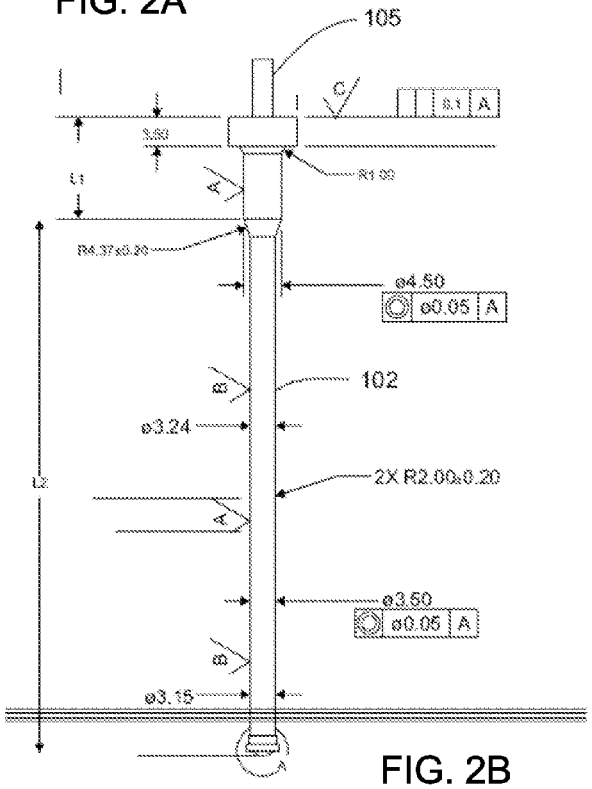
Figure 2D:
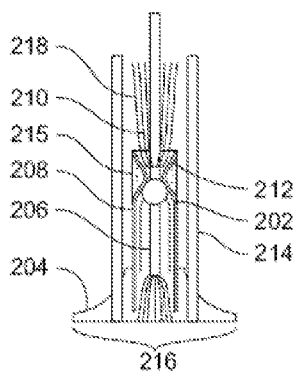
FIGS. 2D-2F shows additional views of selected components of the exemplary integrated fuel injection and ignition system.

FIGS. 2A, 2B, and 2C show different views of the composite valve assembly 102. FIGS. 2A and 2B shows schematic views of the composite valve assembly 102 with exemplary dimensions including length and outer diameter. FIG. 2C shows a cross-sectional view of the composite valve assembly 102 including the fiber bundles 206, 214, and 220. For example, suitable materials can be selected based on particular applications of the composite valve assembly 102, which can include oxidation and corrosion resistant alloys, thermoplastic and thermosetting polymers, fibers, filaments, and various material compositions, e.g., such as silica, alumina, magnesia, zirconia, and silicon nitride. In one exemplary embodiment of the assembly 100A configured for protecting sensors and information relay systems including wireless communication nodes, the assembly 100A utilizes a poppet valve head 204 that can be welded, brazed, swaged, or otherwise attached to a tubular stem 202, as shown in FIG. 2D and described later in further detail.

In some implementations, the fuel injection and ignition system 100A can include instrumentation sensors, e.g., including, but not limited to thermocouples, thermistors, optical temperature sensors, pressure sensors, ion sensors, strain monitors, and accelerometers to measure and monitor fluid flow, electrode conditions, and combustion chamber events and processes at and near the face 216 of the exemplary valve head 204. Information may be conducted from the sensors within the tubular portion (stem) 202 to a suitable filter, amplifier, and communication node for communication to a controller 110, as shown in FIG. 1A, by suitable methods, e.g., including wireless or fiber optic filaments 206. Similarly, filaments and sensors 214 located outside of tubular portion 202 can detect such conditions and events from additional vantage points to enhance the information that is utilized to optimize operations, e.g., including adaptive timing of fuel injection, ignition, and combustion processes.

The terminal end of the fuel injection and ignition system 100A includes a concentric electrode configuration with an outer coaxial electrode 140 configured around an electrode 121 having a plurality of protruding structures and/or tips 114E. The assembly 100A is structured to include an insulator 107 configured along the interior region of the electrode 140, e.g., between the electrode pairs 140 and 121 (with electrode tips 114E). High dielectric ceramic insulator materials, e.g., such as spark plug porcelain along with one or more suitable capacitance discharge facilitating coatings, can be configured on the surface of an insulator.

For example, the coaxial electrode arrangement of the fuel injection and ignition system 100A is configured to be capable of producing a Lorentz thrust, as well as for producing a flat pattern into the combustion chamber with peaks extremely oriented toward a Corona-type discharge in the flat pattern. In some implementations, the system 100A can be operated to perform a pressure delivery without producing the Lorentz thrust, and then be operated to produce a Corona-type production of ions at a distance in such patterns, e.g., achievable based on the electrode configurations.

In operation, pressurized fuel supplied to the fitting 138 is routed through internal passageways to provide cooling of the computer or controller 110 and the bobbin assembly 128, and upon adaptively timed opening of the valve 102, the fuel is injected into the combustion chamber through the ports or slits 118 to produce the desired penetrating pattern of stratified or localized homogeneous charge combustion. In addition, for adaptively controlling fuel pressure and the timing of the valve 102 openings, the computer 110 controls the timing and duration of plasma formation between the central electrode tips 114E of the valve seat assembly 114 and the coaxial electrode zones 140.

As shown in FIG. 1A, the controller 110 provides plasma production by delivery of sufficiently elevated AC or DC voltage through an insulated cable 116 to circuit components of the assembly 100A that includes a conductor tube 142, the tubular valve seat 114 in a conductor 143 including the electrode features 114E and the electrodes 140. For example, the plasma may be any of several types, including, but not limited to, one or multiple sparks, corona, or Lorentz thrust populations of ions. Such plasma may include ions produced from the combustion chamber oxidant and thrust into the combustion chamber by thermal expansion and/or Lorentz acceleration to form a stratified charge of oxidant ions to be overtaken and consumed by subsequent fuel oxidation processes.

Fiber optics including optical sensors that detect the status and progress of events in the respective field of view of fibers in the groups 206 and 214 (as shown in FIGS. 2C and 2D) can be used to monitor the passageways 119, ports 118, electrodes 114E and 140, along with plasma pattern and combustion processes in the combustion chamber 120. Such information is conveyed through the optical fibers extending through a cap 112 to the controller 110 located within the assembly 100A.

Communication and information relayed to and from the controller 110 may be implemented by wireless radio frequency, connected fiber optics that are slightly flexed to allow for valve assembly motion, or by a combination of fiber optics and radiative relays of optical signals across the gaps at interfaces 123 and 124. This allows adjustments of the respective strokes of the armature 122 and the valve assembly 102 by a screw assembly 133 as a result of clockwise or counterclockwise torque application at a head component 135.

In some embodiments, the system 100A includes a magnet winding 129 which can be implemented to produce a desired magnetic force and flux density for providing a transformer. For example, the magnet winding 129 can be configured of any suitable design including one or multiple parallel coil circuits of magnet wire including single or multifilar types. The primary winding may serve as the core of one or more subsequent windings, e.g., including autotransformer connection to minimize leakage inductance of the primary winding. Dielectric films such as polyimide may be used between successive winding layers to prevent short circuits. Such parallel windings effectively provide a line output or flyback transformer and can produce 20 to 50 kV at frequencies of 10 kHz to 60 kHz or higher.

In some embodiments of the integrated fuel injection and ignition system 100A, monitoring of the combustion chamber events and conditions can be performed using a window or heat-resisting lens 123 in the face of the electrode 121, e.g., to allow sensors in the fiber bundle 206 to optically-sense or pressure-sense combustion chamber conditions. FIG. 1C shows an exemplary view of the face of the exemplary electrode 121 including the electrode features 114E and showing the configuration of the window or heat-resisting lens 123. Exemplary materials that can be utilized for the heat-resisting lens 123 can include $Al_2MgO_4$, sapphire ($Al_2O_3$), and quartz ($SiO_2$). Suitable angles for the passageways 119 and the ports 118 can include selections that allow direct or reflected radiation from the combustion chamber 120 to be monitored by the exemplary instrumentation in sensor groups 206 and/or 214. For example, acceleration and pressure sensors in the exemplary fiber bundles 206 and/or 214 can receive pressure and force transmitted through the passageways 119 and the structural components of the assembly 100A.

Earlier initiation and completion of fuel combustion is achieved in instances in which sufficiently high rates of voltage application (high dV/dt) reach sufficient magnitudes along with sufficient AC or DC ionization current magnitudes to cause ionization of particles between each or at least some of the electrode points 114E and the concentric electrode 140. This assures that ignition ions of oxidants are produced on both sides of high surface-to-volume vectors of ionized fuel particles that emit from the ports 118. Options for achieving this type of ion-generation for combustion acceleration can include arrangements for capacitance discharge followed by rapid current increases along with the plasma production. Some examples of such processes are disclosed in U.S. Pat. No. 6,850,069, U.S. Pat. No. 4,122,816, U.S. Pat. No. 3,551,738, U.S. Pat. No. 2,864,974, and U.S. Pat. No. 1,307,088, of which each document is incorporated by reference in its entirety as part of the disclosure in this patent document.

In some implementations, for example, such as in quiescent combustion chamber applications, the fuel flow through the passageways 119 and ports 118 substantially cools the nozzle assembly including electrode tips 114E. In such applications, it is preferable to form a relatively thin cap that is shaped in the exemplary configuration shown in FIG. 1C and control the resulting operating temperature by limiting the areas of otherwise adequate attachment weldments and accordingly the heat transfer to the more heat-sinked adjacent material. This allows such assembled components to secure the capture of the lens 123 and meet the operating temperature specification for optimized ionization, accelerated combustion, and performance.

The exemplary poppet valve head 204 of the tubular system 202 shown in FIG. 2D may have a concave, convex, or other suitable spherical or conical, or flat-face geometry towards the tubular valve seat 114 to provide optimized fuel burst characteristics for the range of fuel characteristics, combustion chamber details, and piston speed range of the engine. As shown in FIG. 2D, the tubular system 202 includes instrumentation and communication fibers and filaments 206 and/ or 214. Additional strengthening filaments, e.g., such as strengthening filaments 218, may be utilized to transmit operating force some of which are locked within swaged formed portion of a tubular stem 212 by a cylindrical sleeve or bead ball 208 and extend past the actuation feature (valve feature band) 132 of the composite valve assembly 102. For example, such high strength filaments 218 are locked by compression between a suitable component such as the cylindrical sleeve or bead ball 208 and the constraining section or "necked" portion of the tubular stem 212 of the tubular system 202. The instrumentation fibers and filaments 206 may be routed through the bore of the sleeve or bead ball 208 to provide additional strain relief and protection. High strength fibers 215 may be utilized to reinforce the constraining or necked zone of the tubular stem 212 to provide much greater support, stress distribution, and hoop-strength of the assembly. The composited assembly may be fitted with a braided filament tubular portion over the instrumentation fibers 214 for additional strength and protection and the tubular portion of bearing surfaces in the valve stem guide zones and armature may have additional tubular layers that utilize magnesium-aluminum-boride, diamond-like carbon, or other friction reduction surfaces.

Figure 2E:
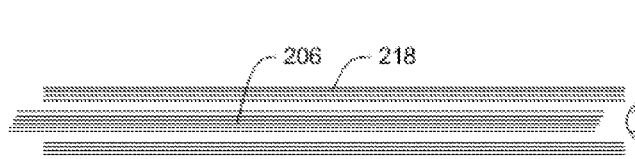
Figure 2F:
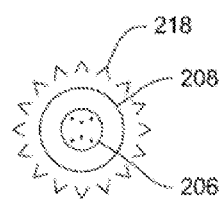

FIGS. 2D, 2E, and 2F show an optional intermediate manufacturing step in which high strength fibers 218 are arranged on a tooling mandrel (not shown) as a tubular assembly that maybe wet formed with a suitable filler matrix such a selected epoxy system to provide a bore diameter to accept the sleeve or bead ball 208. The instrumentation fibers and filaments 206 are placed through the sleeve or bead ball 208 and assembled within the bore of the strengthening fiber tube 218 which is placed within the tubular stem 202. Suitable reforming such as swage forming tubular stem 202 and application of the reinforcing fibers 215 provides a high strength assembly for operation of the poppet valve head 204, along with sensing fuel injection and combustion chamber conditions and locational events, e.g., including temperature, pressure, projected oxidant ionization pattern, fuel burst vectors and ionization, and progressive combustion pattern. Fibers and assemblies of the fiber groups are selected for strength and/or transmissivity of various desired radiation frequencies to monitor and measure combustion chamber events along with other fibers that serve as reinforcement filaments are loaded in the longitudinal passageways such as 206, 214, and 220 and potted in place by subsequent insert molding with suitable material such as thermoplastic or thermoset resins including selections of glass and glass ceramics.

In certain embodiments, for example, such as for the use of difficult fuels including selections encountered for safe disposal of harmful substances that are dissolved in solvents and/or higher temperature operation (e.g., including more-or-less adiabatic engines), powdered silicon nitride and/or silicon is mixed with a suitable lubricant and/or green strength agent. Such mixtures are loaded along with desired reinforcement fibers in a molding system to enable rapid production by compression or injection molding of the desired shape including a suitable pattern of holes such as central longitudinal holes or passageways as shown by FIG. 2A and selected cross-sections in FIGS. 2C and 2D of the composite valve assembly 102. The injection molded silicon valve body is subsequently converted to $Si_3N_4$ in a furnace with a suitable nitrogen-donor atmosphere. The composite structure may receive additional intermittent deposits of silicon or other material selections by chemical vapor deposition, sputtering, or other processes to refine the dimensions, resulting grain sizes and orientations, and/or development of residual stresses such as compressive stresses in surface layers.

In other embodiments, suitable high temperature filaments or light pipes can be loaded in selected passageways such as 206, 214, and/or 220 either at the time of molding in place as composite elements of the green-strength stage or after injection molding the silicon powder to become encapsulated during sintering and/or the conversion of silicon to silicon nitride. In embodiments for applications that require even greater fatigue endurance strength, such fibers and/or light pipes are placed in passageways after the sintering and/or silicon nitride conversion and the resulting assembly is subsequently hot isostatic pressed to provide an extremely dense composite that is free of internal voids or surface blemishes and/or to produce desirable compressive stresses in surface layers.

FIG. 1B shows another embodiment of an integrated fuel injection and ignition system 100B. The exemplary assembly 100B includes an armature 154 which is attached to a cap 150 by a suitable method, e.g., such as a threaded assembly to capture feature 152. The assembly 100B includes a fixed length assembly of a fuel pressure assisted opening and combustion pressure assisted closing of a poppet valve head 160 against a seat 162. Adjustment of the fuel metering valve stroke is provided by screw assembly 133' as a result of clockwise or counterclockwise torque application at head 135' as shown to adjust the location of a permanent magnet 156 of the assembly 100B, which along with an optional compression spring such as conical spring 158 exerts a closing force on the poppet valve 160 to close against the seat 162 to control fuel flow into the combustion chamber.

Various types of fuel ignition including catalytic, hot surface, electrical plasma, and/or auto-ignition agents may be used. Illustratively, one embodiment of the assembly 100B provides ignition of injected fuel that may be adaptively optimized by a controller 110B to provide alternating or direct current plasma between features such as discharge tips 121' which may be similar to the electrode arrangement 121 extending from the outside diameter of the seat 162 and surrounding electrode strips or shroud 164. Continuing application of ionizing current rapidly builds the ion population as it is accelerated along and between concentric electrodes 166 and 164 to produce bursts of ions that are thrust into the combustion chamber at controlled kinetic energy and speeds that are controlled from sub sonic to supersonic magnitudes. The electrodes 164 and 166 may be more or less concentric cylindrical conductors, segmented electrodes of various patterns, or helical wire forms, one or both of which retain sufficient heat to provide hot surface ignition. In some implementations, the electrode arrangement of the system 100B can be configured as a type of Lorentz electrode arrangement more oriented toward a narrower included angle. For example, the current can be sparked based on the configuration from the electrode tips 164, and once the current is established (e.g., the break over is established), then the system 100B can be operated at a very low impedance to build the current to produce a constant or other type controllable field as acceleration out of the annulus into the combustion chamber (e.g., as ionized gas). The valve 160 may be operated one or more times per engine cycle such as to produce multiple fuel bursts near top dead center (TDC) and/or during the power stroke of an engine. Subsequently, for example, each or selected fuel bursts may receive Lorentz accelerations to produce numerous additional fuel ion current bursts that enter the combustion chamber at higher velocities and produce adaptively optimized fuel vectors, surface-to-volume ratios, and accelerated combustion patterns.

Figure 3A:
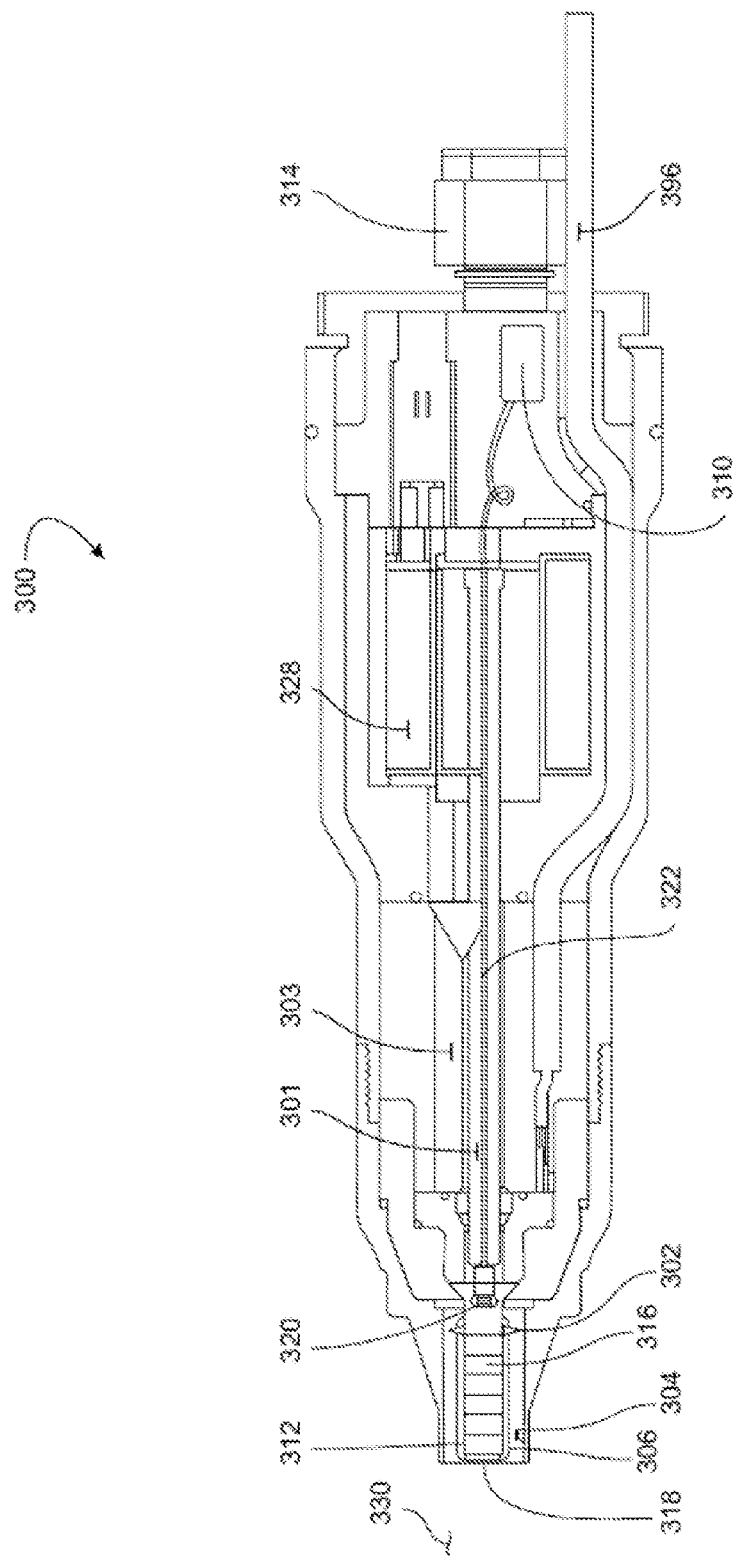
FIG. 3A shows a schematic of another exemplary embodiment of an integrated fuel injection and ignition system.

FIG. 3A shows an embodiment of an integrated fuel injection and ignition system 300 to provide for rotation of plasma as it is thrust toward the combustion chamber and control of fuel ion projection patterns of fuel ion projections into the combustion chamber. The system 300 includes a relatively long annular zone to establish plasma acceleration by Lorentz force after initial ionization of fluid particles in the gap between electrodes 302 and 304. Ignition and/or Lorentz acceleration is provided by application of ionizing electrical energy through cable 396. After such initial ionization, a controller 310, e.g., which can be positioned in a location similar to the controller 110 in the assembly 100A, can control for increased current and the growing population of ions between electrode 306 (with tips 302) and electrode 304 is thus accelerated to the kinetic energy desired for penetration into the compressed oxidant within the combustion chamber 330. For example, fuel flow control may be controlled by a fuel pressure assisted fuel valve opening and/or combustion pressure assisted fuel valve closing, or in the alternative, by a fuel pressure assisted fuel valve closing, such as the valve 301. The terminal end of the fuel injection and ignition system 300 includes a concentric electrode configuration with an outer electrode 304 configured around an inner electrode 306 having a plurality of protruding structures and/or tips 302.

The system 300 includes one or more cylindrical magnets 312 that may be utilized to provide for rotation of the plasma as it is thrust toward the combustion chamber 330. The one or more cylindrical magnets 312 can also be utilized in conjunction with adjustment of the pressure of fuel supplied through a fitting 314, e.g., using the controller 310, to provide additional control features including controlling the fuel ion projection patterns into the combustion chamber 330. For example, this enables the ionization and current pathways to be varied for multiple purposes including supplementing or confronting swirl in the combustion chamber with the angles of entry of the plasma and/or fuel that is injected, minimization or elimination of hot-spots on the electrodes, electrode erosion, and prevention and/or removal of deposits on electrode surfaces. The internal magnets 312 can provide for swirl—radial acceleration used to modify the axial acceleration of Lorentz thrust in the annular region between electrodes 304 and 302 and continuing to the end of the region between electrodes 304 and 306.

In some embodiments, the system 300 includes a magnet winding 328 which can be implemented to produce a desired magnetic force and flux density for providing a transformer. For example, the magnet winding 328 can be configured of any suitable design including one or multiple parallel coil circuits of magnet wire including single or multifilar types. The primary winding may serve as the core of one or more subsequent windings, e.g., including autotransformer connection to minimize leakage inductance of the primary winding. Dielectric films such as polyimide may be used between successive winding layers to prevent short circuits. Such parallel windings effectively provide a line output or flyback transformer and can produce 20 to 50 kV at frequencies of 10 kHz to 60 kHz or higher.

For example, it is particularly advantageous to operate a cleaning cycle for electrodes, orifices, and/or other critical combustion chamber surfaces during the intake or compression events of engine operation. In some implementations, oxidants (e.g., such as air) that enters the annular space between electrodes 302/306 and 304 of the system 300 (or between electrodes 140 and 114E in the system 100A, shown in FIG. 1A), can be used in one or more cleaning cycles by ionizing and thrusting the bursts of highly activated oxidant along the electrode surfaces, orifices, passageways and other critical combustion chamber surfaces to remove or eliminate deposits and particles.

The assembly 300 includes an optical lens or light pipe 316 for monitoring the pattern of oxidant ions and/or fuel projection into the combustion chamber 330 along with processes of combustion. The optical lens/light pipe 316 extends from the face of a sensor array 318 of the assembly 300 to a stationary valve seat 320 to enable certain members of a fiber optic cable group 322 to detect and relay information to the controller 310. This configuration enables a comprehensive surveillance of fuel transfer ports, electrodes, and combustion chamber processes.

Exemplary implementations of the integrated fuel injection and ignition system 300 are described. For example, in some implementations, to assure complete fuel delivery and cleanout of the annular gap between the electrodes 302/306 and the surrounding outer electrode 304, another ionization across the annular gap formed by the electrodes 302 to 304 is provided by the controller 310 at the end of each fuel burst produced by operation of the valve 301. Current is ramped up upon establishment and detection of an ion path of low resistance to greatly accelerate the growing population of ions by Lorentz force to assure that all of the available fuel is launched into the combustion chamber 330. For example, during the subsequent time during the intake and compression strokes of engine operation, additional Lorentz thrusts of air or oxidant ions may be similarly be performed to remove any detected particles or deposits from electrode surfaces and/or other critical components.

In some implementations, closely preceding a Lorentz thrust launch of fuel into the combustion chamber during the power stroke, oxidants (e.g., such as air) may be ionized and thrust into the combustion chamber to produce a stratified charge of ions and/or free radicals. Subsequent thrust of fuel by the delivery pressure, thermal expansion, and application of a higher current to produce greater Lorentz acceleration assures that such oxidant ions are overtaken and consumed by the high velocity fuel combustion process. The timing of each Lorentz thrust and ratio of oxidant acceleration to fuel acceleration provides control of the respective thrust penetrations and pattern of accelerated combustion.

The charge of oxidant ions that are thrust along parallel, twisted or concentric electrodes, e.g., such as the electrodes 304 and 306 of the assembly 300, may be characterized by (+) or (−) as may be distinguished by electron counts that are in excess (−) or reduced (+) as a result of the ionization and plasma generation step. Electrons that are transferred away from such oxidant (+) ions may be provided to fuel particles that become (−) ions. This provides additional attraction and acceleration of combustion processes.

Similarly the charge of oxidant ions that are thrust along the exemplary parallel, twisted or concentric electrodes, e.g., such as the electrodes 304 and 306 of the assembly 300, may be characterized as (−) particles by surplus electron counts. Electrons may be transferred away from fuel to produce (+) particle ions. This also provides additional acceleration of combustion processes.

In some implementations, it is desired to project oxidant and/or fuel ions further into the combustion chamber before combustion processes are completed, e.g., which can enable optimizing torque production for particular fuel characteristics. Also, for example, to reduce the rate of heat transfer to components of the combustion chamber near the fuel injector, the following operational management procedures are effective. For example, fuel particle ions of any charge polarity may be injected into non-ionized oxidant within the combustion chamber; oxidant particle ions of a given charge polarity are injected followed by injection of fuel particles of the same charge polarity to produce a combustion pattern and completion of combustion deeper within the combustion chamber; oxidant particle ions of a given charge polarity are injected followed by injection of non-ionized fuel particles to produce a combustion pattern and completion of combustion deeper within the combustion chamber; and oxidant particle ions of a given charge polarity are injected followed by injection of fuel particles of the opposite charge polarity to accelerate early production of a combustion pattern and completion of combustion within the combustion chamber.

Combustion chamber pressure measurements, e.g., including the pressure magnitudes during processes of oxidant intake, compression, fuel injection, combustion, power production, and exhaust, can be provided by one or more sensors that detect and report information. For example, such information can include strain induced changes in resistance, piezoelectric potential, capacitance, optical transmissivity, optical path length, or other suitable parameter. For example, such information may be suitably filtered, converted, amplified, and delivered by wireless or fiber optic transmission to the controller 310 for adaptive optimization of fuel economy, power production, emission reduction or elimination, and operation throughout the duty cycles of various applications and operations.

In some exemplary embodiments of the assembly 300, the optical signals are conveyed or relayed through the air or other fluid that may be present in the space between the ends of the fiber optic cable group 322 to receiving fibers or lens or reading optoelectronic devices in a receiving relay for delivery of information to the controller 310 of FIG. 3A.

In some exemplary embodiments, the assembly 300 utilizes thermal energy gained from the gases of the combustion chamber including gases that are pressurized and heated during compression and combustion gases that remain within the annular space between the electrodes 304 and 306. For example, such hot gas heating may be added to heat produced in these electrodes by other heating processes, e.g., such as resistance or inductive heating. Thus, fluid fuels can be heated as such fluids pass through the terminal zone heat exchanger. For example, such fuel fluids can include, but are not limited to, hydrogen carbon monoxide, methane, ethane, propane, dimethyl ether, diethyl ether, among others, or mixtures of such fluids. For example, the terminal zone heat exchanger can include a variety of other thermal flywheel components, e.g., such as super-alloy screen scrolls or single-start or multiple-start helical metal or ceramic features 331, shown later in FIG. 3E, that present increased surface exposure, thermal capacity, and extended travel distance for increasing the cyclic heat transfer rate to fuel molecules passing into the combustion chamber. For example, such preheating of the fluid fuel can greatly increase the fuel activation status to accelerate the beginning and completion of combustion. This thermal activation may be employed individually or in conjunction with Lorentz acceleration and/or in conjunction with angular acceleration by one or more magnets, e.g., such as 312 to produce swirl and/or in conjunction with corona ignition and/or in conjunction with spark ignition and/or in conjunction with catalytic ignition and/or in conjunction with chemical plasma ignition.

For example, in exemplary applications of the integrated fuel injection and ignition system 300 in transportation engines, an ignition catalyst (e.g., such as nickel, activated nickel, platinum or platinum black) may be presented at the interface of the electrode 304 and the combustion chamber 330 to serve in combination with such fuel and/or oxidant preheating as an adequate ignition system at idle conditions. Upon acceleration towards cruise conditions, additional ignition impetus can be provided by spark across the electrodes 304 and 306, and then as additional ignition impetus is needed corona discharge is provided in which corona ionization emanates from the electrodes 304 and 306 at the interface of the combustion chamber 330. For example, Lorentz acceleration can provide full power and/or high torque operation, e.g., including modes of operation in conjunction with increased supercharger boost pressure.

For example, in exemplary applications of the integrated fuel injection and ignition system 300 that use multiple unrefined fuel sources, it is desirable to adaptively adjust the stroke of the fuel control valve assembly 301 and/or the armature 303. For example, this can be provided for slide-hammer and fixed connections between the armature and fuel control valve to increase the opportunity to accept fuels with rapidly changing characteristics. Exemplary fuels with such rapidly changing characteristics can include fuels that are based on a combustible substance but that vary from moment to moment in flow, ionization, and/or combustion characteristics due to changes in the temperature and/or content of $H_2O$, $CO$, $CO_2$, $N_2$, $H_2S$, $CH_4$, $C_2H_6$, $C_3H_8$, $C_2H_4$, $C_3H_6$, etc.

Figure 3B:
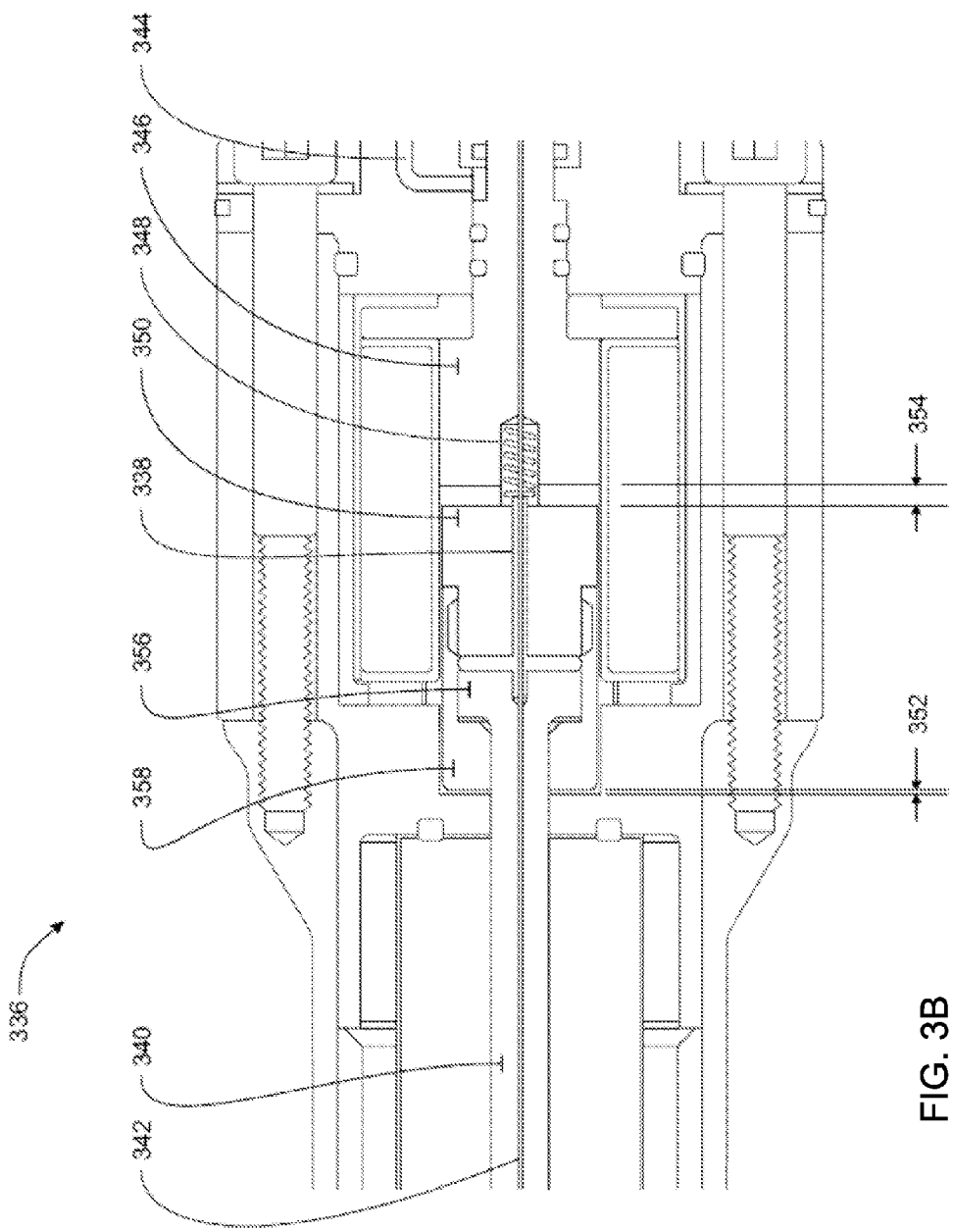
FIGS. 3B-3E show schematics of other exemplary embodiments of the integrated fuel injection and ignition system of FIG. 3A.

FIG. 3B shows a view of a schematic showing components in an exemplary embodiment 336 of the disclosed integrated fuel injection and ignition system. The assembly 336 is configured to provide rapid axial motion adjustment of a fuel metering valve 340 to accommodate rapidly changing selections of fuels with widely changing characteristics. For example, the changing fuels and/or characteristics can include ambient temperature or cryogenic fuels, e.g., such as fuel alcohols, gasoline, methane or hydrogen along with blends of such substances including mixtures of solids, liquids and gases and substances undergoing phase changes, such as slush mixtures of solid, liquid and gaseous phases of fluid fuels that occur as a result of heat addition and pressure adjustments. In operation, combustion is detected and characterized with respect to the penetration and combustion pattern, temperature and pressurization profiles, and oxidant utilization including the timing and magnitude of heat generation and insulation performances. The assembly 336 can include instrumentation such as Fabry-Perot, photo-optical, strain-resistive, capacitive, and/or piezoelectric sensors that relay such information by wireless signals and/or through fibers, e.g., such as optical fiber bundle 342 shown in FIG. 3B to the controller 310 (shown in FIG. 3A), which can adjust the pressure and/or temperature of fluid delivery along with the stroke and open-close frequency of fuel metering valve 340.

For example, the fuel metering valve 340 can be configured to be any suitable type including inwardly or outwardly opening radial, axial sleeve, or poppet types that are actuated by a pneumatic, hydraulic, cam, gear, magnetostrictive, piezoelectric or an electromagnetic driver such as armature 350. In an exemplary embodiment, the armature 350 can include a cap 358 that is supported by the fuel metering valve 340 on bearing pin 338 to provide very low friction axial motion of the armature 350 along the centerline of the valve 340. For example, the bearing pin 338 can be configured like that of a cylindrical feature 105 of the composite valve assembly 102 shown in FIG. 2B or a ceramic valve, or the bearing pin 338 can be configured from a suitable metal alloy such as Type 440C stainless steel that is brazed or otherwise fastened to the fuel metering valve 340.

In operation, for example, stroke adjustment can be rapidly accomplished by adjustment of the position of pole piece 346. The pole piece 346 may be positioned by any suitable mechanism or force, e.g., including force produced by pressure applied through hydraulic circuit passageway 344 to cause axial adjustment of the pole piece 346 and thus the stroke of the armature 350. For example, a relatively low pressure in the hydraulic circuit passageway 344 allows activation of the armature 350 to force the pole piece 346 outward and increase a gap 354. Conversely, for example, a relatively higher pressure in the hydraulic circuit passageway 344 forces the pole piece 346 inward to close the gap 354.

Activation of the armature 350 enables considerable kinetic energy to be gained during acceleration as it traverses gap 352 towards the pole piece 346. For example, upon closing the gap 352 by the armature cap 358, e.g., with feature 356 of the fuel metering valve 340, the kinetic energy of the armature 350 and the cap 358 is applied to rapidly do work by opening the valve 340 to the adjusted extent of gap 354 to allow fuel flow through the valve seat and to the combustion chamber. This type of kinetic energy generation and application for operation of the fuel metering valve 340 provides rapid production of fuel bursts, e.g., which may be further delineated into a multitude of additional bursts by rapid application of Lorentz acceleration cycles. This may be adaptively accomplished in conjunction with adaptive fuel pressure adjustments to optimize utilization of slow burning fuels, e.g., such as liquid bio-lipids and/or gaseous methane interchangeably with rapid burning fuels such as hydrogen including many other fuel selections with widely varying viscosity and energy-density values.

Figure 3C:
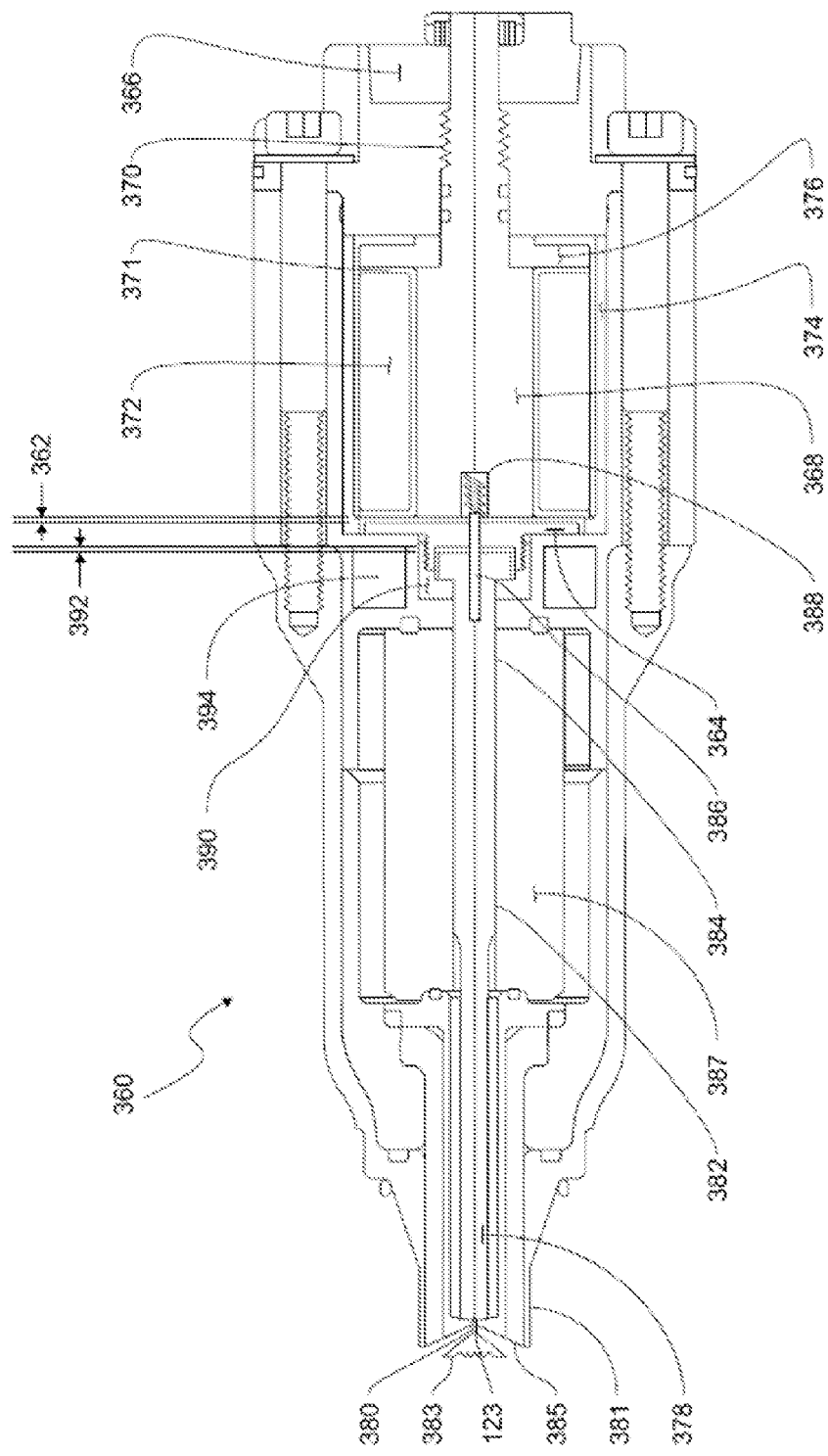

FIG. 3C shows an embodiment of a fuel control valve driver system 360 for production of a wide spectrum of fuel projection angles and/or extremely high surface to volume fuel bursts. Implementations of the fuel control valve driver system 360 can provide rapid development of kinetic energy that is transferred to enable high frequency valve opening and closing cycles, e.g., including "flutter" operation, which can controllably produce the wide spectrum of fuel projection angles and/or extremely high surface to volume fuel bursts. The system 360 includes a fuel control valve 378 to provide the high frequency opening and closing cycles. The system 360 includes a disk driver 364 that can produce an overall axial stroke 362, which can be adjusted by any suitable method including manual application of torque by a hex key or wrench or a suitable motor, e.g., such as motor 366 as shown in FIG. 3C. The disk driver 364 can be configured as a disk with one or more cylindrical features, e.g., such as annular barbs or the threaded portion to which a cap 390 is attached. For example, additionally or alternatively, the disk driver 364 may have another cylindrical feature that extends into the bore of a bobbin 374 to define the gap 362 at another desired location within the bore of the bobbin 374. For example, the motor 366 may include suitable gears or another speed reduction method to produce satisfactory torque and cause rotation of a pole piece 368 and thus axial advancement or retraction according to the final rotational speed and pitch of a threaded stem section 370 as shown. Such operation may be synergistically combined with the valve driver stroke adjustment system 400 shown later in FIG. 4A.

The system 360 includes a magnet winding 372 to produce the desired magnetic force and flux density for providing a line output or flyback transformer. For example, the magnet winding 372 can be configured of any suitable design including one or multiple parallel coil circuits of magnet wire including single or multifilar types. The magnet winding 372 can produce a desired magnetic force and flux density in the pole piece 368 (e.g., which can be configured as a soft iron alloy pole piece) and in the face of the disk driver 364 that is most proximate to the magnet winding 372 and the pole piece 368. A bobbin 371 and/or the pole piece 368 may be formed of or incorporate ferrite material to enable higher frequency operation. The primary winding may serve as the core of one or more subsequent windings, e.g., including autotransformer connection to minimize leakage inductance of the primary winding. Dielectric films such as polyimide may be used between successive winding layers to prevent short circuits. Such parallel windings effectively provide a line output or flyback transformer and can produce 20 to 50 kV at frequencies of 10 kHz to 60 kHz or higher.

The system 360 includes a controller or computer, e.g., like that of the controller 110 of the system 100A or the controller 310 of the system 300, which initially provides a high current in the magnet windings 372 to accelerate the armature or disk 364, which may be a ferromagnetic or permanent magnet material and develops sufficient kinetic energy to rapidly open the valve 378. For example, an alternative construction of the armature 364 can include the combination of a permanent magnet with a ferromagnetic material. For example, illustratively, the armature or disk 364 may be a permanent magnet that is brazed or otherwise fastened to a ferromagnetic core.

In operation, for example, after the valve 378 starts to open, the magnetic energy required to keep it open greatly diminishes. In some implementations, the magnetic energy can be supplied by high frequency pulse width modulation, which provides flyback transformer voltage and frequency. For example, such voltage and frequency may be utilized to produce Lorentz plasma thrusting of oxidant and/or fuel particles into the combustion chamber, along with other applications including energization of an annular magnet 394 of the system 300 (e.g., such as a permanent magnet or an electromagnet) to accelerate the closure of the valve driver disk 364 and thus the valve 378.

For example, efficient containment of the magnetic flux can be provided by selections of ferrites and/or other soft magnetic materials for field strength flux shaping by formed cup or sleeve component of the bobbin 374, stationary disk 376, the cylindrical pole piece 368, and movable flux collection and valve operator disk 364. The geometry, diameter and effective flux path thickness of the driver disk 364 can be optimized with respect to factors such as fuel pressure, combustion chamber geometry, fuel penetration and combustion pattern, and oxidant utilization efficiency. For example, these factors can be optimized for maximizing the magnetic force and producing the kinetic energy desired for rapid opening of the valve 378 as the disk driver 364 moves freely moves through distance 392 allowed by the cap 390 until the valve 378 is engaged to be rapidly opened to the remaining adjustable allowance distance 362 as shown in FIG. 3C.

The valve operator driver 364 thus becomes a kinetic energy production, storage, and application device for opening the valve 378 along with the magnetic flux path for various additional purposes, e.g., including opening valve 378, generation of ignition energy, and/or closure of the valve 378 in response to magnetic force from the annular permanent or electromagnet 394. Therefore, for example, the major outside diameter of the valve driver disk 364 may range from about the diameter of the pole piece bobbin 374 to the diameter of the stationary disk 376, and accordingly the thickness may vary as needed to be an efficient pathway for magnetic flux and production of desired kinetic energy particularly during acceleration in the stroke portion 392. Accordingly, the geometry and dimensions of the flux cup of the bobbin 374 follow the dimensions of the driver disk 364 to provide the most efficient flux path.

The valve 378 is guided along the centerline of orifice 380 by suitable axial motion bearing zones such as 382 and 384 in ceramic insulator 387. This provides the valve driver disk 364 with low-friction centerline guidance along stem 386. For example, the stem 386 may be a cylindrical feature such as the cylindrical feature 105 of the composite valve assembly 102 as shown in FIGS. 2A, 2B, and 2C. Or, in some examples, the stem 386 may be a sleeve that is welded or brazed in place, as shown in FIG. 3C. A compression spring 388 and/or the electro-magnet or permanent magnet 394 in the annular zone can provide rapid return of the driver disk 364, e.g., along with the cap 390 and the valve 378 to the normally closed position to seal the valve 378 against the orifice 380.

The system 360 includes a conical electrode 385 that extends inward from a cylindrical electrode 381 to form an expanding annular gap with an electrode 383. A wide array of fuel injection and/or plasma spray patterns are produced as a result of the controller of the system 360 provided variations of fuel pressure, opening distances of the distances 392, 362, and/or the distances 362/392 of the valve 378, along with the frequency and current density of plasma generation in the gap between the electrodes 383 and 385. The system 360 can include instrumentation such as optical, capacitance, strain, piezoelectric, magnetostrictive or other devices for measurements of temperature, pressure, particle projection vectors, combustion pattern, etc. Such information are provided or transmitted to the controller by a sensor array of the system 360, e.g., like that of the sensor arrays 123 or 216 or 318 previously shown in other embodiments.

In some embodiments, the system 360 can utilize an electromagnet or combination of a permanent magnet and an electromagnet in the zone (shown in FIG. 3C as the annular zone with the magnet 394). In such exemplary embodiments, the "flyback energy" discharged by the inductor winding 372 may be utilized directly or through a capacitor to optimize the timing of closure force application and thus quickly develop current in the electromagnet 394 to produce magnetic force to attract and rapidly close disk 388. Similarly, for example, high voltage may be applied as direct current, pulsed current or alternating current at high frequencies to create successive Lorentz acceleration of ion or plasmas that are launched into the combustion chamber by the electrodes 383/385, or other electrode sets described in other embodiments of the integrated fuel injection and ignition system disclosed in this patent document, such as electrodes 166-164; 302/306-304; 685-686; and 772-774.

Figure 3D:
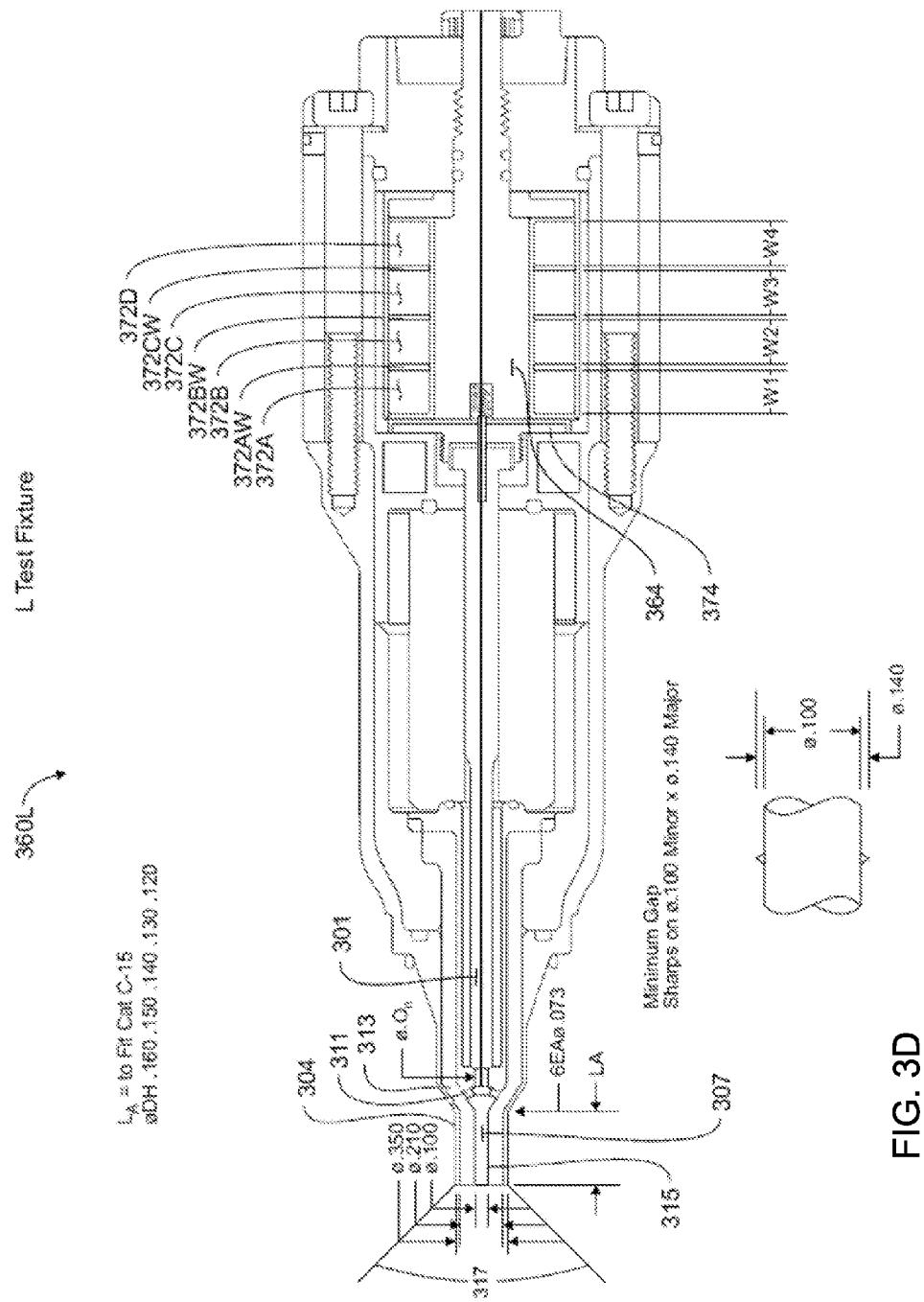

FIG. 3D shows a schematic of another embodiment of a fuel injection and ignition system 360L that utilizes multiple windings of magnet wire to form multiple bobbin assemblies such as illustrated with four electromagnetic windings 372A, 372B, 372C, and 372D. Bobbin designs that may be selected for such purposes include bobbins that provide shorter heat transfer distances for coil generated heat along with improved heat removal capabilities to and through the coil defining walls including 372AW, 372BW, 372CW and the use of high thermal conductivity materials, e.g., including, but not limited to, graphite, graphite composites AlN, BeO, various metals, and metal-filled composites for manufacturing such bobbins. Additional cooling can be provided by flow of fluid such as fuel over and/or between coils. For example, the product of the number of turns and the current "ampere-turns" is the absolute magnetic flux for magnetizing the pole piece 374 opposite to armature 364 to create attractive force that accelerates armature 364. Heating makes the coil resistance greater and reduces ampere turns. For example, because of resistance losses, the ampere turns is limited to the temperature rise allowed in the coil. For example, other embodiments of the system 360L can include windings with a selected number "N" of individual coils 372A through 372N, which may be operated by numerous methods and combinations, e.g., including application of suitable voltage to any of the windings or to series connection of two, three, four, or more windings and/or voltage may be applied simultaneously to selections of two, three, four or more windings in parallel to produce the desired force and performance by electromagnetic attraction of the armature 364. Such windings may be with multiple side by side magnet wires, stacked in layers, or separated, as shown in FIG. 3D for individual coils.

In some embodiments of the integrated fuel injection and ignition system disclosed in this patent document, cooling of the surfaces of components defining cavity zones, e.g., such as within electrodes 164, 304, 383, or 313 (shown in FIG. 3E), is provided by the fuels and/or coolant fluids that are accelerated through such zones. This greatly extends electrode life. Additionally, system longevity can be provided by such cooling to enable extended life by coating such electrode surfaces with substances including, but not limited to, various glass metals, aluminum or alloys that contain aluminum and/or chromium that reduce or eliminate erosion. Similarly, cooling of solenoid or magnetostrictive windings can be accomplished in some embodiments of the integrated fuel injection and ignition system disclosed in this patent document by providing for fuel and/or coolant to circulate over, through, or between the magnet windings, e.g., such as magnet windings 129, 328, 372, 372A, 372B, 372C, 372D, 428, 625, or 726.

Electromagnetic force "F" on the armature 364 is produced by current "I" windings with "n" turns and where "g" is the gap between the pole piece core 374 with area "A" facing the armature and is approximately found by Equation A:

$$F = \frac{I^2 n^2 A}{g^2 C} \quad \text{(Eq. A)}$$

In Equation A, C is a constant that accounts for the component and assembly geometries along with the magnetic properties of the materials selected. In many applications, for example, such as in the small "well" between intake and exhaust valves of an overhead valve engine head assembly, the space available for electromagnet windings can be severely limited.

For example, the disclosed embodiments of the integrated fuel injection and ignition system can provide considerable advantages for parallel current operation of multiple windings in any given space within which the assembly must fit. In various embodiments, the winding "turns" build and widths of closely packed windings $W_1$, $W_2$, $W_3$, $W_4$ and so forth to $W_N$ are un-equal, whereas in other embodiments, some or all such widths are equal.

For example, compared to a single winding with a selected magnet wire of a given length, two parallel equal width, full turns build would each be about 50% shorter and have about 50% of the resistance; three equal length windings would be about 66% shorter and have about 33% of the resistance; and four equal length windings would be about 75% shorter and have about 25% of the resistance. For example, by slight adjustments of the winding turns, each of the equal width W combinations could be operated with parallel currents to have about the same total number of turns n as a single winding.

For example, as the ampere turns increases, the magnetic domain alignments within the pole piece 374 increases until a limit is reached. Saturation is the condition in which additional ampere turns of magnetizing field H cannot increase the domain alignments and thus the net pole strength of the electromagnet assembly of the pole piece 374 and the magnet windings, e.g., such as 372A, 372B, 372C, and/or 372D.

However, as long as the exemplary system is operated below magnetic saturation limits of the materials selected, the force F is proportional to the current squared. Accordingly, the sum of parallel currents in two coils would be two times the magnitude of the single winding (2 I), and the force F would be four times higher. Similarly, the sum of parallel currents in three coils would be three times the magnitude of the single winding (3 I), and the force F would be nine times higher. Similarly, the sum of parallel currents in four coils would be four times the magnitude of the single winding (4 I), and the force F would be sixteen times higher. In alternative instances, for example, in which the system is operated at the magnetic saturation limit, such limit would be reached much more rapidly and the speed of operation of the armature 364 would increase accordingly.

Therefore for the same force F production, the space required for the windings can be greatly reduced by operation of multiple parallel current windings. The size of the resulting electromagnet with equal force production can be reduced by a smaller outside diameter and/or by a shorter length of the assembly. In some exemplary embodiments of the integrated fuel injection and ignition system for implementation in other applications, the size of the electromagnet assembly can be reduced by various other combinations of multiple windings, diameter, length, and magnet wire selections.

In another embodiment of the integrated fuel injection and ignition system, a number of windings can be operated momentarily in parallel to rapidly accelerate the armature 364 to open the valve 301 after which one of the windings can be selected for operation by an energy saving cycle such as with pulse width and/or frequency modulation to hold the valve open. This greatly reduces the heat generated in the coil assembly and enables much more rapid removal of such heat to the fuel flowing through the system or to the environment.

In other embodiments, the magnet wire size selections and/or the number of windings per coil in multiple winding assemblies can be varied to meet requirements of certain applications. For example, a particularly advantageous system can utilize all of the coils to initially accelerate the valve 301 to the open position followed by application of the flyback energy from the one or more coils to at least partially create the Lorentz plasma acceleration and ignition events provided by the electrodes 304 and 307 and/or to be pulsed with current to produce inductive energy that is coupled by transformer principles to generate higher voltages for such purposes.

The present integrated fuel injection and ignition system 360L can offer many advantages, including, but not limited to, the following. For example, it is faster, much less difficult, and less expensive to manufacture and stack two or more windings (e.g., the magnet windings 372A, 372B, 372C, 372D, etc.) than to simultaneously wind two or more adjacent wires in the same space as $W_1+W_2+W_3+W_4$, etc. For example, it is highly advantageous to develop the same magnitude of n with a fraction of the resistance to enable correspondingly higher total ampere turns and very large improvements in performance. For example, it is beneficial to improve the thermal dissipation and heat removal capability for reducing the operating temperature of coil windings by reducing the distance of heat conduction pathways including separators of multiple windings. For example, in certain applications it is advantageous to utilize fuel, coolant, and/or other fluid flow through and/or between adjacent coils to remove heat and for such heat to be gained in the fluid for greater fuel combustion efficiency and/or direct injection during the power stroke to perform work or in the exhaust stroke to perform work in another expander such as a turbocharger or turbogenerator. For example, it is advantageous for such fluid flow to be arranged in various suitable ways including axial and/or radial from the inside outward and/or from the outside of the coils inward to orifices that direct flow into the passageway and circuit to the combustion chamber. For example, in certain embodiments of the integrated fuel injection and ignition system 360L, fluid flow past the valve 301 is directed to one or more tangential entry pathways 311 into a relatively large radius circumferential zone of annular space 313 which provides delivery to the combustion chamber, e.g., in injection zone 317 of the combustion chamber, through reduced radius of gyration annular space 315. Fluids tangentially entering the annular space 313 including plasma that may be formed by chemical agent activation and/or by electrical energy thus produce angular momentum and swirl that is accelerated by flow through the reduced radius of gyration annular space 315 as shown. Upon exiting the orifice of the reduced radius of gyration annular space 315 at the combustion chamber, fluid rays continue in straight lines to produce a fan of penetration vectors that express axial and radial velocity magnitudes into the combustion chamber. Such penetration vectors may be pulsed at a frequency and exit velocity magnitude that is adaptively enhanced or reduced by the application of ionizing energy in the zone 315, e.g., such as electrical and/or chemical and/or thermal ionization at a desired pulse frequency.

Figure 3E:
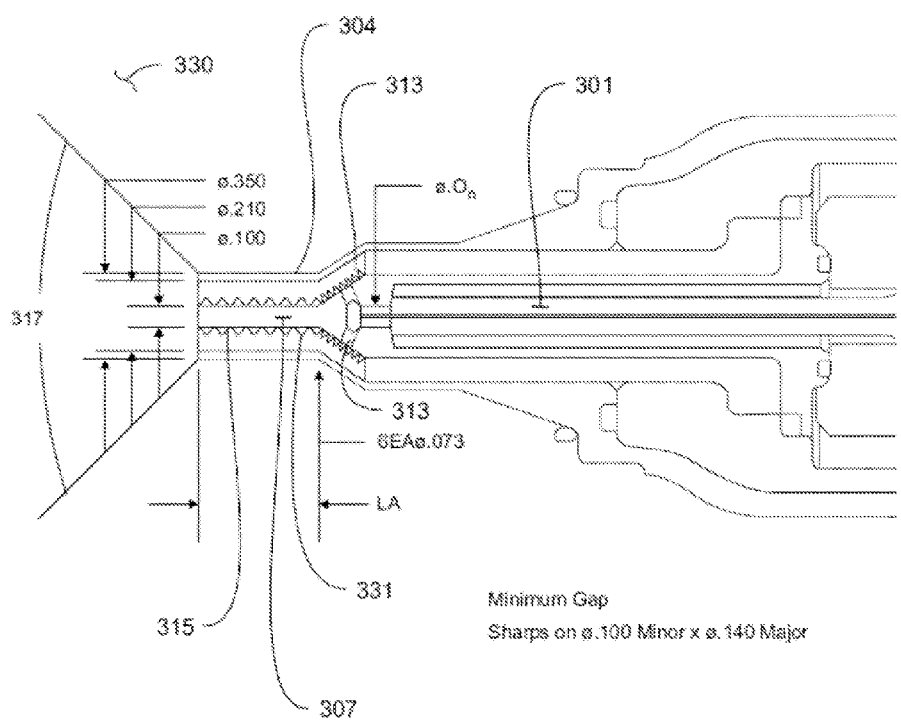

FIG. 3E shows a magnified view of the end of the integrated fuel injection and ignition system 360L interfaced with the combustion chamber 330. The assembly 360L includes exemplary super-alloy screen scrolls or single-start or multiple-start helical metal or ceramic features 331 in the annular space 313, e.g., to present increased surface exposure, thermal capacity, and extended travel distance for increasing the cyclic heat transfer rate to fuel molecules passing into the combustion chamber 330.

Figure 4A:
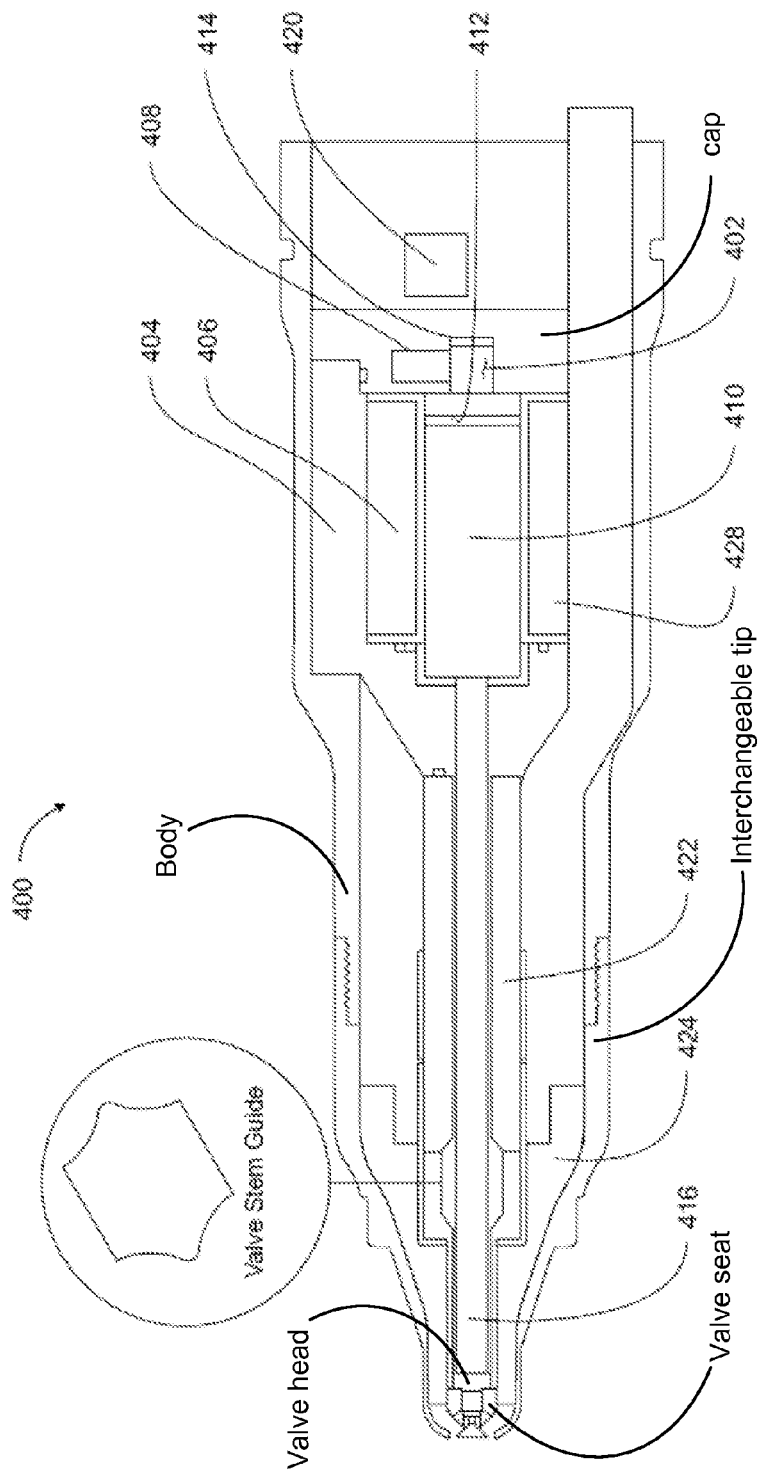
FIG. 4A shows a schematic of another exemplary embodiment of an integrated fuel injection and ignition system.

FIG. 4A shows another embodiment of an integrated fuel injection and ignition system 400 having an adjustable stroke assembly. The system 400 may utilize various mechanisms, e.g., including a pneumatic actuator, hydraulic actuator, electromagnetic actuator, or magnetostrictive actuator, or screw thread, to advance or retract the space allowed for armature 410 and/or fuel control valve 416 to stroke. The adjustable stroke system is applicable to the embodiments previously described, e.g., such as the integrated fuel injection and ignition system embodiments shown in FIGS. 1A, 1B, and 3A or 3B, along with various other valve operator arrangements.

In the exemplary embodiment shown in FIG. 4A, the stroke is adjusted by the force exerted by the armature 410 and/or the valve 416 upon face 412 of stop 402 when a suitable actuator, e.g., such as a magnetostrictive or piezoelectric component 408, is actuated to contract and relax the normally applied prestress thrust that normally locks the stop 402 in the desired axial position. Actuation of the actuator 408 to relax the side thrust enables the force exerted against the face 412 by the armature 410 to move the stop 402 against a compressive spring 414 and lengthen the stroke to the desired magnitude at which moment, the exemplary piezoelectric actuator 408 is allowed to return to the prestressed normally locked position.

For example, shortening the adjustable valve stroke can be accomplished when the armature 410 and/or the valve 416 is in or moving toward the normally closed position to shut-off fuel flow. Relaxation of the position locking force exerted by the exemplary piezoelectric actuator 408 allows the compressive spring 414 to force the stop 402 closer to the armature 410 and thus shorten the allowed stroke for the valve 416 and/or the armature 410, as shown.

For example, the electrical energy required to actuate the magnetostrictive or piezoelectric actuator component 408 may be provided by any suitable source, e.g., including utilization of the fly-back energy that is discharged by the inductive field established by the magnetic coil of a bobbin 406 at the end of each actuation and/or as may be produced by pulsing current through the coil 406 or another inductor. Storage of such energy by a battery and/or capacitor, which may be located in an insulator component 422 and/or 424, and suitable electrical energy conditioning and coordinated switching to rapidly perform the desired stroke adjustments, are adaptively provided by a controller 420 of the system 400, e.g., which can operate in a manner similar to that of the controllers 110 or 210 previously described.

Adaptive utilization of the valve actuation system to power and interactively adjust the valve motion and thus the magnitude, injection penetration, and pattern of fuel bursts provides control of the combustion process and oxidant utilization in the combustion chamber. Such controls are rapidly achieved to optimize interchangeable use of fuel selections that may vary widely from liquid lipids to hydrogen. This enables optimum "air utilization" to rapidly initiate and accelerate complete oxidation of fuel along with insulation of the heat released by combustion, and expansion of such insulating air to increase work production in conjunction with the expansion of combustion products.

For example, it is particularly advantageous to apply the force and motion of an armature (e.g., such as the armatures 350 or 410 of their respective systems) to rapidly adjust the stroke of the fuel metering valve 340 or 416. Illustratively, for example, during a period such as the power stroke of an engine, the travel of valves (e.g., such as the valves 340 or 416 of their respective systems) can quickly be adjusted during the course of one or more rapid valve actuation cycles to provide optimized fuel flow requirements that vary with fuel selection type, energy density, viscosity, pressure, and temperature.

Figure 4B:
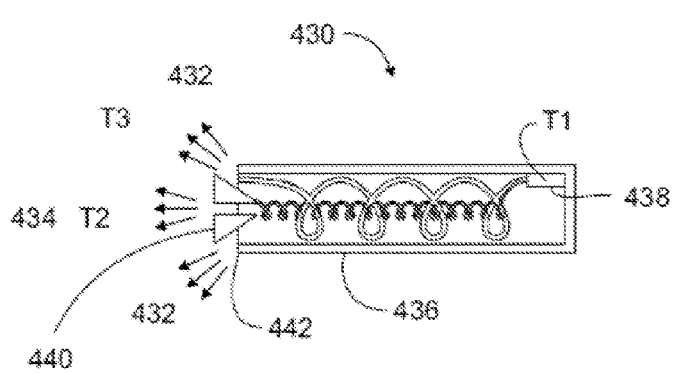
FIGS. 4B-4D show schematics of other exemplary embodiments of the integrated fuel injection and ignition system of FIG. 4A.

FIG. 4B shows a schematic of an exemplary embodiment of an injection nozzle 430. The injection nozzle can be attached to the integrated fuel injection and ignition system 400 or other disclosed injection/ignition assemblies at the interface with the combustion chamber. The injection nozzle 430 provides vortex accelerated separation of particles 432 at elevated temperature and cooled fuel particles 434 through a chamber 436 of the nozzle 430 as a result of the Ranque-Hilsch vortex tube separation influence. Penetration distances to the completion of combustion for such thermally separated fuel flows are dependent on the viscosity and mass of the particles along with the injection pressure gradient and the shapes of the nozzles through which the two separated flows are injected into the combustion chamber.

Illustratively, for chemical plasma generation fuel agents, for example, the colder particles may be injected through a central nozzle and the hotter particles may thus be injected through one or more surrounding or coaxial nozzles. A population of fuel particles at an initial temperature T1 is introduced upon opening of the valve 416 to tangentially enter the chamber 436 by one or more asymmetric orifices or slots 438 to provide swirl energy as the fuel particles progress through the chamber 436 to release a colder flow of particles 434 at an average fuel injection temperature T2 and the mass balance of hotter particles 432 at an average temperature T3 (e.g., T3>T1>T2). The injection nozzle 430 can include a nozzle system 440 that may be of any suitable geometry to provide passage of separated flows of the hotter particles 432 at temperature T3 and the colder particles 434 at temperature T2, as shown. The injection nozzle 430 may be fixed to provide constant flow area, or pressure articulated from a normally open or closed position with respect to orifice 442 and/or mechanically linked to the motion of the valve 416. Adaptive adjustment of such nozzle functions enables a wide array of responses to optimize engine operations.

Figure 4C:
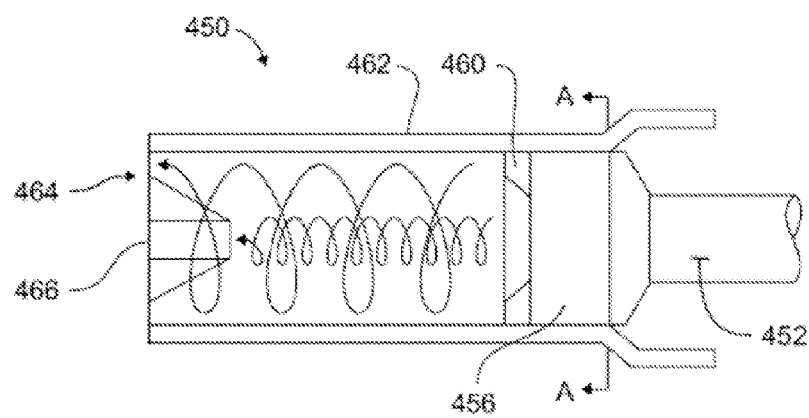
Figure 4D:
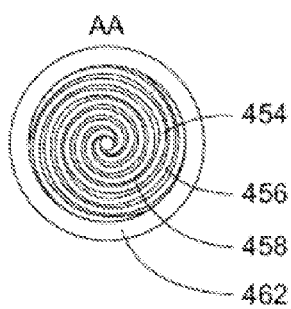

FIGS. 4C and 4D shows views of a schematic of another embodiment of an injection nozzle 450 and method for inducing tangential entry and swirl of initial populations of fuel particles. For example, upon opening of the fuel control valve 416, one or more orifices 460 of the nozzle 450 allow flow through conduits 452 into one or more helical slots to produce swirl through conduits 454, 456, 458, etc., within shroud 462, as shown in the cross section view of the injection nozzle 450 in FIG. 4D, for swirl accelerated separation of hot particles that exit through outlet 464 and cold particles that exit through outlet 466, as shown in the view of the injection nozzle 450 in FIG. 4C.

For example, in such arrangements the colder fuel particles penetrate greater distance to initiate and complete combustion compared to the penetration distances to initiate and complete combustion by hotter particles. Adaptive adjustments of such operations enable various benefits, e.g., including optimization of oxidant utilization in each characteristic combustion chamber geometry as a combustant that is insulated by surplus oxidant, rapid adjustment of torque production to meet load changes and optimization of the oxidant utilization efficiency including production of work by surplus oxidant.

Similarly, for example, for electrically driven cold or hot plasma ignition and fuel particle acceleration and combustion, either nozzle path may be selected to further adjust the respective penetration distances of hot and cold fuel particles for purposes such as optimizing oxidant utilization efficiency for particular combustion chamber geometries and piston speeds. This enables application in a wide variety of load characteristics, duty cycles, combustion chamber designs and operational modes.

An ignition and/or Lorentz acceleration system, such as those shown in FIGS. 1A, 1B, 3A, and 3C, is provided by application of ionizing electrical energy through cable (e.g., such as the cable 396 as shown in FIG. 3A) and/or through internal connection from a flyback transformer (e.g., such as that of the transformer 372). Alternative electrode configurations, such as shown in FIGS. 1B, 3C and 4B, enable virtually any combustion chamber geometry to receive optimized fuel distribution and air utilization for maximum break mean effective pressure development.

Disclosed are chemical intermediary fuel substances having a lower ignition energy than a traditional fuel. Also disclosed are systems, devices, and methods to fabricate and implement the chemical intermediary fuel substances.

In some implementations, the disclosed chemical intermediary fuel substances are produced from conventional fuels directly using the described systems, devices, and methods. For example, such conventional fuels include, but are not limited to, fuel alcohols (e.g., methanol, ethanol, etc.), methane, natural gas, butane, propane, gasoline, diesel fuel, ammonia, urea, nitrogen, and hydrogen. The disclosed chemical intermediary fuel substances can function as an interim fuel substance capable of being activated to be utilized as a fuel agent, cleaning agent, and other described functions. For example, the chemical intermediary fuel substances can be produced from the conventional fuel in the form of a chemical plasma generation agent, (e.g., also referred to in this patent document as chemical plasma generators, plasma generators, combustion accelerators, or autoigniters). For example, by converting a traditional fuel to an interim fuel substance, a new chemical substance is formed with endothermic energy built in as chemical fuel potential energy. The disclosed chemical intermediary fuel substances possess a lower minimum ignition energy than the fuel substances from which they were derived. Minimum ignition energy (MIE) is the minimum amount of energy required to ignite a combustible vapor, gas, plasma or other phase of a fuel substance, for example, by means of a heat and/or an electrical discharge. For example, ignition of a fuel/air mixture is possible when the rate of liberation of heat near the ignition zone is greater than the heat loss by conduction.

The disclosed chemical intermediary fuel substances are generally less stable than traditional fuels for selected reactions, e.g., including combustion reactions. The disclosed chemical intermediary fuel substances can be used as an interim fuel substance to initiate combustion at much lower temperatures than that of a conventional fuel. For example, the interim fuel substance can be triggered to generate 'chemically active agents', e.g., which can be derived from constituents of the interim fuel substance and include ions and/or radicals. In some examples, the generation of the chemically active agents can be triggered by gathering an amount of heat energy (e.g., upon pressurized injection into a combustion chamber of an engine), which is generally far less than the amount of heat energy required to combust a fuel with the same oxidant. In some examples, the generation of the chemically active agents can be triggered by producing an ion current (e.g., in which the chemically active agents function as plasma agents).

The chemically active agents (e.g., formed ions and/or radicals) are even less stable than the chemical intermediary fuel substances (interim fuel substances). For example, in the combustion chamber, the formed radicals function as initiators of oxidation with oxidants (e.g., supplied from intake air) at a much lower amount of energy (e.g., heat and/or electrical energy from a spark). In some implementations, the interim fuel substances can be transformed into the chemically active agents to initiate combustion, in which a heat release from such combustion can further provide necessary heat to combust other substances, e.g., of a higher MIE than the previously combustion agents. In such exemplary implementations, the secondary and subsequent combustion agents can include other chemically active agents (e.g., with a higher MIE) or even a conventional fuel, based on the amount of heat generated in the exemplary cascaded combustion sequence. Thus, for example, the disclosed chemical intermediary fuel substances can be used as auto-igniters and/or combustion modifiers. For example, the chemical intermediary fuel substances can function as chemical activators to induce plasma generation (e.g., in a fuel injection and/or ignition system) and to control the pattern of heat release. In this regard, adaptive control of the density of the chemical activators, the surface to volume ratio of the chemical activators, the pattern of distribution of the chemical activators, and/or the velocity of injected entry of the chemical activators into compression heated oxidants enable production of stratified heat release, improved oxidant utilization efficiency and optimized brake mean effective pressure by the host engine.

In one aspect, a method to initiate combustion includes transforming an interim fuel substance into constituents including at least one of ions or radicals, the interim fuel substance formed by a chemical conversion using a fuel, in which the interim fuel substance has a lower ignition energy than that of the fuel, injecting the constituents into a combustion chamber of an engine, and providing a gaseous fluid including oxidants in the combustion chamber to react with the constituents in a combustion reaction, in which the combustion reaction of the constituents occurs at a reduced energy than that of a combustion reaction of the fuel substance.

In another aspect, a method for using an interim fuel substance to initiate a combustion process includes forming chemically active agents from an interim fuel substance, injecting the chemically active agents into a combustion chamber, the chemically active agents capable of combustion with oxidants at lower fuel-to-air ratios than that of a conventional fuel, and providing a gaseous fluid including the oxidants in the combustion chamber, the oxidants to react with the chemically active agents in a combustion process.

In another aspect, a method to remove chemical deposits includes forming chemically active agents from an interim fuel substance, and accelerating the chemically active agents through a chamber, the chemically active agents capable of reacting with chemical deposits formed on surfaces within the chamber, in which the accelerating the chemically active agents removes at least some of the chemical deposits from the surfaces. In some implementations of the method, for example, the chemical deposits can be formed on the surfaces from combustion processes. In some examples, the chemically active agents can be formed from the interim fuel substances by one or more of changing the pressure within the chamber, introducing heat within the chamber, and/or generating an electric field between electrodes in the chamber to produce an ion current. For example, a Lorentz force can be produced, using the exemplary electrodes, to accelerate the chemically active agents through the chamber, e.g., at a particular distance and velocity. In other examples, the chemically active agents can be accelerated through the chamber by creating a choke flow compression in the chamber. For example, the method can be implemented to remove the chemical deposits in a combustion chamber. Also for example, the method can be implemented to remove the chemical deposits in a flow chamber of a fuel injector interfaced, e.g., which can be interfaced with the combustion chamber, thereby removing the deposits ('cleaning') both chambers.

In another aspect, a system for using a chemical intermediary agent in an engine includes a fuel container to contain a fuel, a respeciation unit fluidically coupled to the fuel container to receive the fuel, the respeciation unit including a reactor vessel to chemically convert the fuel into an interim fuel substance, the interim fuel substance having a lower ignition energy than that of the fuel, and a fuel injection and ignition unit fluidically coupled to the respeciation unit and interfaced at a port of a combustion chamber of an engine, the fuel injection and ignition unit to activate the interim fuel substance into chemically active agents including radicals, and to inject the chemically active agents into the combustion chamber to initiate combustion, in which the combustion is initiated at a reduced energy than that of a combustion reaction of the fuel.

Exemplary chemical intermediary fuel substances include, but are not limited to, N-ethylcarbazole, decahydronaphthalene, perhydro-4,7-phenanthroline, diazene ($N_2H_4$), acetylene ($C_2H_2$), acetaldehyde ($CH_3CHO$), cyclohexane ($C_6H_{12}$), dimethyl ether (DME) ($CH_3OCH_3$), and diethyl ether (DEE) ($C_2H_5OC_2H_5$). The disclosed technology provides the ability to produce the exemplary chemical intermediary fuel substances as desired or in on-demand applications by additive and/or subtractive hydrogenation, respeciation, and/or regenerative thermochemical conversion of fuels, e.g., such as producer gas constituents (e.g., $CO+H_2$), methanol, ethanol, ammonia and other selections.

In some implementations, for example, an ether such as DME or DEE can be made by controlled temperature dehydration of an alcohol, which can be accomplished by accompaniment with an acid (e.g., such as concentrated sulfuric acid) for respeciation of methanol or ethanol as shown in Equations 1 and 2, respectively.

$$2CH_3OH \rightarrow CH_3OCH_3 + H_2O \quad \text{(Eq. 1)}$$

$$C_2H_5OH \rightarrow C_2H_5OC_2H_5 + H_2O \quad \text{(Eq. 2)}$$

Alternatively, for example, chemical intermediary fuel substances such as DME can be produced from thermochemical regeneration (TCR) reactor products such as carbon monoxide and hydrogen as shown in Equation 3.

$$2CO + 4H_2 \rightarrow CH_3OCH_3 + H_2O \quad \text{(Eq. 3)}$$

Figure 5:
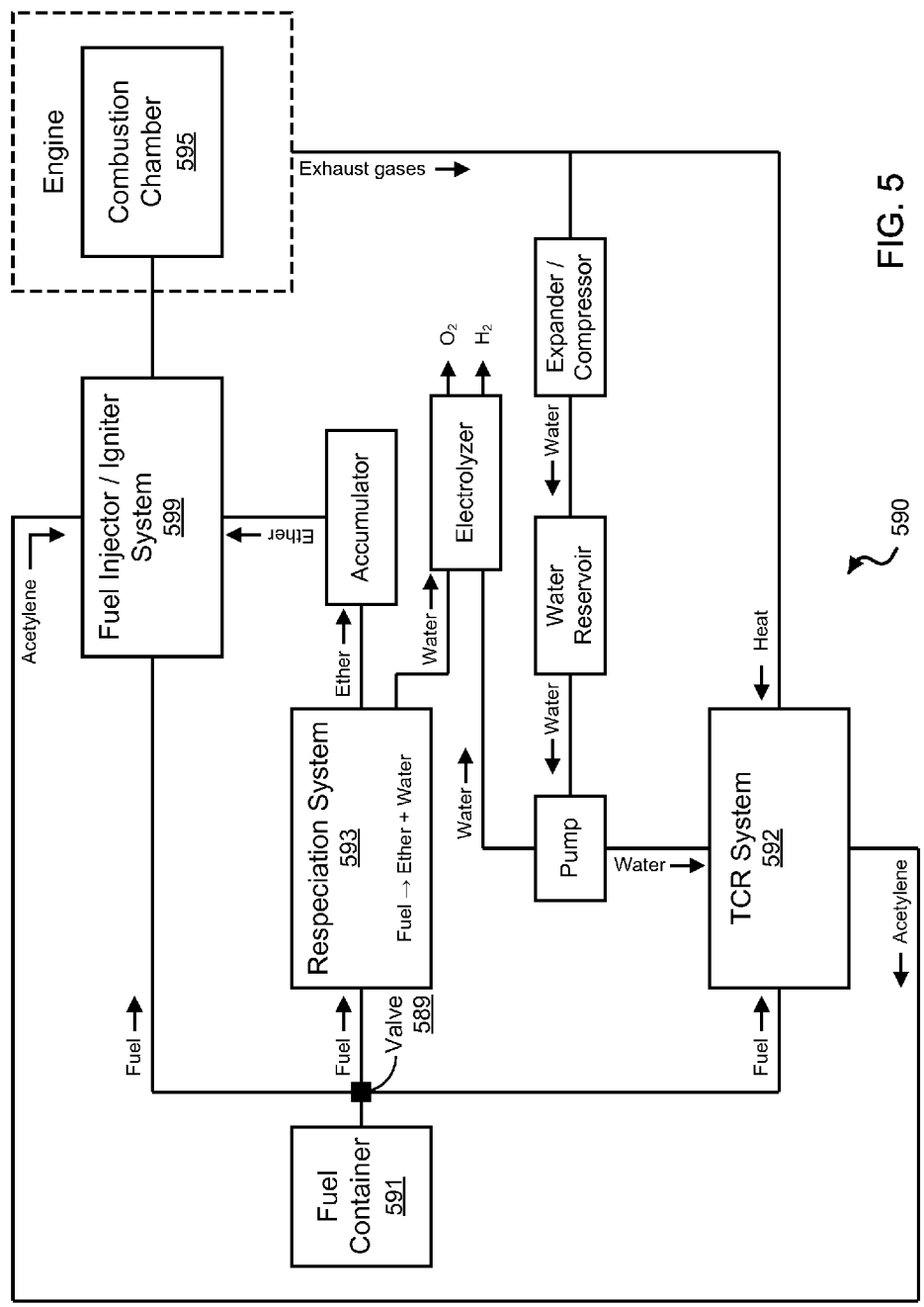
FIG. 5 shows a block diagram of an exemplary system for storing, respeciating, and/or converting a fuel into a chemical plasma generation agent.

FIG. 5 shows a block diagram of a system 590 for producing one or more interim fuel substances (e.g., chemical plasma generation agents) using at least one of respeciation or thermochemical regeneration conversion. The system 590 includes a fuel container 591 to store a fuel, e.g., a conventional fuel. The system 590 includes a respeciation system 593 to respeciate a fuel into a chemical plasma generator, e.g., such as an ether in this example (e.g., such as DEE and DME), and water. The fuel can be provided to the respeciation system 593 from the fuel container 591. The produced chemical plasma generator can be supplied to a fuel injector and/or igniter system 599. The fuel injector and/or igniter system 599 can be interfaced with a combustion chamber 595 of an engine. In some implementations, the fuel injector and/or igniter system 599 can be implemented to transform the chemical plasma generator to a chemically active agent and thrust the chemically active agent into the combustion chamber 595 to initiate combustion, e.g., with oxidants present in the combustion chamber 595. In some implementations, the fuel injector and/or igniter system 599 can be implemented to inject a substance (e.g., such as the chemical plasma generator and/or the fuel) into the combustion chamber 595 with or without providing transformation or ignition of the substance. For example, the chemical plasma generator supplied to the fuel injector and/or igniter system 599 can be used as an auto-igniter and/or combustion modifier in combustion reactions in the combustion chamber 595. Examples of the fuel injector and/or igniter system 599 include, but are not limited to, the devices 100A, 100B, 300, 360, 360L, 400, and other such devices described in this patent document and described in the incorporated references incorporated as part of this disclosure. The fuel can also be directly provided to the fuel injector and/or igniter system 599, e.g., using a valve 589 to control the supply of fuel to the fuel injector and/or igniter system 599 and the respeciation system 593.

In some implementations, the system 590 can include an electrolyzer to convert water into oxygen and hydrogen, which can be routed back into the system 590 for use as feedstock in respeciation and/or thermochemical regeneration reactions. In some implementations of the system 590, the water produced in respeciation of the chemical plasma generator (e.g., ether) can be filtered and accumulated, e.g., which can be utilized for other purposes including providing an oxygen donor in thermochemical regeneration conversion reactions.

The system 590 includes a thermochemical regeneration (TCR) system 592 that converts a fuel into a chemical plasma generator, e.g., such as acetylene in this example, which can also be routed to supply the exemplary fuel injector and/or igniter system 599 and used as an auto-igniter and/or combustion modifier in combustion reactions with the combustion chamber 595. In some implementations, the TCR system 592 can receive the fuel from the fuel container 591. Other reactants used in thermochemical regeneration can be supplied from a variety of sources. In some implementations, exhaust gases from the engine can be supplied to the TCR system 592. In some implementations, water can be extracted from the exhaust gases using an expander-compressor system (described later in further detail), which can be stored in a water reservoir and routed to the TCR system 592, e.g., via a pump. In some examples, the water stored in the water reservoir can also be supplied to the exemplary electrolyzer to produce oxygen and hydrogen.

The fuel injector and/or igniter system 599 is configured in the system 590 to receive the chemical plasma generation agents (e.g., from the respeciation system 593 and/or the TCR system 592) and/or the fuel (e.g., from the fuel container 591). The chemical plasma generation agents chemically stimulate a type of plasma generation to form chemically active agents (chemical plasma constituents) including ions and/or free radicals, e.g., in a manner which is different than that of plasma produced by ionizing the fuel to form ionized fuel particles. In some examples, the fuel injector and/or igniter system 599 can be implemented to provide energy (e.g., in the form of electrical energy, heat energy, or other) to initiate the activation the chemical plasma generation agents into the chemical plasma constituents. The fuel injector and/or igniter system 599 can be implemented to thrust the chemical plasma constituents into the combustion chamber 595, e.g., by Lorentz forces, pressure forces, and/or thermal expansion. Examples of producing a Lorentz force to thrust oxidant and/or fuel particles, e.g., such as the disclosed chemical plasma constituents, are disclosed in U.S. Patent Application, entitled "FUEL INJECTION SYSTEMS WITH ENHANCED THRUST", U.S. application Ser. No. 13/844,240, filed on Mar. 15, 2013, now U.S. Pat. No. 8,752,524, which is incorporated by reference in its entirety as part of the disclosure in this patent document. The chemical plasma includes ions, free radicals, and other activated particles, and thrusting such chemical plasma by fuel pressure forces and/or thermal expansion to form projected vectors into the combustion chamber enables each fuel burst to greatly accelerate the ignition initiation, oxidation process, and the achievement of complete combustion. By using the chemical plasma constituents as ignition agents of combustion, the chemical plasma constituents can provide a faster beginning and accelerated achievement for completion of the combustion process, e.g., which can be implemented to achieve combustion with or without a burst of the fuel.

In other examples, the system 590 can include an acoustic ignition unit to provide acoustic energy (e.g., in the form of ultrasound energy or other frequency acoustic energy) to initiate the activation the chemical plasma generation agents into the chemical plasma constituents. For example, the acoustic ignition unit can be included as part of the fuel injector and/or igniter system 599. In some implementations, the acoustic ignition unit can stimulate the activation of the chemical plasma constituents within the fuel injector and/or igniter system 599, which can be implemented to subsequently thrust the chemical plasma constituents into the combustion chamber 595, e.g., by Lorentz forces, pressure forces, and/or thermal expansion. In other implementations, the fuel injector and/or igniter system 599 can be implemented to thrust the chemical plasma generation agents into the combustion chamber 595 and the acoustic ignition unit can be implemented to stimulate the activation of the chemical plasma constituents within the combustion chamber 595.

In other examples, the fuel injector and/or igniter system 599 can be implemented to produce electrically-generated ions and free radicals by ionizing the fuel (e.g., transported directly from the fuel container 591, via the valve 589), in which the electrically-generated plasma constituents are thrust into the combustion chamber 595 by Lorentz forces, pressure forces, and/or thermal expansion. As described, the electrically-generated plasma constituents also can provide a much earlier beginning of combustion, an accelerated process of combustion, and an earlier achievement of complete combustion of each fuel burst, for example, as compared to conventional ignition by ionization of the gap of a spark plug.

In some examples, the fuel injector and/or igniter system 599 can be used to produce one or more corona discharges to initiate the activation the chemical plasma generation agents into the chemical plasma constituents and/or initiate combustion of the chemical plasma constituents, as well as any chemical plasma generation agents, ionized fuel particles and/or fuel present with oxidants in the combustion chamber 595. Examples of producing a corona discharge are disclosed in U.S. Patent Application, entitled "FUEL INJECTION SYSTEMS WITH ENHANCED CORONA BURST", U.S. application Ser. No. 13/844,488, filed on Mar. 15, 2013, now U.S. Pat. No. 8,746,197, which is incorporated by reference in its entirety as part of the disclosure in this patent document.

Figure 5A:
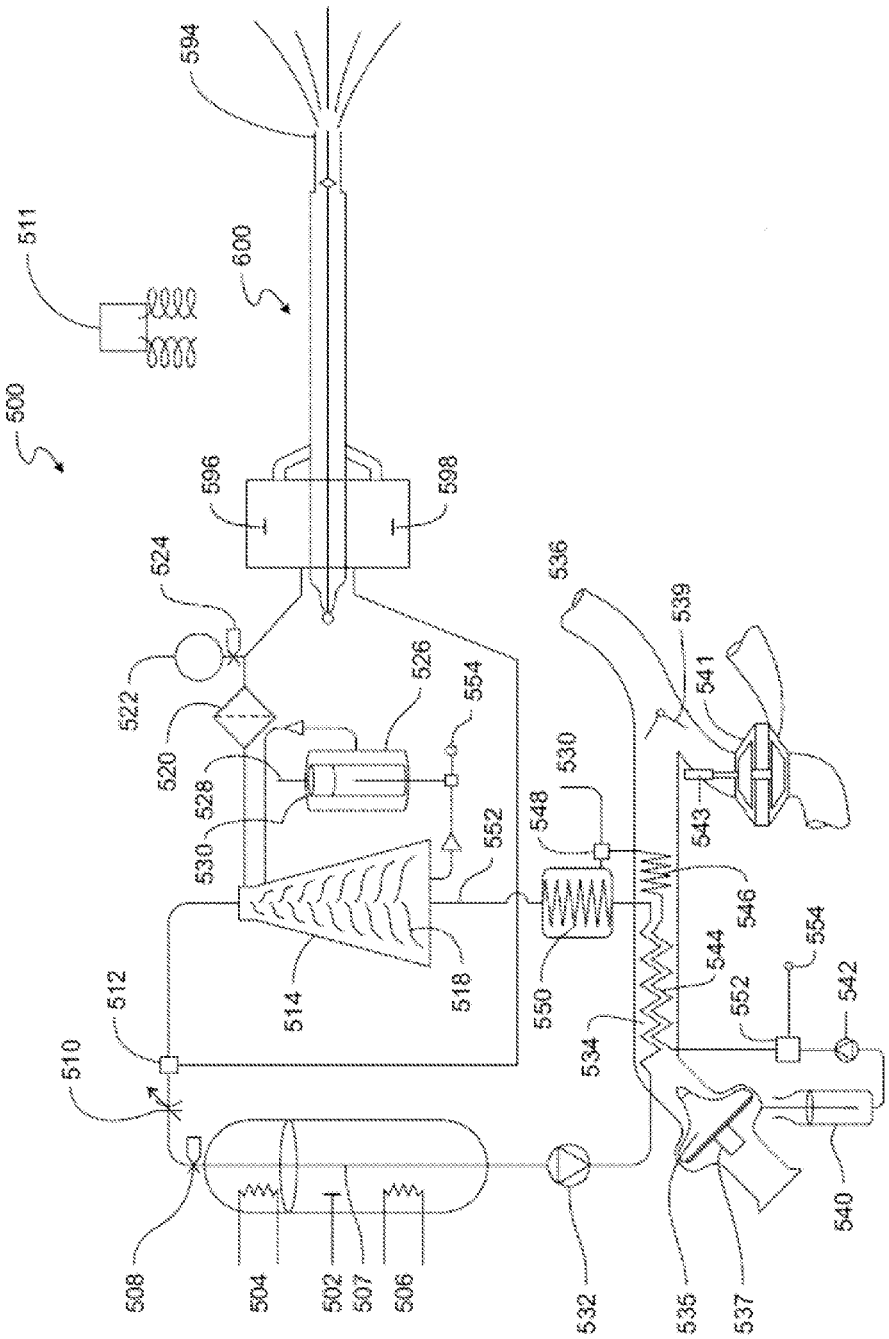
FIG. 5A shows a diagram of an exemplary system for storing, respeciating, and/or converting a fuel into a chemical plasma generation agent.

FIG. 5A shows a system 500 for respeciating a primary fuel or converting the primary fuel using thermochemical regeneration into one or more chemical plasma generation agents that can be used as a combustion stimulant or modifier, e.g., such as acetylene, DEE and/or other stimulants for various purposes including ignition initiation, plasma propagation, and/or adjustment of other combustion characteristics of another fuel species. The system 500 includes a respeciator system 514 to respeciate a fuel into a chemical plasma generator, e.g., such as ether (e.g., DME or DEE), and water. In some implementations of the system 500, the fuel may be respeciated into producer gas type constituents. The system 500 includes a fuel storage container 502 fluidically coupled to the respeciator system 514 and structured to contain a primary fuel. In some examples, the primary fuel can include one or more selected hydrocarbons or other fuels, e.g., such as alcohols (e.g., ethanol, methanol, propanol, butanol, etc.) and/or other suitable compounds (e.g., including formaldehyde, formalin, formic acid, among others).

For example, as shown in FIG. 5A, water that is produced by the respeciation operations of Equations 1, 2, or 3 may be removed from the process by electrolysis using electrolyzer 526 with suitable electrolysis electrodes and related process components in a suitable electrolyzer canister to provide delivery of hydrogen 528 and oxygen 530, and/or removed from the process by distillation, sorbents or de-watering reactions. For example, water may be removed from the ether by filtration or regenerative sorbents, e.g., such as activated carbon, calcia, magnesia, or zeolites.

At times that greater production of hydrogen and/or oxygen is desired, water from a suitable storage such as vessel or reservoir 540 may be directed through pump 542 and control valve 552 to connection 554 for additional delivery and/or pressurization of the electrolyzer 526. This enables a wide range of operating optimizations, e.g., including specific power production by a fuel cell or heat engine, fuel economy by utilization of the electrolyzer 526 to supply pressurized supplies of hydrogen and/or oxygen, along with the ability to gain additional synergistic benefits including reduction or elimination of exhaust pollutants and improved applications of regenerative energy.

For example, such hydrogen can be advantageously added to TCR products or individually utilized to control emissions, e.g., as a combustion stimulant, and/or as an accelerator, and/or as feedstock for production of various auto-ignition agents (chemical plasma generators). Thus, for example, in addition to respeciating feedstocks (e.g., such as ammonia or hydrocarbon compounds) to form chemical plasma generators, applications of the hydrogen can include production and utilization of one or more sequentially actuated chemical plasma generators such as acetaldehyde, which generates a chemical plasma in air at 175° C. (347° F.); DEE, for plasma generation in air at 180° C. (350° F.); cyclohexane, for plasma generation in air at 245° C. (473° F.); acetylene, for plasma generation in air at 325° C. (617° F.), and DME, for plasma generation in air at 527° C. (980° F.).

Also disclosed are processes of sequential production of chemical plasmas to provide for overall reduction in the net amount of chemical plasma generators required to greatly expand combustion acceleration capabilities to expedite combustion of other fuels and/or to adaptively control torque production to meet various demands. For example, in certain applications, it is advantageous to incorporate one or more of the exemplary combustion accelerators, e.g., such as DEE, cyclohexane, acetylene, DME and/or hydrogen, in conjunction with one or more other selections of sequentially actuated chemical plasma generators to stage the accelerated combustion processes at adaptively adjusted temperatures.

In one example, a first chemical plasma generator having a low temperature threshold to break into radicals is injected into the combustion chamber to utilize a reduced amount of supplied (or existing) heat for combustion. The formed radicals by the first chemical plasma generator act as a first sequential 'fuel' to be oxidized, e.g., by oxygen in air in the chamber, using the existing heat or gathered heat in the chamber. The combustion of the first chemical plasma generator then gives off more heat from its combustion, which in turn raises the temperature within the chamber. The increase in temperature can facilitate subsequent combustions of chemical plasma generators with a higher temperature threshold to break into radicals than that of the first. For example, a second chemical plasma generator having a higher temperature threshold than the first can be injected into the combustion chamber, the combustion chamber at the higher temperature than its previous state due to the extra heat released from combustion of the first chemical plasma generator. In some examples, conventional fuels can be supplied to the combustion chamber of the engine once the temperature is large enough, e.g., supplied by the previous combustion events of the sequential chemical plasma generators.

In such instances, for example, multiple control valves can be used to provide extensive variations of controlled combustion characteristics including a wide variety of combinations and permutations regarding the delivery timing, flow rates, flow intervals, and pressure along with the ability to augment such operations with electric plasma ignition and/or Lorentz acceleration. Examples of such control valves are shown later in FIGS. 7A and 7B, such as control valves 727a, 727b, 727c, 727d, 727e, and 727f and/or 767. This enables adaptively optimized selections and utilization of an extremely wide range of fuel selections and conditions in virtually all known types of combustion chambers, e.g., including conditions such as cold-start, idle, cruise, acceleration, full power and hot-start operations.

Referring back to FIG. 5A, oxygen from electrolyzer 526 can be utilized for various purposes including partial oxidation of hydrocarbon feedstock to produce hydrogen, an oxide of carbon, and heat, as described in Equation 4. Additionally or alternatively, for example, oxygen can be added to the intake air to improve the apparent volumetric efficiency and/or the combustion kinetics of the engine including enhancement of the benefits gained by application of one or more chemical plasma generators.

$$C_xH_y + xO_2 \rightarrow CO + 0.5_yH_2 + HEAT \quad (Eq. 4)$$

For example, utilization of oxygen instead of air in the process summarized by Equation 4 provides considerably greater efficiency for heat generation and avoidance of the bulk of nitrogen in applications, e.g., such as described by Equations 3.

For example, in circumstances in which rapid heat up and/or increased production of hydrogen and/or carbon monoxide is needed, oxygen can be added to the thermochemical regenerator. Such oxygen can be produced by electrolysis and/or by filtration from air and utilized, as shown in FIG. 5A, as a very high value application of regenerative energy in vehicular applications or for utilization of off-peak electricity from an engine generator host or from the grid. Alternatively, for example, mixtures of the exemplary auto-ignition agents, e.g., such DME or DEE, and some or all of the water vapor, as described in Equations 1, 2, and 3, can be directly injected by the exemplary embodiments of the integrated fuel injection and ignition systems of FIGS. 1, 3, and 4 to ignite and operate the engine as previously disclosed.

In various embodiments of the system 500, suitable combustant ionization systems may be used in conjunction with such stimulants to provide accelerated combustion patterns to optimize the performance and fuel economy. In some examples, rapid beginning and completion of combustion events are provided by utilization of capacitance discharge ignition to produce supersonic shock wave and/or speed-of-light radiation of ignition stimulation frequencies in conjunction with one or more chemical accelerants such as stratified charge oxygen, ozone, and/or an oxide of nitrogen and/or one or more electrolysis and/or thermochemical regeneration constituents, e.g., such as hydrogen, diethyl ether, dimethyl ether, acetylene, acetaldehyde, or cyclohexane. Another embodiment utilizes a high dielectric ceramic insulator such as spark plug porcelain or as disclosed in US Patent Application 2011/0041519, in which the entire document is incorporated by reference as part of the disclosure in this patent document, along with one or more suitable capacitance discharge facilitating coatings on the surface of the insulator 107 between electrode pairs such as 140 and 114E or 121 and 164 or 383 and 385 or 304 and 307. For example, coatings such as graphene or boron nitride or graphene oxide with dispersed boron and nitrogen and/or silicon atoms to form boron carbonnitride and/or siliconcarbide or siliconnitride can perform ambipolar functions to facilitate such capacitance discharge.

The system 500 includes heat exchanger elements 506 and 504 that are utilized to controllably add heat to liquid or gaseous inventories within the storage container 502 to provide the desired pressure of fuel delivery through line 507 to fuel control valve 508 and pressure regulator 510 to three-way valve 512. Fuel admitted through the exemplary three-way valve 512 to controlled temperature respeciator system 514 provides initial delivery at the bottom of a tank filled with a conversion promoter, e.g., such as oleum and/or concentrated sulfuric acid or another suitable acid or catalyst to convert the feedstock, as it travels along a high surface packing media or guide such as a spiral fin 518, for conversion into the desired ether, which exits the canister of the respeciator system 514 at the top, as shown in FIG. 5A. For example, a suitable heat balance and temperature for relatively rapid thermochemical respeciation DME production operation is maintained at about 150° C.

In some implementations, a pressurized working fluid used to maintain the engine temperature (e.g., at about 120° C. or higher) can supply most of the energy needed by the respeciator system 514 for the respeciation process and supplementation with energy from regenerative deceleration and/or from the engine's exhaust gases and/or from partial combustion, which can be utilized to supply additional energy as needed. Ether and water mixture travels to filter 520 to remove water, and the ether is stored in an accumulator 522 and provided through valve 524, e.g., at the times it is desired through an exemplary engine fuel injector and ignition device or system of the disclosed technology, such as the fuel injector and ignition device 600 shown in FIG. 5A interfaced with the system 500.

In addition to providing the combined capabilities of fuel injection and plasma ignition, the exemplary engine fuel injector and ignition device may also provide for deliveries of selected fluids that are admitted through valves 596 and 598, along with additional valves that can be included in the system 500 to similarly provide for other selected fluids. In operation, the exemplary injector-igniter 600 can provide final control of fuel from the storage container 502 that is delivered through the circuit of components that includes the pressure regulator 510, the three-way valve 512, and the valve 598 along with a final control valve 594 configured at the interface of the combustion chamber of the engine. The final control valve 594 may provide any combination of suitable control features including, for example, inward opening, outward opening, radial outward opening, radial inward opening, axial sliding, and rotational opening. Thus, the exemplary injector-igniter 600 also provides final control of chemical plasma generation agents by the fluid delivery circuit that includes the filter 520, the valve 596, and the final control valve 594 as shown. For example, such functions can be controlled by a controller. The system 500 can include a controller 511 to control functions and interactions of at least some of the various components of the system 500.

In some embodiments, the system 500 also includes the thermochemical regeneration (TCR) system for production of chemical plasma combustants. The TCR system is fluidically coupled to the fuel container 502. The TCR system includes a thermochemical heat exchanger/reactor 550 that may be utilized to produce a chemical ignition and plasma production agent (e.g., such as acetaldehyde ($CH_3CHO$)). The thermochemical heat exchanger/reactor 550 is fluidically coupled to a countercurrent heat exchanger 534 and heat exchangers 544 and 546 of the TCR system to receive reactants (e.g., feedstock) for thermochemical regeneration. The heat exchangers 544 and 546 can be configured substantially parallel to the countercurrent heat exchanger 534 in the TCR system. The heat exchangers 544 and 546 receive water, e.g., from the reservoir 540, which is routed to the thermochemical heat exchanger 550 for use in chemical plasma generation agent production. The countercurrent heat exchanger 534 receives fuel, e.g., from the fuel container 502, which is routed to the thermochemical heat exchanger 550 for use in chemical plasma generation agent production.

In such embodiments, the system 500 includes supply pump 532 for adaptively adding a primary fuel selection (e.g., such as a hydrocarbon) or fuel alcohol from the storage container 502 to the countercurrent heat exchanger 534 of the TCR system which can also receive heat from exhaust gases in exhaust system 536 of a heat engine, e.g., such as a gas turbine or piston engine (not shown). Water can be separated and collected in the reservoir 540 upon commensurate cooling and centrifugal acceleration of such exhaust gases by an expander-compressor system 538 of the system 500. The water, which may be mixed with sufficient anti-freeze such as an alcohol, can be subsequently stored in the reservoir 540 and utilized as an oxygen donor in reactions, e.g., such as the reaction described in Equation 5. For example, the products of Equation 5 provide 15% to 30% greater heat of combustion depending upon the feedstock fuel choice.

$$HEAT+C_xH_y+xH_2O \rightarrow xCO+[x+0.5y]H_2 \quad (Eq. 5)$$

The expander-compressor system 538 can include an expander-compressor that can be driven by expansion of the exhaust gases and/or driven by a mechanically- or electrically-driven device, e.g., such as a motor 537 shown in FIG. 5A, to produce the same or reduced back pressure in the exhaust system. The system 500 can be employed such that the exhaust system components can replace the conventional exhaust system components such as the catalytic reactor, urea treatment system, exhaust gas recirculation system, and muffler by the thermochemical regenerator system (e.g., components 534-544-546-550) and/or respeciation system (e.g., components 514 and/or 526). In some implementations, the expander-compressor system 538 may be adaptively operated as a pump to reduce the exhaust back pressure during maximum torque demand periods, e.g., such as starting/towing large inertia loads, rapid acceleration, and moving up/climbing hills, etc. Similarly, for example, adaptive operation of the expander-compressor system 538 enables a higher rate of water extraction during other times of engine operation. For example, engine efficiency, performance, and durability are improved, in addition to reducing the capital cost and operating expense.

For example, methane ($CH_4$) can be converted to carbon monoxide (CO) and hydrogen ($H_2$). This can be done by water collected out of the exhaust system, e.g., by running the turbocharger 541 of the system 500, e.g., for the purpose of increasing the air boost, as well as to get the exhaust cooler to a particular point/amount, such that 100% relative humidity is produced in the exhaust system for water collection. The collected water can be run into the thermochemical regenerator system to produce more fuel value in the CO and $H_2$, in which the greater fuel value can be carried into the chemical plasma agent generation product, e.g., such as DME, DEE and/or acetylene.

For example, the heat utilized in the endothermic reaction of Equation 5 may be exhaust heat and/or heat released by the oxidation process of Equation 4. For example, it is highly beneficial to prioritize heat additions to the oxygen donor (e.g., water) in the heat exchangers 544 and 546 of the TCR system for purposes of expediting the process of Equation 5 and assuring that commensurate heat additions that are made above the thermal degradation temperature of the hydrocarbon feedstock are predominately from the oxygen donor, e.g., such as steam and/or alcohol vapors. This prevents the hydrocarbon feedstock from degradation processes that source problematic depositions of carbon-rich, varnish-like, or "caramelized" and adhesive substances on heat exchanger surfaces.

In some implementations, the carbon monoxide and hydrogen (producer gas) produced in the thermochemical heat exchanger 550 of the TCR system may be utilized to produce a chemical ignition and plasma production agent (e.g., such as acetaldehyde ($CH_3CHO$)), which may be produced from TCR producer gas (e.g., $H_2$ in Equation (3)) and a feedstock hydrocarbon (e.g., such as propane, ethane, or methane) as described in Equation 6 and Equation 3.

In some implementations, cyclohexane can be similarly synthesized by respeciation of a hydrocarbon, e.g., such as propane, ethane or methane, with producer gas (e.g., hydrogen) at 280° C. to 300° C. (530° F.-570° F.), as described in Equation 7, which may be aided by initial hydrogen pressurization and/or self-pressurization and further with suitable reaction support media, e.g., such as silica or multi-layered graphene supported nickel and/or nickel-copper catalysts.

In some implementations, acetylene may be produced by dehydrogenation or respeciation of a hydrocarbon, e.g., such as methane, as described in Equation 8.

TCR sourced producer gas may similarly be utilized to synthesize DEE or DME as illustratively shown in Equation 3. Such producer gas constituents may also be utilized individually or as a mixture with one or more ignition drivers such as shown in Equations 1-8 and/or directly injected and combusted in the heat engine with the advantages of combusting more rapidly and yielding substantially more heat upon combustion in the engine.

$$CO+CH_4 \rightarrow CH_3CHO \quad (Eq. 6)$$

$$H_2+6CH_4 \rightarrow C_6H_{12}+7H_2 \quad (Eq. 7)$$

$$2CH_4 \rightarrow C_2H_2+3H_2 \quad (Eq. 8)$$

In some implementations, water (e.g., such as water produced by the respeciation operations of Equations 1, 2, or 3) may also be removed from the process or products by reaction with calcium carbide ($CaC_2$) to provide acetylene ($C_2H_2$), as described in Equation 9. Water for such purposes may be supplied from a storage tank and/or extracted from the exhaust gases and/or removed from inventories of the chemical plasma generation agents (e.g., such as ether) by reverse osmosis, filtration, or regenerative sorbents, e.g., such as activated carbon, calcia, magnesia, or various zeolites that may be regenerated.

$$CaC_2+2H_2O \rightarrow C_2H_2+Ca(OH)_2 \quad (Eq. 9)$$

In some applications it is desirable to produce various combinations of chemical plasma generation agents (e.g., such as acetylene and cyclohexane) from a hydrocarbon feedstock. Similarly, for example, DEE, DME, and/or acetaldehyde may be produced and utilized discretely, sequentially, or blended or selectively mixed with acetylene and/or cyclohexane. Such substances may be utilized to produce staged productions of plasma at different injection penetration distances to ignite other fuels (e.g., such as hydrocarbons) that are thus accelerated in the initiation, process stages, and completion of combustion.

In another mode of operation, such auto-ignition and chemical plasma generation agents (e.g., such as acetylene or ethers like DME or DEE) can be utilized in case of failure of the electric ionization systems as an operational option to ignite upon injection into compressed air at pressures exceeding the auto-ignition pressure and temperature. Such auto-ignition can be provided with or without co-injection of another fuel, e.g., such as a fuel alcohol, butane, propane, hydrogen, methane, natural gas, gasoline or diesel fuel.

For example, depending upon the compression ratio, piston speed, and geometry of the combustion chamber, suitable auto-ignition of one or more of the chemical plasma generators (e.g., such as acetaldehyde, cyclohexane, acetylene, DME and/or DEE) to initiate and accelerate the combustion of other fuel constituents can be accomplished with relatively low mixture concentrations of such chemical plasma generation agents selections. This can greatly expand the range of fuel selections and enable the lowest cost and environmentally beneficial fuels to be used without power loss.

Application of these exemplary auto-ignition agents with fuels such as off-grade gasoline or diesel fuel enables delivery of such liquid fuels at, near, or in multiple stages after top dead center (TDC) to accelerate the beginning of combustion and assured completion of combustion much more rapidly, e.g., in comparison with the limitations of conventional spark plug or compression ignition of cetane rated fuels. It is particularly beneficial to utilize at least a portion of such petrol fuels in a thermochemical regeneration step to form carbon monoxide and hydrogen, and to convert at least a portion of such carbon monoxide and hydrogen into acetaldehyde, DME and/or DEE. This can provide greater energy delivery upon combustion than would have otherwise been available from the original fuel, along with much more rapid ignition and completion of combustion.

Figure 6A:
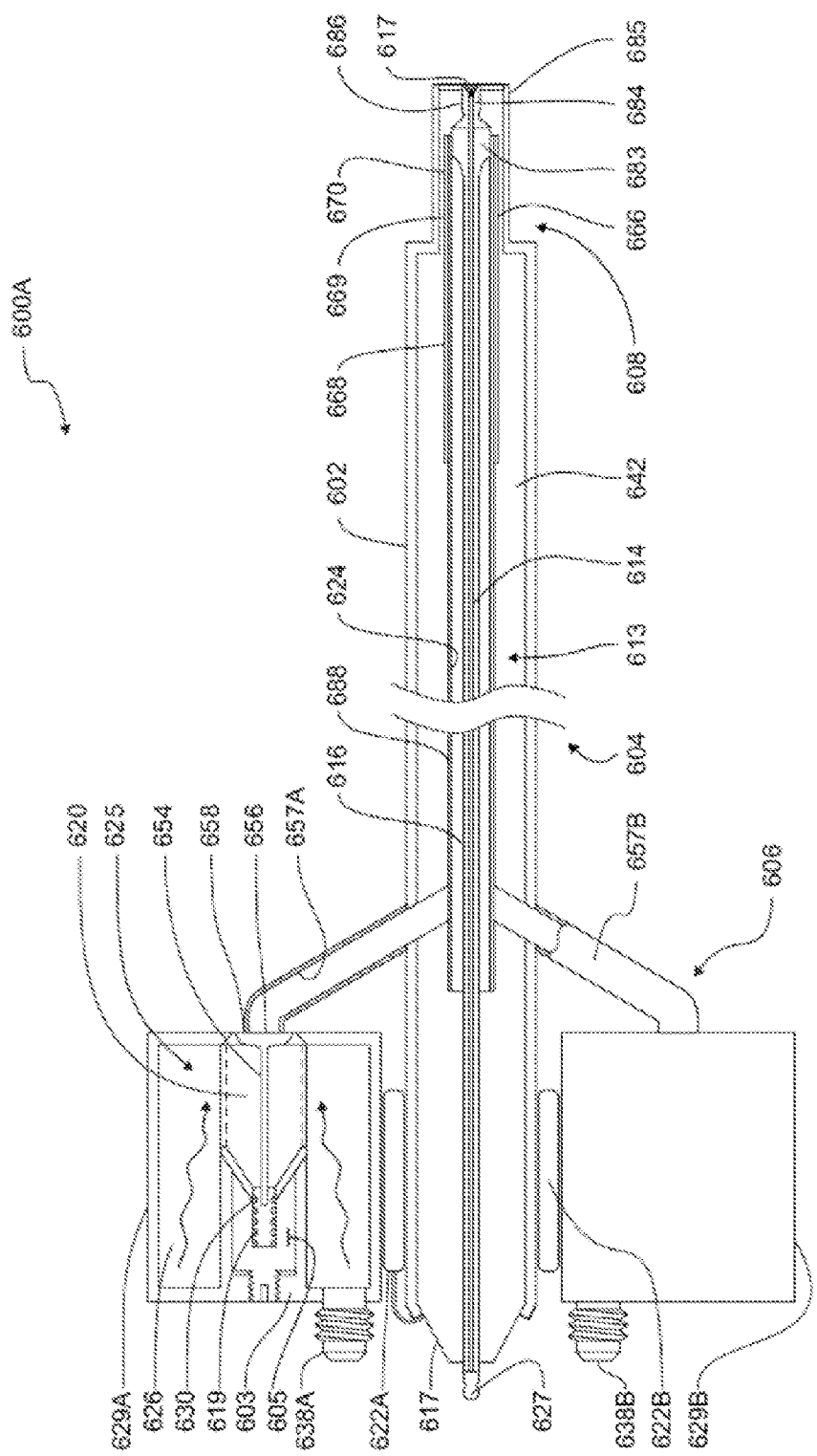
FIGS. 6A and 6B show schematics of another exemplary embodiment of an integrated fuel injection and ignition system.
Figure 6B:
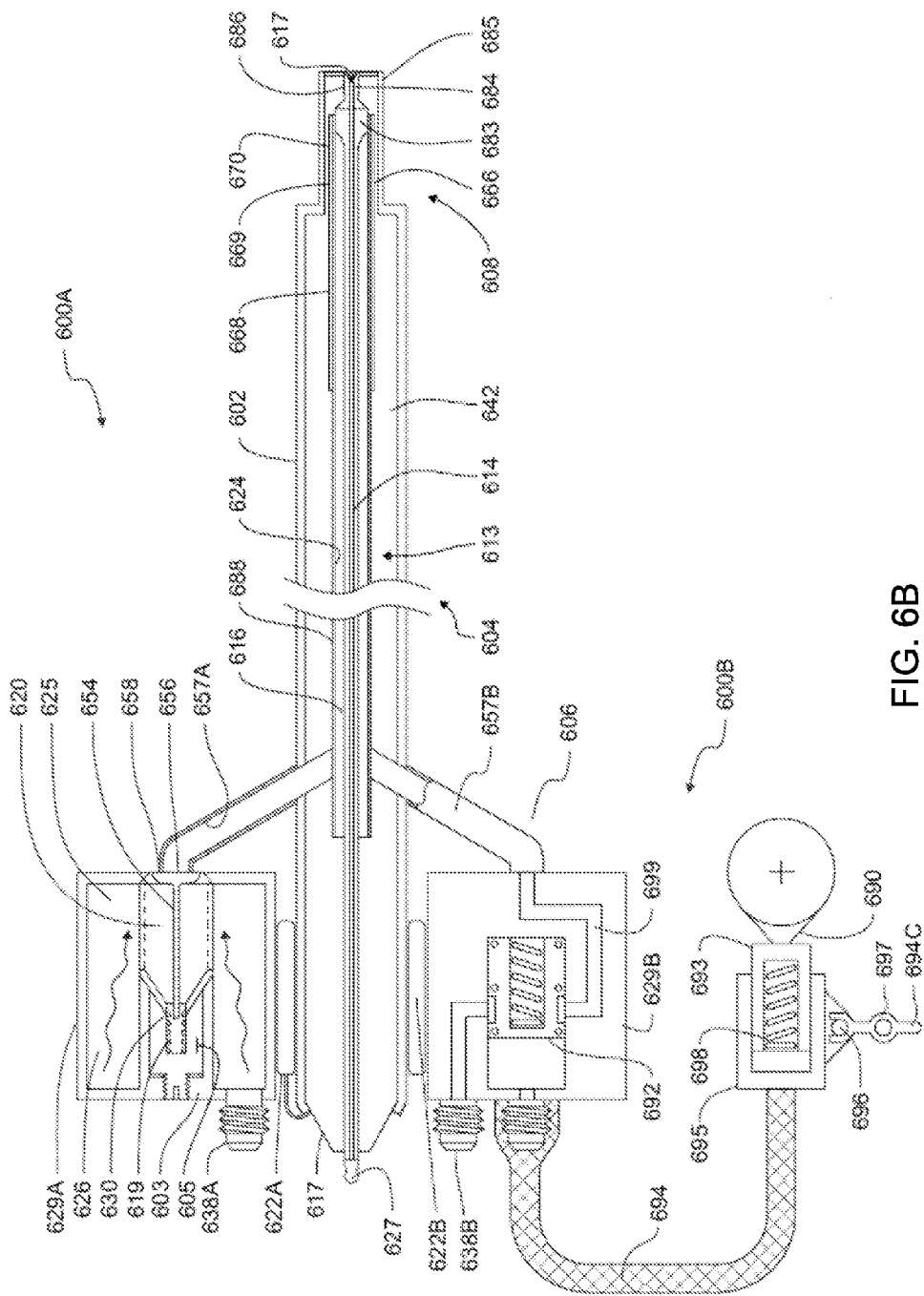

FIGS. 6A and 6B show combined fuel injection and plasma ignition systems 600A and 600B with further features that provide for plasma and/or auto-ignition of ether or other chemical plasma generation agents or similar substances that enable such features at desired times including occasions that ignition stimulants and/or combustion process modifiers are needed along with fail-safe continued power production upon the failure of the plasma ignition system. For example, in illustrative operation, a fuel selection that cannot be ignited by compression ignition can be used by providing electrical ionization for suitable ignition. Exemplary fuels can include liquids such as gasoline, fuel alcohols and butane and/or vaporous fuels such as propane and wet fuel alcohols, along with gaseous fuels such as hydrogen, methane or natural gas.

For example, the piston velocity is a factor that affects timing of the injection of into the combustion chamber. For example, if a fuel is injected after top dead center (ATDC) in an engine with high piston velocity (i.e., a high frequency engine), the fuel must burn faster in order to benefit from the torque produced on the ATDC period, e.g., having the fuel burned before 90 degrees of crank rotation, or 60 degrees, 45 degrees, etc. This is where implementation of Lorentz thrusting of the fuel by the fuel injection and ignition system can to provide the much greater fuel injection velocity for the timed piston velocity condition to benefit from the combustion heat that is released, e.g., otherwise wasting heat by exhausting it when it could have been doing work. In some examples, the fuel can be chemically activated by the chemical plasma generation agents produced by the system 500, which can be utilized to relieve the amount of current that the Lorentz thrusting of the fuel injection and ignition system is required to use, and thus reduce electrode erosion, thereby extending the life of the electrode. For example, a reduced current production on the electrode can be achieved by using the chemical plasma generation agent in the Lorentz thrust applications. For example, the disclosed technology can make the Lorentz occur based on chemical plasma started by the chemical plasma generation agent, and then accelerate it, thereby reducing the current on the Lorentz thruster (electrode).

The system 600A shown in FIG. 6A includes a fitting 638a that provides a connection to receive such fuels that are used as individual selections or various mixtures. The system 600A can be implemented such that an engine can be operated with ionizing voltage application through terminal 627, insulated conductor 614, electrode 686, and electrode 685 to produce sparks, corona and/or Lorentz thrust ion currents into the combustion chamber of the engine served. The system 600A includes one or more controllers 622a and 622b to control functions and interactions of at least some of the various components of the system 600A.

One or more chemical plasma generation (auto-ignition) agents, e.g., such as DEE, acetylene, and/or DME, etc., can be injected into the combustion chamber of the engine to produce power. Important advantages include the ability to utilize chemical plasma generating agents to continue engine operation without electric ignition, the opportunity to improve engine efficiency by utilization of thermochemically regenerated fuel species, and adaptive achievement of customized torque production by control of the combustion patterns and resulting pressure developments that provide more work per unit of combustion energy than possible with diesel fuel.

The chemical plasma generation agents can be utilized along with the primary fuel at times that it is desired to change the ignition and/or combustion characteristics of other fuels such as fuel alcohols, gasoline, methane or natural gas (e.g., to accelerate combustion or to change the radiative signal produced by combustion). And such auto-ignition chemical plasma agents can be injected to overcome energy release deficiencies at critical times of engine operation, e.g., such as high blower boost to meet torque demand or to overcome problems with the primary electrical ignition system.

In some implementations, the chemical plasma generation agents can be used as an auto-ignition agent and can be mechanically metered or valved and injected at adaptively timed instances to ignite the primary fuel without the normally utilized operation, e.g., including the electrical ionization for combustion initiation. Thus, combustion in the engine using the described chemical plasma generation agents can occur with a 'spark-free' combustion. Upon achieving pressure-induced or thermal conduction and/or radiation driven temperature elevation above about 160° C. (320° F.), a plasma stimulation agent such as the exemplary ether chemical plasma generators in air can rapidly propagate plasma to induce combustion throughout a stratified charge, e.g., including mixtures with fuels that would not ignite and combust by the highest compression temperatures and pressures produced by diesel engines with pressure-boosting superchargers.

FIG. 6B shows a system to operate the metering of chemical plasma generation agents for auto-ignition by adaptively timed injections into a combustion chamber to ignite the fuel without the normally utilized ignition procedures, such as electrical ionization of the fuel for combustion. Certain embodiments of the system 600B of FIG. 6B provide mechanical operation of the metering valve in one or more fuel metering components such as assemblies 695, 694 and 629b. For example, the assembly 695 represents a stationary cylinder 695 including a piston 693, in which the assembly 695 is coupled with a hydraulic tube or reinforced hose 694. Mechanical actuation may be provided by a lobbed disk or cam shaft with lobes, e.g., such as a conventional intake or exhaust valve lobe 690, that further serve to axially actuate the fuel control valve such as a spool valve within a piston 692 of the valve assembly 629b. For example, such cam actuation may be made directly or through suitable linkage such as a push-rod, cable, pneumatic or hydraulic system that transfers cam force to intermittently operate the fuel metering valve within the assembly 629b and provide fuel flow bursts.

As shown in FIG. 6B, the assembly 693-695 may be moved by a suitable mechanism such as a hydraulic cylinder or lever 694c rotating about an axis 697 to locate the assembly 693-695 at a guided axial position that provides for engagement of the piston 693 with cam 690 to the extent desired to continuously control the amount of fuel that is injected. Thus the amount of fuel injected can be varied from none to a maximum value including appropriate settings for idle, acceleration, cruise, and full power.

For example, at times the piston 693 is engaged and moved axially by the passage of the rotary cam lobe 690, hydraulic fluid is displaced from the stationary cylinder 695 through the hydraulic tube or reinforced hose 694 to displace piston 692 within the assembly 629b to provide fuel flow supplied by a fitting 638b to be delivered across the annular passageway of the exemplary spool valve of the piston 692, e.g., through passageways 657b and 624 and valve 668 of the system 600A for injection into the combustion chamber 607 as shown. For example, fuel subsequently flows around an annular passageway in the spool valve of the piston 692 and thus to the passageway 657b, through annular space 616 to one or more suitable terminal valve(s), e.g., such as radially opening component(s) 666 to deliver fuel bursts into the combustion chamber 607 as shown. For example, as the lobe 690 is moved past the angular section of displacement, the pistons 693 and 692 are returned to their normally-off positions by suitable compression springs 698 and 699, respectively, as shown.

Another exemplary embodiment of the disclosed technology utilizes the chemical plasma generators production system, e.g., such as the system 500, in combination with the fuel burst vectors produced by the type of fuel valve control and directed jet ports 118 of the assembly 100A in FIG. 1A. For example, this can be provided with chemical plasma generation agents, e.g., such as acetaldehyde, acetylene, cyclohexane, DEE, or DME, in combination with or without electrical ionization to initiate and accelerate completion of fuel combustion.

In some implementations, it can be particularly beneficial to utilize the fuel injection and plasma ignition systems 600A and 600B to inject multiple bursts of proportioned concentrations of exemplary chemical plasma generation agents (e.g., such as DME or DEE ethers) as ignition agents along with very inexpensive unrefined fuels, e.g., such as off-grade petrol fuels, plant and/or animal sourced bio-diesel fuels, wet or dry fuel alcohols, producer gas, hydrogen, carbon monoxide, natural gas or renewable methane. Rapid optimization is provided by adaptive adjustments of the valve assembly 629b timing to control the pressure, concentration, and delivery pattern characteristics of the exemplary chemical plasma generation agent (e.g., ether) in the fuel mixture in response to the speed of light combustion monitoring system 600A/600B, e.g., provided by light pipes or fiber optics 617 and computer 622a or the system 300A, e.g., provided by the optics 318 and computer 310 (as shown in FIG. 3A).

For example, electrically-produced ions and free radicals that are thrust as plasma constituents into the combustion chamber by Lorentz and/or pressure forces and/or thermal expansion can provide a much earlier beginning of combustion, an accelerated process of combustion, and an earlier achievement of complete combustion of each fuel burst, for example, as compared to conventional ignition by ionization of the gap of a spark plug. Similarly, for example, the auto-ignition agents chemically stimulate another type of plasma generation in which the chemical plasma includes ions, free radicals, and other activated particles, and thrusting such chemical plasma by fuel pressure forces and/or thermal expansion to form projected vectors into the combustion chamber enables each fuel burst to greatly accelerate the ignition initiation, oxidation process, and the achievement of complete combustion.

The disclosed technology includes adaptive control and dynamic sensing of the described fuel injection and ignition systems, devices, and processes, e.g. including the utilization of chemical plasma generators in such fuel injection and ignition systems, devices, and processes.

The described adaptive controls can be implemented to control the acceleration of electrical and/or chemical plasma combustion processes and can be applied simultaneously or in selected sequences, for example, which can be used to provide the following exemplary benefits. For example, the amount of electrical energy expended can be reduced in the instance that chemical and electrical plasma stimulations are combined in simultaneous or various sequential permutations. For example, the fuel pressure can be reduced while achieving the same combustion acceleration characteristics and benefits in the instance that chemical and electrical plasma stimulations are combined in simultaneous or various sequential permutations. For example, considerably less auto-ignition stimulant is required while achieving the same combustion acceleration characteristics and benefits in the instance that chemical and electrical plasma stimulations are combined in simultaneous or various sequential permutations. For example, a much wider range of acceptable fuel types including impurities, e.g., such as water, nitrogen, and carbon dioxide, can be utilized while achieving the same combustion acceleration characteristics and benefits in the instance that chemical and electrical plasma stimulations are combined in simultaneous or various sequential permutations. For example, a new cycle of engine operation can be implemented by employing the disclosed technology, which provides power production and efficiency improvements by combining thermochemical regeneration, generation of auto-ignition and/or combustion modifiers to provide more particles or molecules and/or more energy per particle or molecule for work producing expansion during the power stroke or cycle than the number of particles or molecules present in the combustion chamber during the compression cycle. For example, greater utilization of relatively low grade heat, e.g., including heat ordinarily rejected by cooling fins or coolant circulated through a radiator to form auto-ignition and/or combustion modifiers, can be accomplished along with achieving the same combustion acceleration characteristics and benefits in the instance that chemical and electrical plasma stimulations are combined in simultaneous or various sequential permutations including instances in which either type of plasma generation is used without the other.

For example, rapid start-up, greater system readiness, dispatchability, and fail-safe benefits are gained by implementation of the disclosed auto-ignition and/or combustion modifiers. For example, additionally, improved combustion acceleration characteristics and benefits are gained in instances that chemical and electrical plasma stimulations are combined. Such ignition technologies are selected and/or combined in simultaneous or various sequential permutations, e.g., including operating modes and instances in which the type and magnitude of plasma generation is instantly selected to optimize the operation of each combustion chamber and torque requirement.

Thus, by injecting the primary fuel substantially at or after TDC and igniting the primary fuel with co-presented injection of a selected type and amount of the exemplary auto-ignition plasma stimulant, extremely rapid beginning of combustion and completion of combustion can be achieved. For example, such implementation of the exemplary auto-ignition plasma stimulant(s) overcomes problems of "diesel-delay" and knock, as well as overcoming combustion quenching, engine wear, carbonaceous deposits, oil contamination and corrosive condensates (e.g., which have long-plagued engines with conventional fuel-injection and ignition systems). Incorporation of the disclosed fuel-injection, ignition, and combustion sensors can enable adaptive engine control systems to optimize the use of ignition by electrical ionization of oxidants and/or fuel constituents along with the combined or exclusive use of auto-ignition, chemical plasma generation, and combustion-modification agents.

In one aspect, the disclosed adaptive control and dynamic sensing technology includes a system embodiment to enable a vehicle to operate occasionally or interchangeably in areas that do not have refueling facilities for renewable fuels. The adaptive control and dynamic sensing system includes the related systems, apparatuses, and techniques previously described as an option of improving thermal efficiency by un-throttled air, oxygen, and/or another oxidant entry into the combustion chamber of an engine. To achieve such, for example, the adaptive control and dynamic sensing system can employ the exemplary fuel injection and ignition systems 100A, 300, 360, 360L, as shown in FIGS. 1A, 3A, 3C and 3D, respectively, for operation with preferred fuels, e.g., such as hydrogen, methane and other renewable hydrogen donor fuel species along with various thermochemically regenerated fuel species. In some examples, the adaptive control and dynamic sensing system can also operate in combination with the pre-existing fuel storage, pressurization, and metering systems of a vehicle. In one embodiment of an adaptive control and dynamic sensing operation technique, the exemplary fuel injection and ignition subsystem of 100A, 300, 360, or 360L can provide improved ignition of fuel that is supplied to the combustion chamber by the pre-existing controller, fuel storage, and fuel metering system.

For example, the adaptive control and dynamic sensing system can include a controller such as the controller 110, 310, 420, 511, 622a, or 622b to enable the pre-existing electric and/or mechanical analog or digital controller and fuel metering system to continue to be viable for, for example, back up and/or hybridized operations, but improved by emulation of certain sensor data (e.g., such as the oxygen concentration in the exhaust gases). Because the new operational process management by a controller, e.g., such as the controller 110, can provide improved performance and fuel efficiency with un-throttled oxidant entry to the combustion chamber, the oxygen concentration in the exhaust gas stream will typically be greater than the previous operation with throttled or restricted oxidant entry. For example, this would cause an alarm if not malfunction of the conventional electronic control system, which is prevented by the emulated oxygen sensor signal given to the conventional controller that is provided by the controller 110 for allowing virtual operation by the conventional controller at the barometric pressure, temperature, piston speed, torque demand etc., of present conditions. Emulation of the "expected" oxygen signal that would be commensurate with throttled oxidant operation while actually operating with unthrottled oxidant and assured ignition with subsystem controllers 110, 310, 420, 511, 622a, or 622b provides greatly improved engine performance and fuel efficiency.

For example, additional sensor data emulations can be provided as needed by controller 110 to allow the pre-existing conventional controller to remain viable and continue in some modes of operation to meter fuel from the pre-existing fuel tank and to provide optimal operation of other vehicle subsystems, e.g., such as the transmission, cooling fan, cabin air-conditioning, power take-off, power steering, power brakes, power windows, power seats, windshield wipers, ride control, and radio, etc.

For example, in an ignition-only mode of operation of an exemplary fuel injection and ignition system with un-throttled oxidant, the projection of stratified oxidant plasma by the system (e.g., system 100A, 300, 360, or 360L) provides much faster beginning and completion of combustion than a conventional spark plug that it replaces. This improves performance and fuel efficiency because a heat conserving stratified charge of oxidizing plasma suddenly penetrates an adaptively adjusted distance into the combustion chamber one or more times per power cycle to initiate combustion of a far greater population of fuel and oxidant combinations than possible with a conventional spark plug. Adaptive projection provides plasma ignition capacity and efficiency by such exemplary systems 100A, 300, 360, or 360L that is far greater in comparison with conventional spark plug ignition. For example, this is because of the limitations of the relatively smaller population of fuel and oxidant particles influenced and subsequent heat quenching that slows combustion, produces emissions, and severely limits the ignitable fuel to oxidant ratio of the far smaller volume of fuel and oxidant particles that can be activated within the spark plug gap.

In another embodiment of the adaptive control and dynamic sensing technology, the controller 100A, 300, 360, 360L, or 511 can provide interactive engine control with a pre-existing engine controller to provide emulation of pertinent sensor values, e.g., such as the mass air flow and exhaust gas oxygen content to enable the pre-existing engine controller and fuel pressurization and metering system to deliver fuel to the combustion chamber at an actual fuel-air ratio that would be too lean for conventional spark, plasma, or projected plasma ignition. Improved engine performance, fuel economy and vehicle range are achieved by adaptive timing of injection and ignition of electrically and/or chemically induced plasma rays that are projected into the fuel-air mass presented by the pre-existing system. Such plasma rays may be comprised of fuel value particles derived from thermochemically regenerated substances (e.g., such as carbon monoxide and hydrogen) and/or other combustion accelerants (e.g., such as dimethyl ether, diethyl ether, acetaldehyde, or cyclohexane). In operation of a converted homogeneous charge engine, the pre-existing controller and the described adaptive control and dynamic sensing fuel delivery system respond to emulated information such as the mass air flow and exhaust oxygen concentration signals, e.g., similar to values corresponding to a vehicle with cruise control going down a long hill at fuel consumption rates that soar to 50 or 100 mpg. The controller of the adaptive control and dynamic sensing system actually achieves greatly improved performance and fuel economy on level and/or climbing grade roadways by operating the engine with un-throttled air entry and stratified charge delivery of plasma ignition rays to provide assured ignition at far lean overall fuel-air ratios. For example, other electronic control functions, e.g., such as the transmission, brakes, air conditioner, and various other power assist functions, continue to be controlled by one or more pre-existing controllers. Operation of a converted diesel engine is similarly achieved, as the controller of the adaptive control and dynamic sensing system provides adaptively optimized timing of events selected from the group, e.g., including beginning of oxidant plasma injection, duration of oxidant plasma injection, beginning of fuel injection, duration of fuel injection, beginning of fuel plasma injection, duration of fuel plasma injection, beginning of coolant injection, duration of coolant injection and time durations between repeats of such events.

In another exemplary mode of operation, stratified charge oxidant plasma can optionally be projected into the combustion chamber followed by one or more stratified charge fuel plasma injections to provide faster beginning and completion of combustion of preferred fuel species and/or conventional fuel particles. For example, this can provide further improvements of engine performance and even greater reductions or elimination of carbon dioxide and oxides of nitrogen as a result of the adaptive selections of combined operations. Exemplary benefits gained include far greater range of operation, increased engine performance and longevity along with improved fuel economy including conventional and/or preferred fuel utilization.

In other exemplary modes of operation, the conventional fuel metering system can be inhibited or otherwise managed by a the controller (e.g., such as the controller 110) of the described adaptive control and dynamic sensing system to enable a pre-existing engine controller to perform virtual fuel metering and ignition operations for the purposes of having the controller 110 adaptively manage and optimize actual operations of the combustion chamber with preferred or conventional fuel selections that are directly injected and utilized. For example, this can provide further fuel economy and performance improvements including greater oxidant utilization efficiency including surplus oxidant insulation of fuel particles from combustion chamber quench zones near the piston, cylinder walls, and head components. For example, stratified charge oxidant plasma can optionally be projected into the combustion chamber followed by one or more stratified charge fuel plasma injections to provide much faster beginning and completion of combustion of preferred fuel species and/or conventional fuels with improved engine performance and even greater reductions or elimination of carbon dioxide and oxides of nitrogen as a result of the combined selections of operations.

For example, this enables a relatively low-cost controller, such as the controller 110 of the adaptive control and dynamic sensing system, to control a pre-existing controller with greatly improved combined operations including very rapid and convenient engine and/or vehicle conversion to operation with much less pollutive and substantially less expensive preferred fuels and thus provide rapidly accomplished improvement of return-on-investment in the subject vehicle. Such exemplary advantages of employing the disclosed adaptive control and dynamic sensing technology can enable quick and sure conversion to enable operation on preferred fuel, continued operation and management by the pre-existing controller and wiring systems with the original tried-and-proven subsystems, extended engine life and productivity along with higher vehicle re-sale value. This includes management by the pre-existing controller of subsystems such as the transmission, anti-slip driveline components, cooling fan, power steering, power brakes, windshield wipers, power windows, air conditioning system, power seats, radio and other such subsystems while engine operation improvements such as stratified charge oxidant plasma ignition, stratified charge fuel plasma ignition, stratified charge oxidant and/or stratified charge fuel plasma ignition of fuel stored and/or metered by pre-existing controller and various other combinational permutations including operation with un-throttled oxidant entry into the combustion chamber.

Additional performance and fuel efficiency optimization is provided by application of new controller features (e.g., such as may be provided by the controller 110, 511, etc.) to manage the flows of coolant and/or exhaust gases. In this regard, for example, coolant may be diverted from the radiator to include heat exchangers that pressurize a fuel or coolant in sub-circuits, e.g., such as heat exchanger elements 504 and/or 506 shown in FIG. 5A, and to similarly control the flow of exhaust gases to supply heat and/or substances for thermochemical regeneration processes in reactors 546 and 544 of the TCR system, as shown in FIG. 5A. Such adaptive management of energy conversion operations includes operating a valve and/or flow divider of an exhaust system (e.g., such as valve 539 of the exhaust system 536 shown in FIG. 5A) to provide for delivery of sufficient exhaust gases to supply condensates to collection in the reservoir 540 and/or management of power cooling fluids to the combustion chambers and/or turbo expanders (e.g., such as the turbo expander 535 of the system 500 shown in FIG. 5A) and the flow of exhaust gases to one or more turbochargers 541 to meet oxidant pressurization boost, torque production, and power generation requirements. For example, this includes adaptive management of one or more fuel and/or coolant injections to the combustion chamber during adaptively timed periods within the intake, compression, power, or exhaust events for improving primary engine and/or turbo performance. It also includes coordinated adaptive management of a valve and/or flow divider of an exhaust system (e.g., such as the exemplary flow control valve 539) and a fuel and/or coolant injection (e.g., by an injector such as the injector 543 shown in FIG. 5A) to improve the performance and capacity of such turbo expander (e.g., turbo expander 535).

Several exemplary embodiments have been disclosed in this patent document that enable the ability to combine: (1) fuel pressure assisted opening of fuel control valve; (2) combustion pressure assisted closing of fuel control valve; (3) pulsed Lorentz force acceleration of ion currents—for example, to produce one or multiple bursts of oxidant and/or fuel ions; (4) combination of multiple fuel control valve openings near TDC and/or during power stroke along with multiple Lorentz bursts to subdivide and accelerate each valve burst; (5) Lorentz acceleration of oxidant and/or fuel ion currents to produce particle burst projections that enter combustion chamber at speeds exceeding speed of sound (e.g., exceed choked flow Mach 1 limit); and (6) exemplary adaptive control and dynamic sensing technologies that include relatively low cost computer/controller units that can optimize engine performance and improve fuel economy by adaptive engine management including stratified charge oxidant and/or plasma, stratified charge fuel and or plasma presentation and master the much more expensive pre-existing vehicle controller to remain ready and viable by virtual operation of engine management with improved performance and fuel economy while further enabling continued benefits provided by the pre-existing controller in actual operation with miles of pre-existing wiring systems and pre-existing sub systems such as the electronically controlled transmission, power take off, track sanders, power brakes, power steering, power windows, power seats, seat warmer, power air-sampling and vent, power entertainment system, etc.

For example, controllers such as 110, 310, 420, 511, 622a, or 622b and any of the various sub-systems or injector embodiments disclosed can be used to adaptively control permutations and combinations of energy conversion operations (e.g., such as in engine and/or fuel cells). Such exemplary energy conversion operations include, but are not limited to:

(1) Energy Conversion to produce increased fuel pressure—including motive (power take-off pump) and/or regenerative electrical and/or pneumatic pump, and/or harvested waste energy (thermal heat exchange from coolant or exhaust) into pressure potential energy of fuel (e.g., such as fuel stored in fuel container 502 in FIG. 5A);

(2) Energy Conversion (e.g., using heat exchangers such as heat exchangers 546, 544, and/or 550) to produce increased chemical potential energy by endothermic respeciation reactions (e.g., $HEAT+CH_4+H_2O \rightarrow CO+3H_2$, or $HEAT+CH_3OH \rightarrow CO+2H_2$);

(3) Energy Conversion to produce special purposed chemical plasma (e.g., which can be implemented for auto-ignition of exemplary chemical plasma generation agents upon access to oxidant and/or kindling rapid initiation of oxidation and/or combustion of other fuel constituents—for example, which can be produced by respeciation (e.g., such as by the respeciation system 514 of FIG. 5A), e.g., such as DEE, DME, acetylene, etc.);

(4) Energy Conversion to produce fuel cell or combustion activation by one or more agents (e.g., such as DEE, DME or acetylene) to produce chemical plasma production;

(5) $H_2$ and/or $O_2$ production by electrolysis to regenerate reactor media—and/or for any of above purposes using motive (power take-off alternator) regenerative electricity or heat, or harvested waste, energy (thermal heat exchange from coolant or exhaust) including energy conversion into pressure potential energy of fuel;

(6) Energy conversion with fail-safe production of electrical and/or chemical plasma fuel activation for fuel cell and/or combustion;

(7) Extraction and/or enrichment of certain constituents (e.g., water) of exhaust gases from a heat engine or fuel cell (e.g., implementing the unit including motor 537 and expander compressor 538) by densification separation resulting from heat extraction (e.g., implementing the heat exchangers 546, 544), pressurization (e.g., implementing the expander compressor 538 centrifugal acceleration) and/or absorptive incorporation (e.g., implementing the reservoir/vessel 540);

(8) Operation of an apparatus or device (e.g., implementing the unit including motor 537 and expander compressor 538) as a compressor, expander, and/or constituent separator for purposes such as increasing the BMEP and/or volumetric efficiency of a heat engine by reducing the exhaust pressure, increasing the pressure of exhaust gases to increase the rate of heat exchange for endothermic reactions (e.g., in the heat exchangers 546, 544 and/or the countercurrent heat exchanger 534), increasing the pressure of exhaust gases to increase the rate of constituent separation (e.g., water separation at expander compressor 538—reservoir/vessel 540 from $N_2$ and/or $O_2$ in exhaust stream);

(9) Operation of an apparatus or device (e.g., implementing the unit including motor 537 and expander compressor 538) as a compressor, expander, and/or constituent separator in which exhaust gases are expanded during selected portions of the exhaust stroke of a heat engine, and/or compressed during selected portions of the intake, compression, and/or power strokes of the engine;

(10) Proportional control of production (e.g., implementing the respeciator system 514) and/or utilization of one or more chemical plasma generation agents and/or special purpose agents (e.g., $H_2$ and/or $O_2$) to optimize fuel efficiency, power production, and/or emissions control; and

(11) Adaptive control of fuel injection rates, penetration patterns and combustion characteristics by control of the stroke of metering valve including inwardly, outwardly, sliding, radial inward and radial outward opening metering valve embodiments.

Figure 7A:
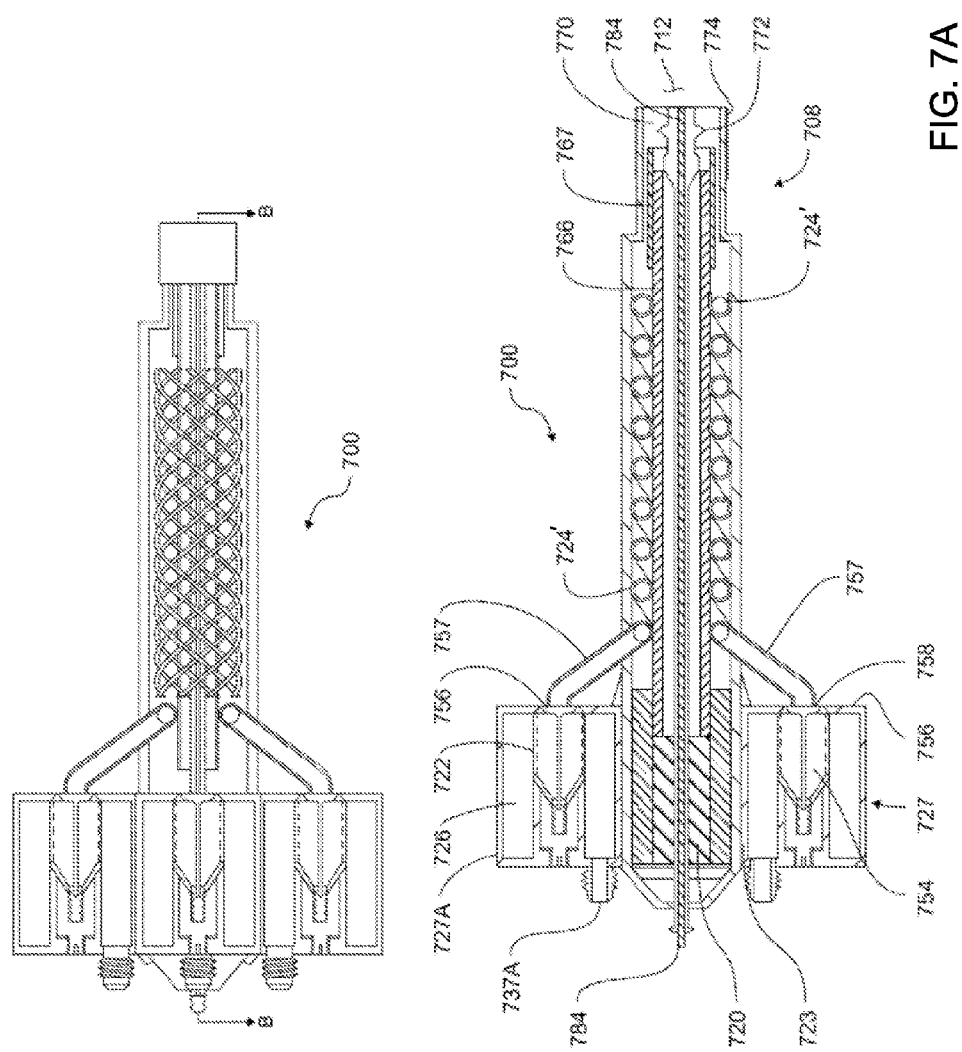
FIGS. 7A and 7B show schematics of another exemplary embodiment of an integrated fuel injection and ignition system including multiple control valves.
Figure 7B:
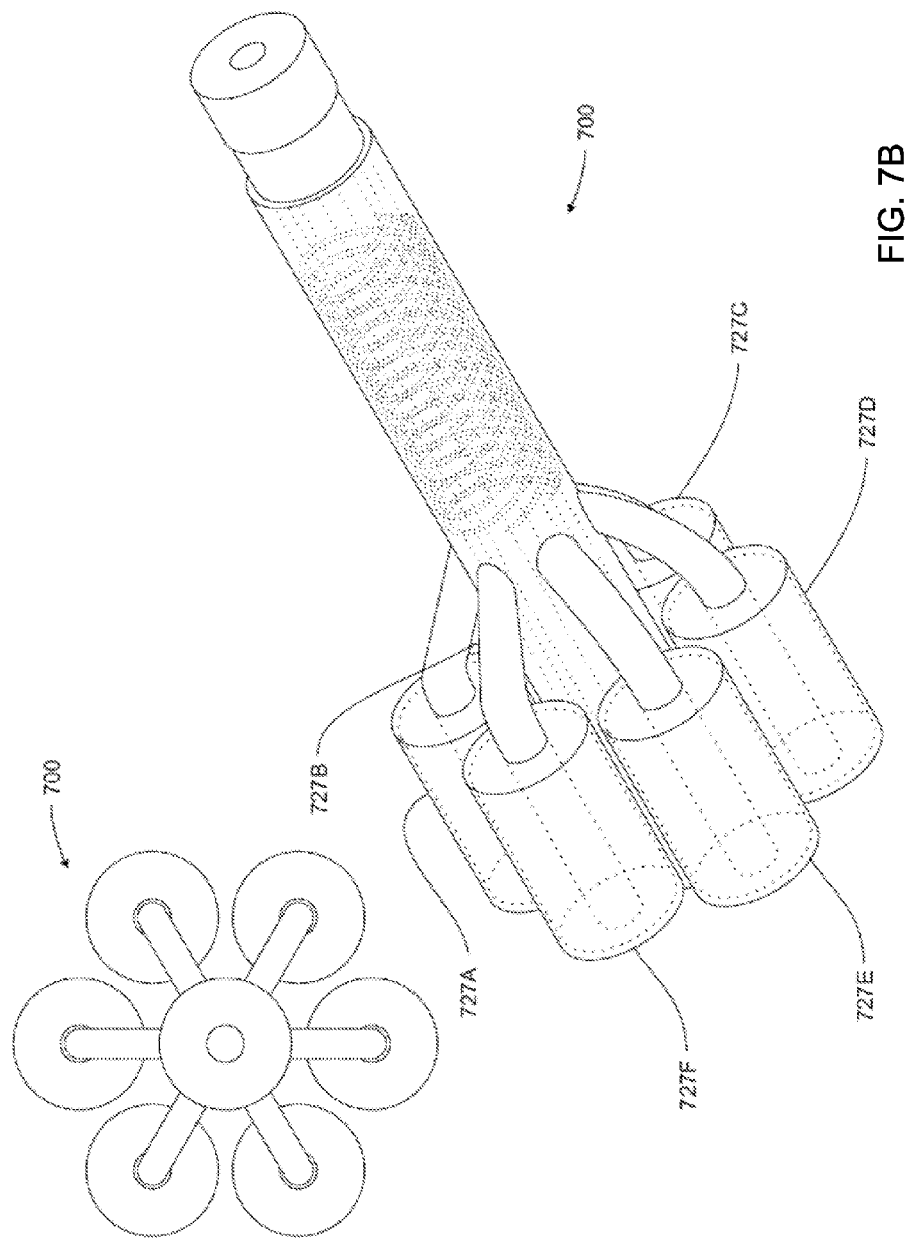

FIGS. 7A and 7B show an exemplary fuel injection and ignition system 700 including multiple control valves that can be used to provide extensive variations of controlled combustion characteristics including a wide variety of combinations and permutations regarding the delivery timing, flow rates, flow intervals, and pressure along with the ability to augment such operations with electric plasma ignition and/or Lorentz acceleration. The system 700 includes control valves 727*a*, 727*b*, 727*c*, 727*d*, 727*e*, and 727*f* and/or 767. This enables optimized utilization of an extremely wide range of fuel selections and conditions in virtually all known types of combustion chambers. In an illustrative example of using the valves 727*a*-727*f* to control various fuels, the valve assembly 727*a* could be used to control natural gas, the valve 727*b* could be used to control DME, the valve 727*c* could be used to control propane, the valve 727*d* could be used to control DEE, the valve 727*e* could be used to control formic acid, and the valve 727*f* could be used to control hydrogen. Operations of such valves 727*a*-727*f* to control such substances can be in any sequence or combination or permutation to optimize outcomes, e.g., such as engine performance, range, and minimization or elimination of objectionable emissions goals.

Figure 8A:
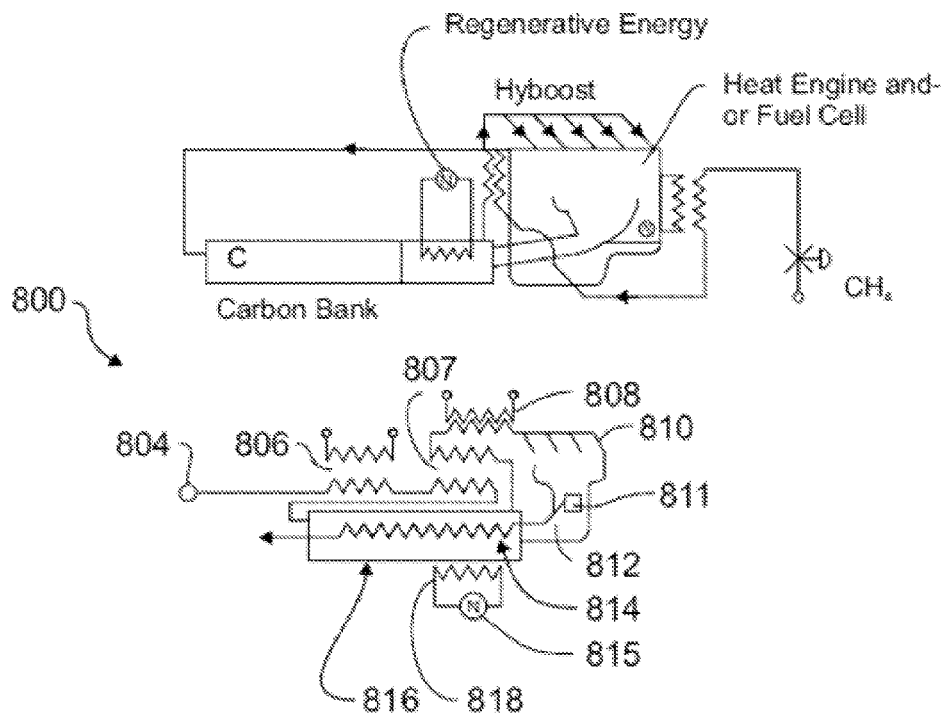
FIG. 8A shows a schematic of an exemplary system to produce hydrogen by separation from a hydrogen donor compound.

FIG. 8A shows a schematic of a system 800 to produce hydrogen by separation from a hydrogen donor compound, e.g., such as natural gas, methane, methanol, ethane, ethanol, ammonia, urea, guanidine, etc. For example, the system 800 can be implemented to provide a highly efficient use of relatively low grade waste heat to produce more hydrogen than the same magnitude of high grade electrical energy would produce by electrolysis of water.

In an illustrative example, a donor compound (e.g., such as methane) may be heated from a suitable source 804 at 15° C. to 105° C. by (Hc) from engine coolant and then from 105° C. to about 540° C. by heat (He) transferred from the engine exhaust, and then regenerative heat (Hr) may be utilized as an additional source of heat to produce a greater percentage of hydrogen, or produce hydrogen and carbon more rapidly and/or at higher pressure and/or higher temperature. As shown in both FIGS. 8A and 8B, the system 800 includes a heat bank exchanger canister 816 containing an exemplary honeycomb structure 824 (shown in FIG. 8B) or other arrangement for countercurrent heat exchanges and reactions that deposit carbon for removal and utilization for durable goods manufacturing, and/or as a thermal bank, and/or as a chemical potential energy bank. Donor fuel transferred from the source 804 may initially be heated by heat from an engine coolant to about 105° C. in heat exchanger 806. Donor fuel is then further heated by counter current heat exchange with hydrogen and/or methane in heat exchanger 807. The mixture of hydrogen and donor fuel may be utilized as an elevated temperature and thus chemically activated fuel by injection through injectors 810 into a heat engine. Alternatively, for example, such mixtures of hydrogen and donor fuel may be used as a heat source in heat exchanger 808 for various useful applications such as heating domestic water or cooking.

Figure 8B:
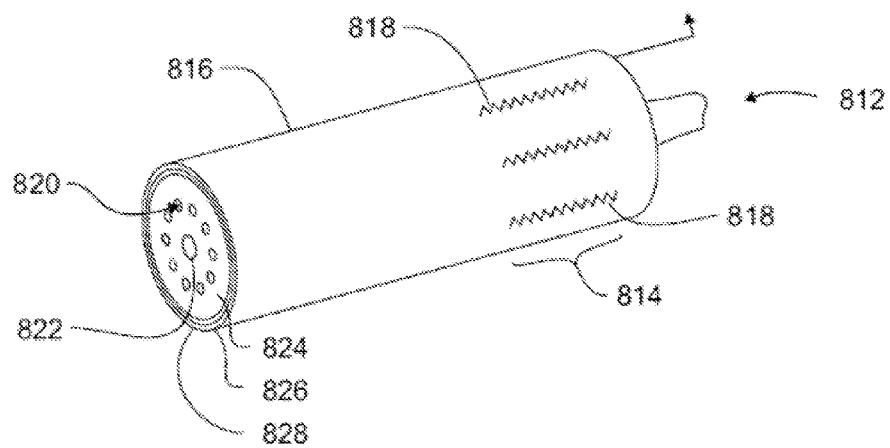
FIG. 8B shows a schematic of the heat bank exchanger unit of the system of FIG. 8A.

Illustratively, for example, heat available from an engine or fuel cell coolant may be selected to transfer heat (Hc) through the heat exchanger 806 to the selected hydrogen donor. The exhaust gases from an exhaust system 812 of a host engine or fuel cell may be delivered directly from the engine or after serving in a secondary application such as a turbocharger or turbo-generator 811, and thus may serve as another source for heat (He). Regenerative braking or other renewable energy sources such as conversions of solar, wind, moving water and/or geothermal energy by a generator 815 may also be selected for transferring heat (Hr) through one or more heater elements 818 that are inserted or integrated into the heat bank exchanger 816, as also shown in FIG. 8B, e.g., for increasing the rate for conversion of the selected hydrogen donor passing in counter-current passageways 820 to form hydrogen.

Hydrogen donor compounds that contain carbon are converted by the process summarized in Equation 10. Equation 11 shows partial dissociation of methane to produce carbon along with a mixture of hydrogen and methane.

$$C_xH_y + HEAT(Hc+He+Hr) \rightarrow xC + 0.5yH_2 \qquad \text{(Eq. 10)}$$

$$CH_4 + HEAT(Hc+He+Hr) \rightarrow C + 2H_2 + CH_4 \qquad \text{(Eq. 11)}$$

The completeness of the generalized reaction such as shown in Equation 11 may be varied depending upon control of process parameters such as temperature, pressure, chemical availability or activity, and dwell time. For example, a much greater percentage of hydrogen in the resulting mixture of methane and hydrogen can be provided by utilization of regenerative or renewable or off-peak energy to increase the temperature in reactor 816 and/or in a particular region such as zone 814 of the reactor 816. This is highly desirable in instances that carbon is collected in the reactor 816 to efficiently store surplus energy, serve as a source of material to produce durable goods, and/or to reduce the presence of carbon products in the engine exhaust and/or to utilize hydrogen as a combustion stimulant and accelerator and/or to utilize hydrogen in the combustion regime including facilitation of exhaust gas recirculation and/or stratified charge combustion and/or in various after-treatment processes to reduce or eliminate oxides of nitrogen.

For example, hydrogen rapidly diffuses or passes through various membranes 809 such as various temperature rated proton conducting membranes; micro-porous ceramics such as zeolites, titania, zirconia, carbon, or alumina; polymers such as PTFE or polyethersulfone that enable diffusive separation; metal alloys such as silver-palladium alloys or may be removed by a selective adsorptive filter to reduce its partial pressure and/or chemical availability. Reduction of the partial pressure of hydrogen shifts reactions such as depicted in Equations 10 and 11 towards greater conversion of the feedstock to carbon and hydrogen. Similarly reducing the partial pressure of gases, e.g., such as hydrogen, by heat removal through a heat exchanger, e.g., such as the heat exchanger 808, to produce a lower pressure at cooler temperature shifts the reactions to increase the conversion of feedstock to carbon and hydrogen.

In some implementations, it is highly desirable to utilize precipitated or otherwise separated and collected carbon in the heat bank exchanger canister 816 as the media of a thermal storage bank or battery that receives and stores heat transferred from the exhaust gases (e.g., via exhaust system 812) that are routed through the heat exchanger 816 along with occasionally available regenerative energy or intermittent renewable energy that may be stored in the zone 814. For example, various types and forms of carbon are appropriate for optimizing the performance in such thermal battery applications. For example, high thermal conductivity graphite of the honeycomb structure 824 with high specific heat capacity and with heat exchange passageways such as the countercurrent passageways 820 and central passageway 822 is utilized for facilitating storage and transfer of heat. For example, heat transferred from the exhaust system 812 in the passageway 822 to heat the hydrogen donor reactant in passageways 820 and additionally to receive and store and bank heat for continued hydrogen production in stop and go driving conditions. For example, very low thermal conductivity layers of the exfoliated graphite 826 or flaked graphene can be used to insulate the outer layers of the reactor 816 within a ceramic or heat resisting shell 828.

In some implementations, more or less epitaxial deposition of precipitated carbon on surfaces of the substrate 824 provides combined thermal and potential chemical energy storage. For example, such potential energy storage of carbon may be utilized in a fuel cell circuit to produce electricity and carbon monoxide and/or carbon dioxide. Examples of such are disclosed in U.S. patent application Ser. No. 13/764,346, entitled "FUEL-CELL SYSTEMS OPERABLE IN MULTIPLE MODES FOR VARIABLE PROCESSING OF FEEDSTOCK MATERIALS AND ASSOCIATED DEVICES, SYSTEMS, AND METHODS", which is incorporated by reference in its entirety as part of the disclosure in this patent document. Alternatively, for example, such stored carbon may be occasionally reacted with an oxygen donor such as steam, oxygen or air to produce gases for combustion in a heat engine. Equation 12 summarizes an exemplary endothermic application.

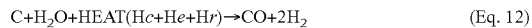

$$C+H_2O+HEAT(Hc+He+Hr) \rightarrow CO+2H_2 \qquad \text{(Eq. 12)}$$

Equation 13 summarizes an exemplary exothermic application of such carbon for chemical potential energy storage in which an oxide of carbon such as carbon dioxide or carbon monoxide is provided as a gaseous fuel for application in a fuel cell or heat engine.

$$C+0.5O_2 \rightarrow CO+HEAT(Hp) \qquad \text{(Eq. 13)}$$

Heat (Hp) may be utilized to supplement other sources such as Hc, He, and/or Hr as needed.

Figure 9:
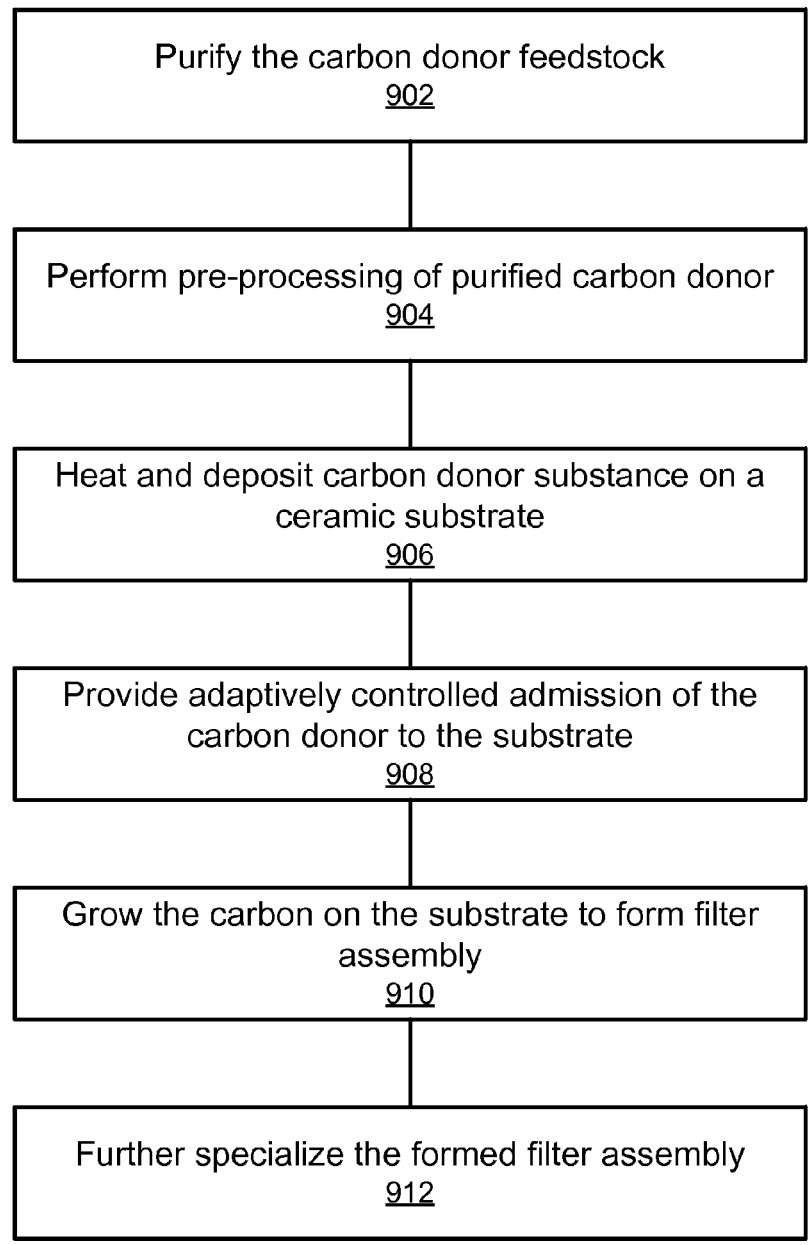
FIG. 9 shows a block diagram of a process to produce filter assemblies from excess carbon.

A remarkable variety of durable goods can be made from the carbon that is selectively collected in the process. For example, products range from various forms of diamond to activated carbon filter media. FIG. 9 shows a block diagram of an exemplary cost-effective method 900 to produce highly valuable filter assemblies from the excess carbon for purification and/or other treatments of water, air, refreshment or alcoholic beverages, and many other fluids. The method 900 includes a process 902 to purify a selected carbon donor feedstock, e.g., such as methane, ethane, propane, or butane from natural gas or another source such as may be produced by anaerobic conversion of biomass. For example, such purification includes scrubbing, filtering, precipitation of impurities and various distillation processes. In some implementations of the process 902, it may be particularly beneficial to utilize cooling processes to provide cryogenic liquid methane from such anaerobic production processes including natural gas for purposes of removal of impurities and enabling dense shipment and storage of liquid natural gas (LNG). Similarly, for example, other carbon donor substances such as ethane, propane, or butane may be individually separated or provided in any desired combination for dense shipment and storage as liquids. The method 900 includes a process 904 to prepare the purified carbon donor for processing, e.g., perform pre-processing of the carbon donor including pressure and temperature adjustments. In some implementations, the purified carbon donor is prepared in a processing canister including a suitably insulated and contained ceramic substrate, such as a carbon based counter-current heat exchanger in a suitable form such as a honeycomb for hosting deposits of carbon by the process, summarized in Equations 10 and 11. The method 900 includes a process 906 to heat and deposit the purified carbon donor substance on a ceramic substrate material. In some implementations of the process 906, a purified carbon donor substance from dense storage in a suitable tank is heated by suitable heat exchanges with warmer sources as indicated previously including hydrogen that is produced by processes summarized in Equations 10 or 11. For example, implementation of the process 906 can serve multiple purposes by such heating and deposition of carbon on the ceramic substrate, including conversion of low grade heat rejected by a fuel cell or heat engine and/or regenerative and/or renewable energy and/or off-peak energy to stored chemical potential energy and/or filter media. The method 900 includes a process 908 to provide adaptively controlled admission of the carbon donor to the substrate. The method 900 includes a process 910 to produce a filter assembly by growing the carbon on the ceramic substrate. For example, in some implementations, after achieving a suitable deposit of carbon on the ceramic substrate, the canister assembly is removed, tested for structural and chemical compliance, and packaged including additions of fittings, electrical connections, and addition of suitable labels such as product identification and directions for achieving best performance etc. Fittings include those with instrumentation capabilities for detecting chemical identifiers on the inlet and/or outlet, e.g., such as disclosed in U.S. Pat. No. 8,312,759 and co-pending U.S. patent application Ser. Nos. 12/806,634 and 61/682,681, each document is incorporated by reference in their entirety as part of the disclosure in this patent document, for example, for the purpose of detecting and reacting to any harmful substances along with providing trend information to enable planned maintenance and scheduling replacement of such filters. The method 900 includes a process 912 to further specialize the formed filter assembly. For example, the process 912 can include activating or preserving activation of the carbon in a suitable packaging embodiment. For example, an original equipment manufacturer (OEM), or any qualified supply chain entity or an end user, may condition the canister for further specialized functions, e.g., such as addition of biocide or biostatic agents, addition of flavors for alcoholic or other beverages, or refreshing aroma sources for various air treatments.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

I claim:

1. A method to initiate combustion, the method comprising:
    transforming an interim fuel substance into constituents including at least one of a chemically active fuel, an oxidant, ions, or radicals, the interim fuel substance formed by a chemical conversion using a fuel and the interim fuel substance having a lower ignition energy than an ignition energy of the fuel;
    injecting the constituents into a combustion chamber in a plurality of bursts between combustion events to increase an efficiency of ignition, combustion, or both; and
    providing a gaseous fluid including oxidants in the combustion chamber to react with the constituents in a combustion reaction,
    wherein the combustion initiation reaction of the constituents occurs at a reduced energy level relative to an energy level of a combustion reaction of the fuel.

2. The method of claim 1, wherein the fuel includes at least one fuel selected from the group consisting of: methane, natural gas, butane, propane, gasoline, diesel fuel, ammonia, urea, nitrogen, hydrogen, and alcohol fuel, wherein the alcohol fuel comprises at least one of methanol, ethanol, propanol and butanol.

3. The method of claim 1, wherein the interim fuel substance includes at least one interim fuel substance selected from the group consisting of ethylcarbazole, decahydronaphthalene, perhydro-4,7-phenanthroline, diazene, acetylene, acetaldehyde, cyclohexane, dimethyl ether (DME), and diethyl ether (DEE).

4. The method of claim 1, wherein the injecting includes producing a Lorentz force to accelerate the constituents into the combustion chamber at a particular pattern, penetration distance, and velocity.

5. The method of claim 1, further comprising applying an electric potential using electrodes interfaced with the combustion chamber to produce at least one of a spark of the constituents, a Lorentz thrust of the constituents, or a corona discharge in the constituents in the combustion chamber.

6. The method of claim 1, further comprising applying acoustic energy to the combustion chamber to stimulate the constituents to react in the combustion reaction.

7. The method of claim 1, wherein the constituents react with nitrogen oxides in the combustion chamber, thereby expediting a reaction of constituents reducing an amount of the nitrogen oxides produced during the combustion reaction, or completing combustion without nitrogen oxides as a product of combustion.

8. The method of claim 1, further comprising storing the interim fuel substance in an accumulator container.

9. The method of claim 1, further comprising injecting the constituents into the combustion chamber in a stratified pattern comprising a plurality of chemical ions.

10. The method of claim 1, further comprising increasing an efficiency of ignition, combustion, or both, by injecting the constituents into the combustion chamber according to a corona-type pattern of ions.

11. The method of claim 1, further comprising using a plurality of chemical ion generators to provide ignition and combustion of the gaseous fluid wherein the oxidants are provided at different penetration distances and patterns in the combustion chamber.

12. The method of claim 1, wherein a reduced energy includes a lower temperature of heat energy than that of the fuel.

13. The method of claim 12, wherein the transforming is implemented within a chamber containing the interim fuel substance, wherein the chamber comprises an interface to a port of the combustion chamber.

14. The method of claim 12, wherein the injecting includes producing a Lorentz force to accelerate the constituents into the combustion chamber at a particular pattern, penetration distance, and velocity.

15. The method of claim 12, further comprising applying an electric potential using electrodes interfaced with the combustion chamber to produce at least one of a spark of the constituents, a Lorentz thrust of the constituents, or a corona discharge in the constituents in the combustion chamber.

16. The method of claim 12, further comprising applying acoustic energy to the combustion chamber to stimulate the constituents to react in the combustion reaction.

17. The method of claim 16, further comprising storing the interim fuel substance in an accumulator container.

18. The method of claim 12, wherein forming an interim fuel substance further comprises pressurizing the fuel by supplying heat using one or more heat exchangers, chemically converting the pressurized fuel into the interim fuel substance, or changing a phase of the interim fuel substance.

19. The method of claim 12, further comprising storing the interim fuel substance in an accumulator container.

20. The method of claim 1, wherein the transforming is implemented within a chamber containing the interim fuel substance, wherein the chamber comprises an interface to a port of the combustion chamber.

21. The method of claim 20, wherein the transforming the interim fuel substance into constituents comprises changing a pressure within the chamber.

22. The method of claim 20, wherein the transforming the interim fuel substance into constituents further comprises adding heat, removing heat, removing then adding heat, or adding then removing heat within the chamber.

23. The method of claim 20, wherein the transforming the interim fuel substance into constituents includes generating an electric field between electrodes in the chamber interfaced at the port to produce an ion current.

24. The method of claim 1, wherein forming an interim fuel substance further comprises pressurizing the fuel by supplying heat using one or more heat exchangers, chemically converting the pressurized fuel into the interim fuel substance, or changing a phase of the interim fuel substance.

25. The method of claim 24, further comprising storing the fuel in a fuel container unit, wherein the pressurizing the fuel is implemented in the fuel container unit.

26. The method of claim 24, wherein the chemically converting is performed in at least one of a thermochemical regeneration (TCR) unit or a respeciation unit.

27. The method of claim 1, further comprising initiating the combustion reaction without electrical assistance.

28. The method of claim 27, further comprising injecting the constituents into the combustion chamber in a stratified pattern comprising a plurality of chemical ions.

29. The method of claim 27, further comprising increasing an efficiency of ignition, combustion, or both, by injecting the constituents into the combustion chamber according to a corona-type pattern of ions.

30. The method of claim 27, further comprising increasing an efficiency of ignition, combustion, or both, by injecting the constituents into the combustion chamber in a plurality of bursts between combustion events.

31. The method of claim 27, further comprising using a plurality of chemical ion generators to provide ignition and combustion of the gaseous fluid wherein the oxidants are provided at different penetration distances and patterns in the combustion chamber.

* * * * *